US012493913B2

(12) United States Patent
Sweeney

(10) Patent No.: US 12,493,913 B2
(45) Date of Patent: Dec. 9, 2025

(54) DATABASE SYSTEM AND OBJECT MANIPULATION REPRESENTING AUTOMATED STRUCTURING OF COVERAGE, EXPECTED LOSSES AND PREMIUMS

(71) Applicant: OnRisk, Inc., Princeton, NJ (US)

(72) Inventor: Francis Joseph Sweeney, Princeton, NJ (US)

(73) Assignee: OnRisk, Inc., Princeton, NJ (US)

( * ) Notice: Subject to any disclaimer, the term of this patent is extended or adjusted under 35 U.S.C. 154(b) by 0 days.

(21) Appl. No.: 18/515,166

(22) Filed: Nov. 20, 2023

(65) Prior Publication Data

US 2024/0127360 A1 Apr. 18, 2024

Related U.S. Application Data

(63) Continuation of application No. 17/005,189, filed on Aug. 27, 2020, now Pat. No. 11,823,275, which is a continuation-in-part of application No. 16/824,249, filed on Mar. 19, 2020, now Pat. No. 11,657,457, (Continued)

(51) Int. Cl.
*G06Q 40/08* (2012.01)
(52) U.S. Cl.
CPC .................................... *G06Q 40/08* (2013.01)
(58) Field of Classification Search
CPC ..................................................... G06Q 40/08
See application file for complete search history.

(56) References Cited

U.S. PATENT DOCUMENTS

| 5,956,691 A | 9/1999 | Powers |
| 7,672,879 B1 | 3/2010 | Kumar et al. |
| 7,698,158 B1 | 4/2010 | Flagg |

(Continued)

FOREIGN PATENT DOCUMENTS

WO 2009105475 A1 8/2009

OTHER PUBLICATIONS

Khanna et al., "Oracle BPM for Insurance," An Oracle White Paper, Sep. 2012, 20 pages.

(Continued)

*Primary Examiner* — Elda G Milef
(74) *Attorney, Agent, or Firm* — HAYNES BEFFEL & WOLFELD LLP; Ernest J. Beffel, Jr.

(57) ABSTRACT

The technology disclosed relates to manipulating and visualizing database objects that represent layers and parts of layers in insurance or other risk transfer programs. Disclosed is graphically creating placement objects, maintaining a database of objects that can be linked in trees, with policy objects linked to respective proposal objects, and coverage objects linked to the proposal objects and the policy objects. A GUI represents a placement using objects, with metadata that describes objects' statuses, with groups of objects properly nested and linked in the database of objects. User selection of a displayed first object and mode control initiates creation of second objects linked to the first object and, opening of a panel that scales the selected first object to fit the panel and allows the user to add nested second objects, by drawing an added object or entering metadata for the added object, with consistent metadata constrained with the nesting.

14 Claims, 61 Drawing Sheets

Claim Display Following Coverage Erosion
- Risk Tower for Named Occurrence

Related U.S. Application Data which is a continuation of application No. 15/005,876, filed on Jan. 25, 2016, now abandoned.

(60) Provisional application No. 62/892,373, filed on Aug. 27, 2019.

(56) References Cited

U.S. PATENT DOCUMENTS

| | | | |
|---|---|---|---|
| 8,666,788 | B1 | 3/2014 | Syed |
| 8,762,379 | B2 | 6/2014 | Birdwell et al. |
| 9,038,001 | B2 | 5/2015 | Jetter et al. |
| 9,100,430 | B1 | 8/2015 | Seiver et al. |
| 9,154,372 | B2 | 10/2015 | Richmond et al. |
| 9,294,497 | B1 | 3/2016 | Ben-Or et al. |
| 9,985,983 | B2 | 5/2018 | Seiver et al. |
| 10,002,392 | B2 | 6/2018 | Sweeney et al. |
| 2002/0194033 | A1 | 12/2002 | Huff |
| 2006/0004682 | A1 | 1/2006 | Danielson et al. |
| 2007/0188494 | A1 | 8/2007 | Agutter et al. |
| 2012/0296694 | A1 | 11/2012 | McGill et al. |
| 2012/0296695 | A1 | 11/2012 | McGill et al. |
| 2013/0110560 | A1 | 5/2013 | Syed et al. |
| 2013/0117654 | A1 | 5/2013 | Rosner |
| 2014/0172465 | A1 | 6/2014 | Yoder |
| 2014/0304194 | A1 | 10/2014 | Hueler |
| 2014/0358590 | A1* | 12/2014 | Schieferdecker ...... G06Q 40/08 705/4 |
| 2014/0380205 | A1 | 12/2014 | Burckhardt et al. |
| 2015/0378979 | A1 | 12/2015 | Hirzel et al. |
| 2016/0191532 | A1 | 6/2016 | Seiver et al. |
| 2016/0203561 | A1 | 7/2016 | Peterson, IV et al. |
| 2017/0213292 | A1 | 7/2017 | Sweeney et al. |
| 2020/0134489 | A1 | 4/2020 | Achin et al. |
| 2020/0219201 | A1 | 7/2020 | Sweeney et al. |

OTHER PUBLICATIONS

PCT/US2016/027630—International Search Report mailed Aug. 30, 2016, 3 pages.
PCT/US2016/027630—Written Opinion of the International Searching Authority mailed Aug. 30, 2016.
"From Digital Wallflower to Digital Disrupter", Accenture, www.accenture.com/insurance and www.accenture.com/technologyvision, 2014, 40 pages.
Khanna et al., "Oracle BPM for Insurance", Sep. 2012, entire document (Year: 2012).
PCT/US2016/027630—International Preliminary Report on Patentability, dated Oct. 26, 2017, 8 pages.
Batty et al, Predictive Modeling for Life Insurance. Ways Life Insurers Can Participate in the Business Analytics Revolution, Deloitte Consulting LLP, Apr. 2010, 29 pgs.
Rozar, Predictive Modeling: Is it a Game Changer, RGA Reinsurance Company (RGA). Sep. 28, 2012, 10 pages, (downloaded Jan. 14, 2023, https://www.rgare.com/knowledge-center/media/articles/predictive-modeling-is-it-a-game-changer).
Rozar, Predictive Modeling: Is it a Game Changer. RGA. Sep. 28, 2012, 10 pages, (downloaded Jan. 14, 2023, https://www.rgare.com/knowledge-center/media/articles/predictive-modeling-is-it-a-game-changer).

* cited by examiner

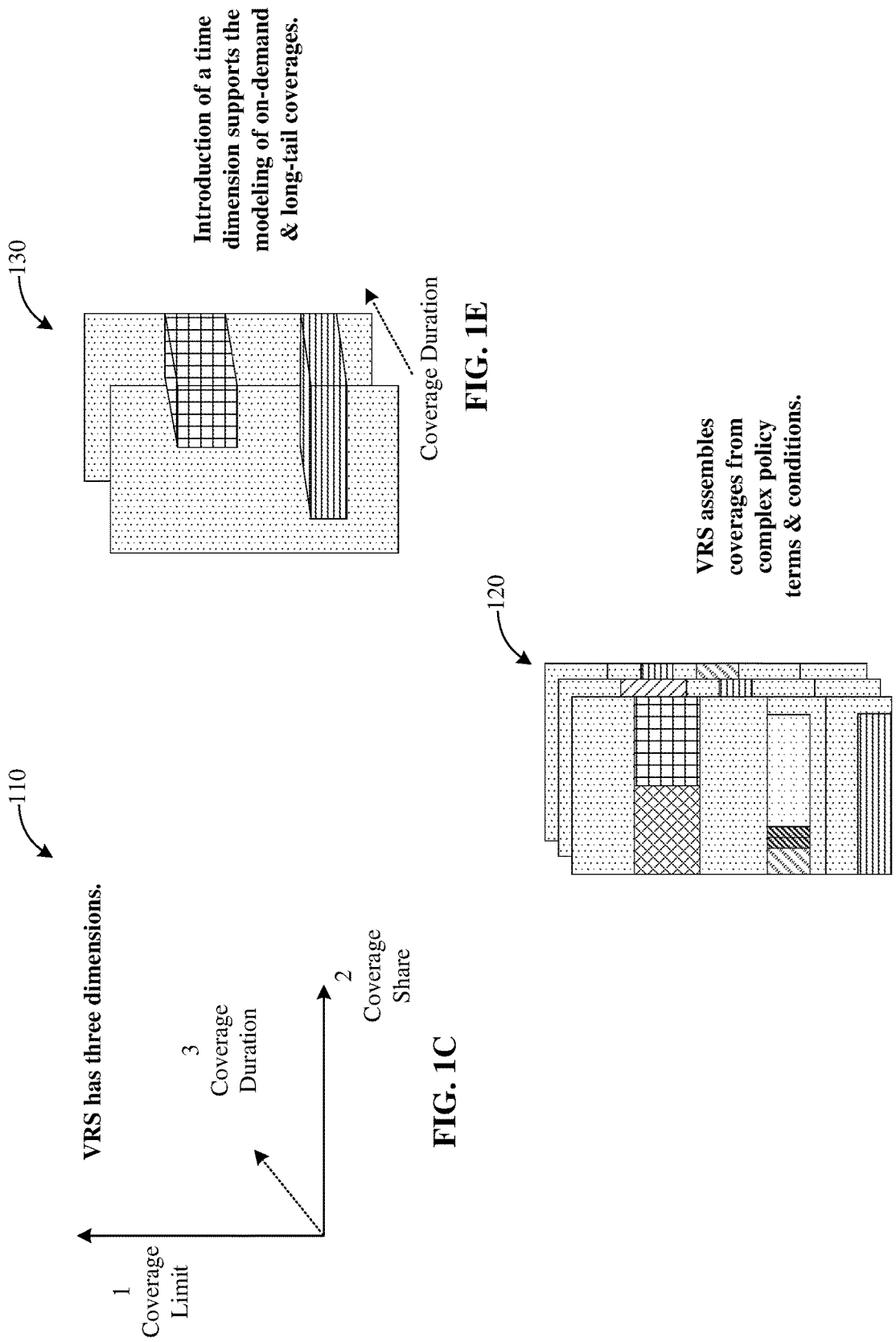

| Select Tower | | Tower: 2020 Property Facultative Re Program | | | |
|---|---|---|---|---|---|
| Buyer: Champlain Insurance | | | CAB: Occ | | Curr: USD |
| Cvge Struct: Fac Reins | | | | | |
| RFP | Quote | Tower | Out-Inn | Inu-Ben | Inw-Outw |
| P-Tracker | Dist Tree | Loss Model | Pricing | T&Cs | Renew |
| Select Display | | Select Date | | Select T&C | |

FIG. 3A

| Sel | Co ID/Name | Co Role | Prps ID | Prps Type | Asso Prpsl ID | Prpsl Exp | Prpsl Stat | Cvge ID | Cvge LOB | Cvge Struct | Curr | Sh% | LH% | Lyr lim | Lyr Ret | CAB Type | Sdw Agg | Cvge Stat | Cvge Eff | Cvge Exp | Prm Amt |
|---|---|---|---|---|---|---|---|---|---|---|---|---|---|---|---|---|---|---|---|---|---|
| ☐ | Champlain Insurance | B | 1001 | RFOQ | N/A | 2-Feb-20 | Pending | 5001 | Property | Fac Rein | USD | 100.0% | 0.0% | 1,000,000 | 0 | Occ | Agg | Pending | 2-Feb-20 | 2-Feb-21 | |
| ☐ | Champlain Insurance | B | 1002 | RFQ | 1001 | 2-Feb-20 | Pending | 5002 | Property | Fac Reins | USD | 50.0% | 50.0% | 200,000 | 800,000 | Occ | Agg | Pending | 2-Feb-20 | 2-Feb-21 | 29,050.00 |
| ☐ | Munich Re | M | 1003 | Quote | 1002 | 2-Feb-20 | Pending | 5003 | Property | Fac Rein | USD | 50.0% | 25.0% | 250,000 | 250,000 | Occ | Agg | Pending | 2-Feb-20 | 2-Feb-21 | |
| ☐ | Axis Capital | M | 1003 | O-Quote | 1002 | 2-Feb-20 | Pending | 5003 | Property | Fac Rein | USD | 90.0% | 0.0% | 100,000 | 0 | Occ | Agg | Pending | 2-Feb-20 | 2-Feb-21 | |
| ☐ | Champlain Insurance | B | 1004 | RFLQ | 1001 | 2-Feb-20 | Pending | 5004 | Property | Fac Reins | USD | 90.0% | 0.0% | 150,000 | 250,000 | Occ | Agg | Pending | 2-Feb-20 | 2-Feb-21 | |
| ☐ | Swiss Re | M | 1005 | L-Quote | 1004 | 26-Jan-20 | Pending | 5005 | Property | Fac Rein | USD | 15.0% | 0.0% | 150,000 | 250,000 | Occ | Agg | Pending | 2-Feb-20 | 2-Feb-21 | |
| ☐ | Hiscox Insurance | M | 1005 | L-Quote | 1004 | 26-Jan-20 | Pending | 5005 | Property | Fac Rein | USD | 5.0% | 15.0% | 150,000 | 250,000 | Occ | Agg | Pending | 2-Feb-20 | 2-Feb-21 | 2,560.00 |
| ☐ | Hannover Re | M | 1006 | F-Quote | 1005 | 26-Jan-20 | Pending | 5006 | Property | Fac Reins | USD | 5.0% | 20.0% | 150,000 | 250,000 | Occ | Agg | Pending | 2-Feb-20 | 2-Feb-21 | 9,980.00 |

Proposal Tracker 377

FIG. 3B

O/I Mode – Proposal Tracker (P-T) Display

User may specify '100%', 'P/O' or 'I/R/O' Layer Quote Basis for Outer RFOQ.

| Buyer/Mkt. | Prpsl.# | Prpsl.Type | Assoc.Prpsl.# | Cvge.ID | Cvge.Type | Assoc.Cvge.ID | Ord./Mkt.% | Lyr.Lim | Lyr.Ret | Layer O/B | Premium |
|---|---|---|---|---|---|---|---|---|---|---|---|
| AXA | 01 | RFOQ | -- | 01 | Reins.Tower | -- | 100% | 500,000 | 0 | 100% | -- |
| AXA | 02 | RFOQ | 01 | 02 | Reins.Tower | 01 | 50% | 125,000 | 375,000 | 100% | -- |

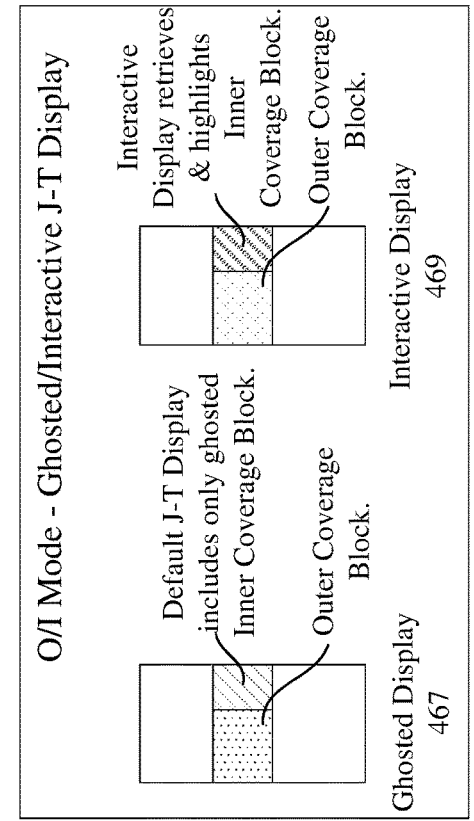

O/I Mode – Ghosted/Interactive J-T Display

Default J-T Display includes only ghosted Inner Coverage Block.

Interactive Display retrieves & highlights Inner Coverage Block.

Outer Coverage Block.

Outer Coverage Block.

Ghosted Display 467

Interactive Display 469

FIG. 4C

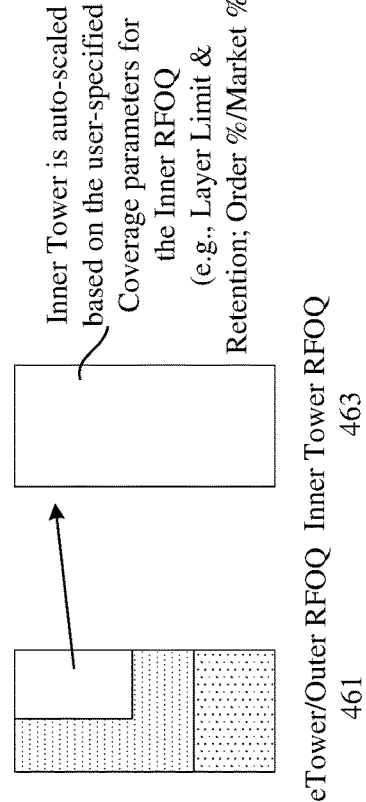

O/I Mode – Jigsaw Tower (J-T) Display

Inner Tower is auto-scaled based on the user-specified Coverage parameters for the Inner RFOQ (e.g., Layer Limit & Retention; Order %/Market %.)

BaseTower/Outer RFOQ   Inner Tower RFOQ
461                    463

FIG. 4B

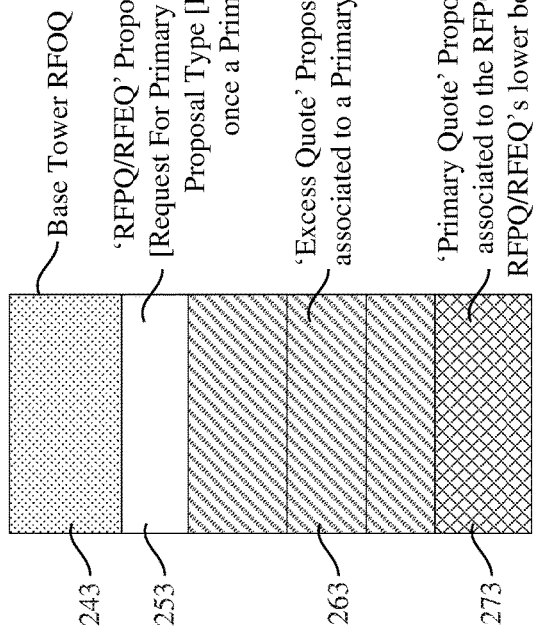
FIG. 6A
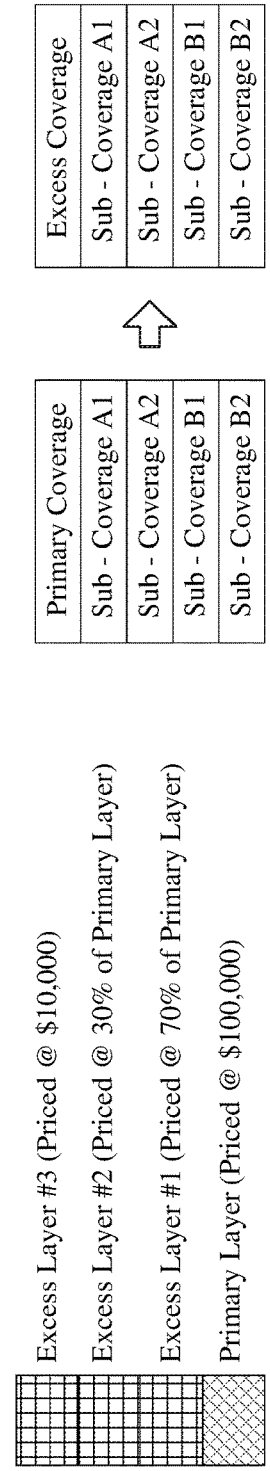
FIG. 6B
FIG. 6C

FIG. 7B

| Sel | Assoc RFP Prpsl IDS | Add Cvge ID | Cvge LOB | Edit Struct Class | Struct Type | Lyr Lim | Del Lyr Ret | CAB | Sdwy Type | Reinst Seq | Cvge Stat | Cvge Eff | Cvge Exp | Prm Amt | F-F Except Stat |
|---|---|---|---|---|---|---|---|---|---|---|---|---|---|---|---|
| ☐ | | 8001 | Civil or Military Authority | G/U Struct | Sublim | 100,000 | | Occ | N/A | | Included | 2-Feb-20 | 2-Feb-21 | | No |
| ☐ | | 8012 | Debris Removal | G/U Struct | Sublim | 50,000 | | Occ | N/A | | Included | 2-Feb-20 | 2-Feb-21 | | No |
| ☐ | | 8023 | Defense Costs | G/U Struct | Sublim | 25,000 | | Occ | N/A | | Included | 2-Feb-20 | 2-Feb-21 | | Yes |
| ☐ | | 8112 | Devaluation ex USA | G/U Struct | Sublim | 50,000 | | Occ | N/A | | Included | 2-Feb-20 | 2-Feb-21 | | No |
| ☐ | 1074 | 8231 | California Earthquake | Inn Agg | Agg Lim | 500,000 | | Agg | N/A | | Included | 2-Feb-20 | 2-Feb-21 | | No |
| ☐ | 1079 | 8234 | Japan Earthquake | Inn Agg | Agg Lim | 250,000 | | Agg | N/A | | Included | 2-Feb-20 | 2-Feb-21 | | No |
| ☐ | 1084 | 8237 | USA Flood | Inn Agg | Agg Lim | 500,000 | | Agg | N/A | | Included | 2-Feb-20 | 2-Feb-21 | | No |
| ☐ | 1085 | 8302 | USA Flood | G/U Struct | Sublim | 500,000 | | Occ | N/A | | Included | 2-Feb-20 | 2-Feb-21 | | No |
| ☐ | | 8311 | Pollution Cleanup | G/U Struct | Sublim | 10,000 | | Occ | N/A | | Included | 2-Feb-20 | 2-Feb-21 | | No |
| ☐ | | 8433 | Service Interruption | G/U Struct | Sublim | 75,000 | | Occ | N/A | | Included | 2-Feb-20 | 2-Feb-21 | | Yes |
| ☐ | 1092 | 8455 | Honduras Earthquake | G/U Struct | SIR | | 50,000 | Occ | N/A | | Included | 2-Feb-20 | 2-Feb-21 | | No |
| ☐ | 1092 | 8479 | Honduras ex Earthquake | G/U Struct | SIR | | 25,000 | Occ | N/A | | Included | 2-Feb-20 | 2-Feb-21 | | No |
| ☐ | 1112 | 8513 | Japan Named Windstorm | G/U Struct | SIR | | 100,000 | Occ | N/A | | Included | 2-Feb-20 | 2-Feb-21 | | No |
| ☐ | 1114 | 8514 | Mexico Named Windstorm | G/U Struct | SIR | | 250,000 | Occ | N/A | | Included | 2-Feb-20 | 2-Feb-21 | | Yes |
| ☐ | 1114 | 8546 | Mexico Earthquake | G/U Struct | SIR | | 100,000 | Occ | N/A | | Included | 2-Feb-20 | 2-Feb-21 | | No |
| ☐ | 1185 | 2376 | USA Flood | G/U Struct | SIR | | 100,000 | Occ | N/A | | Included | 2-Feb-20 | 2-Feb-21 | | No |
| ☐ | 1185 | 2837 | USA Earthquake | G/U Struct | SIR | | 250,000 | Occ | N/A | | Included | 2-Feb-20 | 2-Feb-21 | | No |
| ☐ | | 4511 | Watercraft | G/U Struct | N/A | | | Occ | N/A | | Excluded | N/A | N/A | | No |
| ☐ | | 6711 | Brazil All-Risks | G/U Struct | N/A | | | Occ | N/A | | Excluded | N/A | N/A | | Yes |
| ☐ | | 8776 | Ordinary Wear & Tear | G/U Struct | N/A | | | Occ | N/A | | Excluded | N/A | N/A | | No |
| ☐ | | 7611 | Endmt 1-Elec Date & Media | G/U Struct | N/A | | | Occ | N/A | | Excluded | N/A | N/A | | Yes |
| ☐ | | 7876 | Endmt 2-War & Terrorism | G/U Struct | N/A | | | Occ | N/A | | Excluded | N/A | N/A | | No |

I/B Mode - Proposal Tracker (P-T) Display

| Buyer/Mkt. | Prpsl.ID | Prpsl.Type | Assoc.Prpsl.ID | Cvge.ID | Cvge.Struc. | Assoc.Cvge.ID | Ord.%/Mkt.% | Lyr.Lim. | Lyr.Ret. | Layer Q/B |
|---|---|---|---|---|---|---|---|---|---|---|
| Cisco | 23 | RFOQ | --- | 01 | Ins.Tower | --- | 100% | 1,000,00 | 0 | 100% |
| Cisco | 39 | RFOQ(Ben.) | 23 | 02 | Ins.Tower | 01 | 100% | 750,00 | 0 | I/R/O |

1121 Benefiting RFOQ is auto-formed when the Base Tower RFOQ is formed, but P-T display is deferred until user clicks on I/B mode.

1123 A new 'RFOQ (Ben.)' Proposal Type is used to differentiate any RfOQ used for I/B mode.

1127 Layer Limit is auto updated to reflect dynamic BNRL for Inuring Tower

1129 'I/R/O' Quote Basis uniquely identifies Benefiting RFOQ.

FIG. 11A

I/O Mode - Proposal Tracker (P-T) Display

1324 Outward RFOQ Coverage auto-specified as 'G/U Insurance Limit x/s $0'

1326 Benefiting RFOQ Coverage auto-specified as '$BNRL x/s $0'

| Buyer/Mkt. | Prpsl.ID | Prpsl.Type | Assoc.Prpsl.ID | Cvge.Type | Ord.%/Mkt.% | Lyr.Lim. | Lyr.Ret. | Layer O/B | Counterparty Note |
|---|---|---|---|---|---|---|---|---|---|
| AIG | 23 | Quote | --- | Insurance | 100% | 250,000 | 500,000 | I/R/O | [Buyer = Cisco] |
| AIG | 39 | RFOQ | 23 | Reins.Tower | 100% | 250,000 | 0 | 100% | [Market = Swiss Re] |
| AIG | 40 | RFOQ | 39 | Reins.Tower | 100% | 250,000 | 0 | I/R/O | [Market = Swiss Re] |

FIG. 13A

| Sel | Assoc RFP Prpsl IDS | Add Cvge ID | Cvge LOB | Edit Struct Class | Struct Type | Del Lyr Lim | Lyr Ret | CAB | Sdwy Type | Reinst Seq | Cvge Stat | Cvge Eff | Cvge Exp | Prm Amt | F-F Except Stat |
|---|---|---|---|---|---|---|---|---|---|---|---|---|---|---|---|
| ☐ | | 8001 | Civil or Military Authority | G/U Struct | Sublim | 100,000 | | Occ | N/A | | Included | 2-Feb-20 | 2-Feb-21 | | No |
| ☐ | | 8012 | Debris Removal | G/U Struct | Sublim | 50,000 | | Occ | N/A | | Included | 2-Feb-20 | 2-Feb-21 | | No |
| ☐ | | 8023 | Defense Costs | G/U Struct | Sublim | 25,000 | | Occ | N/A | | Included | 2-Feb-20 | 2-Feb-21 | | Yes |
| ☐ | | 8112 | Devaluation ex USA | G/U Struct | Sublim | 50,000 | | Occ | N/A | | Included | 2-Feb-20 | 2-Feb-21 | | No |
| ☐ | 1074 | 8231 | California Earthquake | Inn Agg | Agg Lim | 500,000 | | Agg | N/A | | Included | 2-Feb-20 | 2-Feb-21 | | No |
| ☐ | 1079 | 8234 | Japan Earthquake | Inn Agg | Agg Lim | 250,000 | | Agg | N/A | | Included | 2-Feb-20 | 2-Feb-21 | | No |
| ☐ | 1084 | 8237 | USA Flood | Inn Agg | Agg Lim | 500,000 | | Agg | N/A | | Included | 2-Feb-20 | 2-Feb-21 | | No |
| ☐ | 1085 | 8302 | USA Flood | G/U Struct | Sublim | 500,000 | | Occ | N/A | | Included | 2-Feb-20 | 2-Feb-21 | | No |
| ☐ | | 8311 | Pollution Cleanup | G/U Struct | Sublim | 10,000 | | Occ | N/A | | Included | 2-Feb-20 | 2-Feb-21 | | No |
| ☐ | | 8433 | Service Interruption | G/U Struct | Sublim | 75,000 | | Occ | N/A | | Included | 2-Feb-20 | 2-Feb-21 | | Yes |
| ☐ | | 8455 | Honduras Earthquake | G/U Struct | SIR | | 50,000 | Occ | N/A | | Included | 2-Feb-20 | 2-Feb-21 | | No |
| ☐ | | 8479 | Honduras ex Earthquake | G/U Struct | SIR | | 25,000 | Occ | N/A | | Included | 2-Feb-20 | 2-Feb-21 | | No |
| ☐ | 1112 | 8513 | Japan Named Windstorm | G/U Struct | SIR | | 100,000 | Occ | N/A | | Included | 2-Feb-20 | 2-Feb-21 | | No |
| ☐ | 1114 | 8514 | Mexico Named Windstorm | G/U Struct | SIR | | 250,000 | Occ | N/A | | Included | 2-Feb-20 | 2-Feb-21 | | Yes |
| ☐ | 1114 | 8546 | Mexico Earthquake | G/U Struct | SIR | | 100,000 | Occ | N/A | | Included | 2-Feb-20 | 2-Feb-21 | | No |
| ☐ | 1185 | 2376 | USA Flood | G/U Struct | SIR | | 100,000 | Occ | N/A | | Included | 2-Feb-20 | 2-Feb-21 | | No |
| ☐ | 1185 | 2837 | USA Earthquake | G/U Struct | SIR | | 250,000 | Occ | N/A | | Included | 2-Feb-20 | 2-Feb-21 | | No |
| ☐ | | 4511 | Watercraft | G/U Struct | N/A | | | Occ | N/A | | Excluded | N/A | N/A | | No |
| ☐ | | 6711 | Brazil All-Risks | G/U Struct | N/A | | | Occ | N/A | | Excluded | N/A | N/A | | Yes |
| ☐ | | 8776 | Ordinary Wear & Tear | G/U Struct | N/A | | | Occ | N/A | | Excluded | N/A | N/A | | No |
| ☐ | | 7611 | Endmt 1-Elec. Date & Media | G/U Struct | N/A | | | Occ | N/A | | Excluded | N/A | N/A | | Yes |
| ☐ | | 7876 | Endmt 2-War & Terrorism | G/U Struct | N/A | | | Occ | N/A | | | | | | No |

Gaps in Terms & Conditions (T&Cs)

T&C Coverage Matrix

|  | Coverage #1 | Coverage #2 | Coverage #3 |
|---|---|---|---|
| Basel Cvge.: | 20% p/o $1m x/s $0 | 80% p/o /$500k x/s $500k | 80% p/o /$500k x/s $0 |
| Coverage A | Included (I) | Sublayer (S) [∞ x/s $10k] | Excluded (E) |
| Coverage B | Excluded (E) | Excluded (E) | Included (I) |
| Coverage C | Sublayer (s) [$10k x/s $0] | Excluded (E) | Sublayer (S) [$10k x/s $0] |

J-T Display - T&C Coverage Gaps

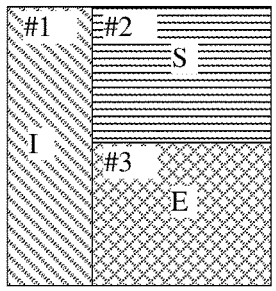 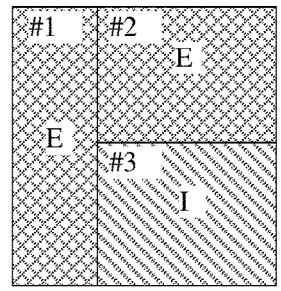 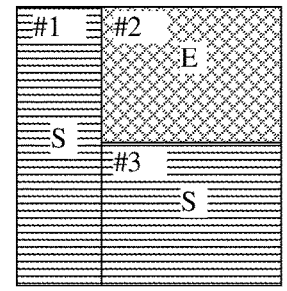

J-T Display: Coverage A     J-T Display: Coverage B     J-T Display: Coverage C 1763            1765            1767

FIG. 17

P-T Display - Inner Aggregates

1821 Internal Coverages are linked to certain Proposal Types.

Proposal Tracker - Main Display - Base Coverage & Market Coverage

| Buyer/Mkt. | Prpsl. ID | Prpsl.Type | Assoc. Prpsl.ID | Cvge.ID | Cvge.Type | Assoc. Cvge.ID | Ord.%/Mkt.% | Lyr.Lim. | Lyr.Ret. | CAB | Layer Q/B |
|---|---|---|---|---|---|---|---|---|---|---|---|
| Cisco | 22 | RFOQ | --- | 40 | Reins.Tower | --- | 100% | 100,000 | 0 | Risk | 100% |
| AIG [IC] | 25 | Open Quote | 22 | 43 | Excess Tty.Reins. | 40 | 60% | 250,000 | 250,000 | Risk | N/A |
| Cisco [IC] | 23 | RFLQ | 22 | 41 | Excess Tty.Reins. | 40 | 100% | 250,000 | 100,000 | Risk | 100% |
| AIG | 24 | Lead Quote | 23 | 42 | Excess Tty.Reins. | 41 | 25% | 250,000 | 100,000 | Risk | N/A |

1830

1863 Proposal Association links 1st Internal Coverage RFOQ Tower back to originating RFLQ Proposal.

1867 All Quotes within Internal Coverage RFOQ Tower are auto-filled based on Coverage parameters specified for the associated Base Coverage.

Coverage Type & CAB differentiate the Internal Coverage RFOQ from other RFOQ applications.

Proposal Tracker - Separate 'Internal Coverages' Display
[Display Requires Manual Data Entry by User Since RFOQ Is Not Auto-Formed]

| Buyer/Mkt. | Prpsl. ID | Prpsl.Type | Assoc. Prpsl.ID | Cvge.ID | Cvge.Type | Assoc. Cvge.ID | Ord.%/Mkt.% | Lyr.Lim. | Lyr.Ret. | CAB | Layer Q/B |
|---|---|---|---|---|---|---|---|---|---|---|---|
| Cisco | 25 | RFOQ | 23 | 61 | Int.Cvge. - Tower | 41 | 100% | 1,000,000 | 0 | Occ. | I/R/O. |
| Cisco | 26 | RFLQ | 25 | 62 | Int.Cvge. - Limit | 61 | 100% | 1,000,000 | 0 | Occ. | I/R/O. |
| AIG | 27 | Lead Quote | 26 | 63 | Int.Cvge. - Limit | 62 | 25% | 1,000,000 | 0 | Occ. | I/R/O. |
| Cisco | 28 | RFOQ | 25 | 64 | Int.Cvge. - Tower | 61 | 100% | 5,000,000 | 0 | Agg. | I/R/O. |
| Cisco | 29 | RFLQ | 28 | 65 | Int.Cvge. - Limit | 64 | 100% | 5,000,000 | 0 | Agg. | I/R/O. |
| AIG | 30 | Lead Quote | 29 | 66 | Int.Cvge. - Limit | 65 | 25% | 5,000,000 | 0 | Agg. | I/R/O. |

$1m Per Occ. Limit 1841

$5m Agg. Limit 1842

FIG. 18A

| Sel | Assoc RFP Prpsl IDS | Cvge ID | Cvge LOB | Struct Class | Struct Type | Lyr Lim | Lyr Ret | CAB | Sdwy Type | Reinst Seq | Cvge Stat | Cvge Eff | Cvge Exp | Prm Amt | F-F Except Stat |
|---|---|---|---|---|---|---|---|---|---|---|---|---|---|---|---|
| | Add | | | Edit | | Del | | | | | | | | | |
| ☐ | | 8001 | Civil or Military Authority | G/U Struct | Sublim | 100,000 | | Occ | N/A | | Included | 2-Feb-20 | 2-Feb-21 | | No |
| ☐ | | 8012 | Debris Removal | G/U Struct | Sublim | 50,000 | | Occ | N/A | | Included | 2-Feb-20 | 2-Feb-21 | | No |
| ☐ | | 8023 | Defense Costs | G/U Struct | Sublim | 25,000 | | Occ | N/A | | Included | 2-Feb-20 | 2-Feb-21 | | Yes |
| ☐ | | 8112 | Devaluation ex USA | G/U Struct | Sublim | 50,000 | | Occ | N/A | | Included | 2-Feb-20 | 2-Feb-21 | | No |
| ☐ | 1074 | 8231 | California Earthquake | Inn Agg | Agg Lim | 500,000 | | Agg | N/A | | Included | 2-Feb-20 | 2-Feb-21 | | No |
| ☐ | 1079 | 8234 | Japan Earthquake | Inn Agg | Agg Lim | 250,000 | | Agg | N/A | | Included | 2-Feb-20 | 2-Feb-21 | | No |
| ☐ | 1084 | 8237 | USA Flood | Inn Agg | Agg Lim | 500,000 | | Agg | N/A | | Included | 2-Feb-20 | 2-Feb-21 | | No |
| ☐ | 1085 | 8302 | USA Flood | G/U Struct | Sublim | 500,000 | | Occ | N/A | | Included | 2-Feb-20 | 2-Feb-21 | | No |
| ☑ | | 8311 | Pollution Cleanup | G/U Struct | Sublim | 10,000 | | Occ | N/A | | Included | 2-Feb-20 | 2-Feb-21 | | No |
| ☐ | | 8433 | Service Interruption | G/U Struct | Sublim | 75,000 | | Occ | N/A | | Included | 2-Feb-20 | 2-Feb-21 | | Yes |
| ☐ | 1092 | 8455 | Honduras Earthquake | G/U Struct | SIR | | 50,000 | Occ | N/A | | Included | 2-Feb-20 | 2-Feb-21 | | No |
| ☐ | 1092 | 8479 | Honduras ex Earthquake | G/U Struct | SIR | | 25,000 | Occ | N/A | | Included | 2-Feb-20 | 2-Feb-21 | | No |
| ☐ | 1112 | 8513 | Japan Named Windstorm | G/U Struct | SIR | | 100,000 | Occ | N/A | | Included | 2-Feb-20 | 2-Feb-21 | | No |
| ☐ | 1114 | 8514 | Mexico Named Windstorm | G/U Struct | SIR | | 250,000 | Occ | N/A | | Included | 2-Feb-20 | 2-Feb-21 | | Yes |
| ☐ | 1114 | 8546 | Mexico Earthquake | G/U Struct | SIR | | 100,000 | Occ | N/A | | Included | 2-Feb-20 | 2-Feb-21 | | No |
| ☐ | 1185 | 2376 | USA Flood | G/U Struct | SIR | | 100,000 | Occ | N/A | | Included | 2-Feb-20 | 2-Feb-21 | | No |
| ☐ | 1185 | 2837 | USA Earthquake | G/U Struct | SIR | | 250,000 | Occ | N/A | | Included | 2-Feb-20 | 2-Feb-21 | | No |
| ☐ | | 4511 | Watercraft | G/U Struct | N/A | | | Occ | N/A | | Excluded | N/A | N/A | | No |
| ☐ | | 6711 | Brazil All-Risks | G/U Struct | N/A | | | Occ | N/A | | Excluded | N/A | N/A | | Yes |
| ☐ | | 8776 | Ordinary Wear & Tear | G/U Struct | N/A | | | Occ | N/A | | Excluded | N/A | N/A | | No |
| ☐ | | 7611 | Endmt 1-Elec. Date & Media | G/U Struct | N/A | | | Occ | N/A | | Excluded | N/A | N/A | | Yes |
| ☐ | | 7876 | Endmt 2-War & Terrorism | G/U Struct | N/A | | | Occ | N/A | | Excluded | N/A | N/A | | No |

Partial Coverage - Proposal Tracker (P-T) Display

2323 Facility was originally formed using an RFLQ/RFFQ & multiple Lead/Following Quotes. The Facility Proposal here is assigned a new Proposal ID, but retains the same Proposal Type in this case (cf. Benefiting Coverage). The Facility function here as a single Quote responding to the Prior RFQ ID 002 within the Proposal Hierarchy.

| Global Property Facility | | | | | | | | 2355 |
|---|---|---|---|---|---|---|---|---|
| Buyer/Mkt. | Prpsl.ID# | Prpsl.Type | Assoc.Prpsl.ID# | Cntrt.Type | Ord.%/Mkt.% | Lyr.Lim. | Lyr.Ret. | Layer Q/B |
| AXA | 001 | RFOQ | --- | Ins.Tower | 100% | | | |
| AXA | 002 | RFQ | 001 | Insurance | 30% | $1,000,000 | 0 | 100% |
| AXA | 003 | RFLQ/RFOQ | 002 | Insurance | 30% | $3,000,000 | $2,000,000 | 100% |
| AXA | 004 | RFLQ/RFOQ | 003 | Insurance | 100% | $3,000,000 | $2,000,000 | P/O |
| Zurich | 005 | Lead Quote | 004 | Insurance | 50% | ------- | ------- | 100% |
| CNA | 006 | Following Quote | 004 | Insurance | 40% | ------- | ------- | N/A |
| AIG | 007 | FollowingQuote | 004 | Insurance | 10% | ------- | ------- | N/A |

2321 'AXA' replaces "TBD" as the designated Buyer for the Facility.

2325 'P/O' Quote Basis for this Insurance Facility Contract enables dynamic, horizontal contraction of nested Lead/Following Quotes to 30% Market Share.

2375 Whole Facility (RFLQ & nested Lead/Following Quotes) is iterated from the original Insurance Facility Contract.

FIG. 23A

Partial Coverage - Jigsaw Tower (J-T) Display

2357 Facility is modeled using a 60% Coverage Frame that specifies a 'P/O' Layer Q/B.

2377 Market Quote specifies a 25% Market%, which converts to 15% Facility Participation Share (100% basis).

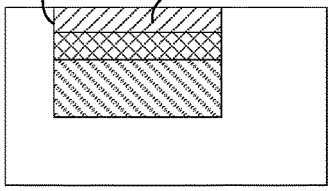

FIG. 23B

OR Mockup – Claim Worksheet

Business Case: Occurrence Limit & Aggregate Limit

| Claim Account | 100% | P/O – Order % | Market % | Agg Lim – 100% | Agg Lim – P/O – Order % | Agg Lim – Market % | | | |
|---|---|---|---|---|---|---|---|---|---|
| Gross Paid Loss [Note: Instant Claim set-up; Gross Paid Loss Applied to Int. Cvge Note & Int. Issued Claim for all Claims] | $600,000 | | | | | | | | |
| Order %/Market % | N/A | 100% | 20% | N/A | 50% | 20% | N/A | 100% | 20% |
| Layer Retention [Layer Retention Balance = $0] | $500,000 | $500,000 | $500,000 | N/A | $500,000 | $500,000 | N/A | $500,000 | $500,000 |
| Layer Limit [Layer Limit Balance = $150,000] | $250,000 | $125,000 | $25,000 | $500,000 | $250,000 | $50,000 | $2,000,000 | $1,000,000 | $200,000 |
| Gross Paid Loss Applied to Coverage | $100,000 | $50,000 | $10,000 | $500,000 | $250,000 | $50,000 | $500,000 | $450,000 | $90,000 |
| Total Paid Loss Deduction – Occ. Lim. | $50,000 | $25,000 | $5,000 | $200,000 | $150,000 | $30,000 | N/A | N/A | N/A |
| Prior Paid Loss Deduction – Occ. Lim. | $0 | $0 | $0 | $250,000 | $125,000 | $25,000 | N/A | N/A | N/A |
| Inc. Paid Loss Deduction – Occ. Lim. | $50,000 | $25,000 | $5,000 | $50,000 | $25,000 | $5,000 | N/A | N/A | N/A |
| Paid Loss Deduction Balance – Occ. Lim. | N/A | N/A | N/A | N/A | N/A | N/A | N/A | N/A | N/A |
| Total Paid Loss Deduction – Agg. Lim. | $0 | $0 | $0 | $0 | $0 | $0 | $0 | $0 | $0 |
| Prior Paid Loss Deduction – Agg. Lim. | $0 | $0 | $0 | $0 | $0 | $0 | $0 | $0 | $0 |
| Inc. Paid Loss Deduction – Agg. Lim. | N/A | N/A | N/A | N/A | N/A | N/A | $1,100,000 | $550,000 | $110,000 |
| Paid Loss Deduction Balance – Agg. Lim. | N/A | N/A | N/A | N/A | N/A | N/A | N/A | N/A | N/A |
| Net Paid Loss Recoverable | $50,000 | $50,000 | $5,000 | | | | | | |
| Loss Amount Previously Billed | $0 | $0 | $0 | | | | | | |
| Incremental Loss Amount Billed | $50,000 | $25,000 | $5,000 | | | | | | |

Note on Gross Paid Loss Calculation: Calculation fo the Gross Paid Loss will reflect the following: (1) Subject Claim - i.e., retrieval and/or rollup of Subject Claims across successive Indemnity Stages; (2) Gross-Net Claim - reduction of Gross Paid Claim due to the application of Inuring Coverages for the same Indemnity Stage.

Note on J-T Main Display: the J-T main display includes the Coverage Layer [100% p/o $250,000 x/s $500,000] and Gross Paid Loss [$600,000]. Once the Gross Paid Loss reaches the Coverage Attachment Point for a Coverage, the J-T main display will begin to form a dynamic 'Balloon Layer' that tracks the Gross Paid Loss Applied to Coverage, which traverses a region running upwards from the Coverage Attachment Point to the Gross Paid Loss. This dynamic, 'Balloon Layer' will contain the following embedded dynamic 'Balloon Layers': (1) Net Paid Loss Recoverable - i.e., Gross Paid Loss Applied to Coverage minus any Total Paid Loss Deductions; (2) Total Paid Loss Deductions - i.e., including one 'Balloon Layer' for each Internal Coverage; Deductible 'Balloon Layers' attached to Coverage Attachment Point & sitting beneath the Net Paid Loss Recoverage, Limit 'Balloon Layers' attached to the top of the Gross Paid Loss Applied to Coverage.

Note on J-T Display of Internal Coverages: the J-T main display is linked to separate displays for each Internal Coverage - i.e., the Occurrent Limit & Aggregate Limit structures in this case. Each display includes the Internal Coverage Layer [Occ.Lim.: 100% p/o $500,000 x/s $0] and Gross Loss Applied to Internal Coverage [Occ.Lim.: $800,000].

FIG. 28B-1

OR Mockup - Claim Worksheet

Business Case: Reinstatements

| Claim Account | 100% | P/O – Order % | Market % | Agg. Lim. – 100% | Agg. Lim. – P/O - Order % | Agg. Lim. – Market % |
|---|---|---|---|---|---|---|
| Gross Paid Loss [Note: Instant Claim only] | $600,000 | | | | | |
| Gross Paid Loss Applied to Ins. Cvge. [Note: either Instant Claim or All Claims] | N/A | N/A | N/A | N/A | N/A | N/A |
| Order %/Market % | 100% | 50% | 20% | 100% | 50% | 20% |
| Layer Retention | $600,000 | $600,000 | $500,000 | $0 | $0 | $0 |
| Layer Limit | $250,000 | $125,000 | $25,000 | $2,000,000 | $1,000,000 | $200,000 |
| Gross Paid Loss Applied to Coverage | $100,000 | $50,000 | $10,000 | $900,000 | $450,000 | $90,000 |
| Total Reinstated Limit - 1st Reinstatement | $100,000 | $50,000 | $10,000 | N/A | N/A | N/A |
| Prior Reinstated Limit - 1st Reinstatement | $50,000 | $25,000 | $5,000 | N/A | N/A | N/A |
| Inc. Reinstated Limit - 1st Reinstatement | $50,000 | $25,000 | $5,000 | N/A | N/A | N/A |
| Reinstatement Limit Balance - 1st Reinstatement | $150,000 | $75,000 | $15,000 | N/A | N/A | N/A |
| Total Reinstated Limit - 2nd Reinstatement | $0 | $0 | $0 | N/A | N/A | N/A |
| Prior Reinstated Limit - 2nd Reinstatement | $0 | $0 | $0 | N/A | N/A | N/A |
| Inc. Reinstated Limit - 2nd Reinstatement | $0 | $0 | $0 | N/A | N/A | N/A |
| Reinstatement Limit Balance - 2nd Reinstatement | $250,000 | $125,000 | $25,000 | N/A | N/A | N/A |
| Total Paid Loss Deduction - Agg. Lim. | $0 | $0 | $0 | $0 | $0 | $0 |
| Prior Paid Loss Deduction - Agg. Lim. | $0 | $0 | $0 | $0 | $0 | $0 |
| Inc. Paid Loss Deduction - Agg. Lim. | $0 | $0 | $0 | $0 | $0 | $0 |
| Paid Loss Deduction Balance - Agg. Lim. | N/A | N/A | N/A | $1,100,000 | $550,000 | $110,000 |
| Net Paid Loss Recoverable | $100,000 | $50,000 | $10,000 | N/A | N/A | N/A |
| Loss Amount Previously Billed | $0 | $0 | $0 | N/A | N/A | N/A |
| Incremental Loss Amount Billed | $100,000 | $50,000 | $10,000 | N/A | N/A | N/A |

FIG. 28B-2

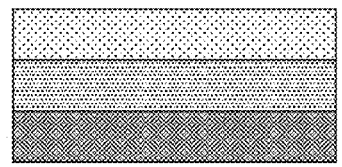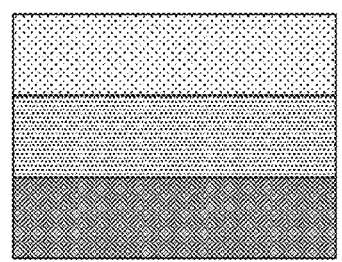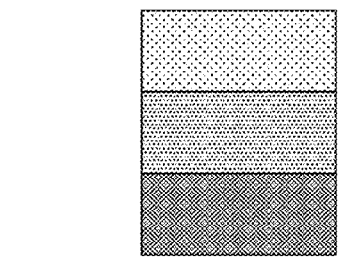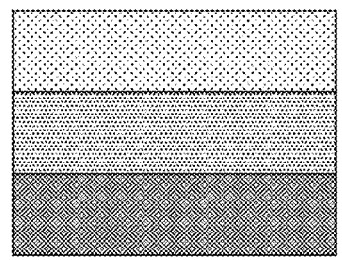
FIG. 29B

Claim Display Following Coverage Erosion
- Risk Tower for Named Occurrence

DATABASE SYSTEM AND OBJECT MANIPULATION REPRESENTING AUTOMATED STRUCTURING OF COVERAGE, EXPECTED LOSSES AND PREMIUMS

CROSS-REFERENCE

This application is a continuation of U.S. application Ser. No. 17/005,189, filed 27 Aug. 2020, titled "Database System and Object Manipulation Representing Automated Structuring of Coverage, Expected Losses and Premiums," now U.S. Pat. No. 11,823,275, issued 21 Nov. 2023 which claims priority to and the benefit of U.S. Provisional Application No. 62/892,373, filed 27 Aug. 2019, titled "Database System and Object Manipulation Representing Automated Structuring of Coverage, Expected Losses and Premiums".

U.S. Ser. No. 17/005,189 is also a Continuation-in-Part of U.S. application Ser. No. 16/824,249, filed 19 Mar. 2020, titled "User-Modifiable Interactive Display of Placement Channel and Status Data" now U.S. Pat. No. 11,657,457, issued 23 May 2023 which is a continuation of U.S. application Ser. No. 15/005,876, filed 25 Jan. 2016, titled "User-Modifiable Interactive Display of Placement Channel and Status Data".

The priority applications are incorporated by reference herein for all purposes.

RELATED APPLICATION

This application is related to U.S. patent application Ser. No. 14/689,674, filed 17 Apr. 2015, entitled "Database System and Object Manipulation Representing Placement Layers and Parts", issued as U.S. Pat. No. 10,002,392 B2, on 19 Jun. 2018, which patent is hereby incorporated by reference.

STATEMENT OF COMMON OWNERSHIP

Pursuant to 35 USC 102(b)(2)(C) and MPEP 717.02(b) (III), Applicant hereby states that the present application, U.S. application Ser. No. 14/689,674, U.S. application Ser. No. 15/005,876, and U.S. application Ser. No. 16/824,249 were, at the time the inventions were effectively filed, owned by or subject to an obligation of assignment to OnRisk, Inc.

STATEMENT REGARDING PRIOR DISCLOSURES BY THE INVENTOR OR A JOINT INVENTOR UNDER 37 C.F.R. 1.77(B)(6)

The present application has the same effective filing date of previously filed U.S. application Ser. No. 16/824,249, which published 27 Jul. 2017 as U.S. 2017/0213292 A1. The effective filing date of U.S. Ser. No. 16/824,249 is 25 Jan. 2016 and is within one year of U.S. application Ser. No. 14/689,674, filed 17 Apr. 2015, which published 20 Oct. 2016 as U.S. 2016/0307274 A1. The subject matter in U.S. Ser. No. 16/824,249, U.S. application Ser. No. 15/005,876, and U.S. Ser. No. 14/689,674 was invented or co-invented by the inventor in the present application.

BACKGROUND

The recently-issued U.S. Pat. No. 10,002,392 B2 and the application Ser. No. 15/005,876 (CON US 2020/0219201 A1, Pub. Date: Jul. 9, 2020) disclose technology that provides systems and methods for processing and displaying database objects that build a composite coverage structure capable of representing a complex program of multiple insurance policies or other risk transfer instruments during planning and placement.

The technology disclosed provides (a) additional systems and methods for processing and displaying data objects that build a composite coverage structure during planning and placement, (b) a visual interface for the administration of claims reported for, and associated with, a complex program of multiple insurance policies or other risk transfer instruments, and (c) systems and methods for the use of catastrophe modeling data outputs for the automated structuring of tower and coverage layers, and expected losses and premiums for these layers.

SUMMARY

The technology disclosed provides systems and methods capable of representing a complex program of multiple insurance policies or other risk transfer instruments during planning and placement, for processing and displaying data objects that build a composite coverage structure during planning and placement, and also provides a visual interface for the administration of claims reported for, and associated with, a complex program of multiple insurance policies or other risk transfer instruments.

Other aspects and advantages of the technology disclosed can be seen on review of the drawings, the detailed description and the claims, which follow.

BRIEF DESCRIPTION OF THE DRAWINGS

For the reader's convenience, we describe our use of reference numbers. For numbers "mmnn", "mm" indicates figure in which a reference is introduced. The "nn" roughly indicates a row and column position of the reference number within the figure.

FIG. 1C depicts a visual interface for visual risk structuring (VRS) with first dimension representing the coverage layer limit and layer retention for a tower or coverage, and a second dimension representing the risk percentage for the tower or coverage.

FIG. 1D illustrates of a stack of split coverages.

FIG. 1E extends the visual interface in FIG. 1C with a third dimension representing coverage duration.

FIG. 3A illustrates a sample panel of controls for navigating the Graphical User Interface (GUI)

FIG. 3B is an example table of metadata.

FIG. 4A shows the metadata concerning the RFP entered into the placement database.

FIG. 4B shows the operation that enables a user to select the inner RFOQ in an outer RFOQ tower, and expand the inner RFOQ, either replacing the base tower or side-by-side.

FIG. 4C depicts alternative ghosted representation and interactive representation of each new RFP or Quote within the RFOQ nested within the outer tower object.

FIGS. 6A, 6B and 6C illustrate common process elements of follow-form coverages. FIG. 6A shows the Follow-Form Coverage Jigsaw Tower (J-T) Display. FIG. 6B shows the Simple Casualty Insurance Tower. FIG. 6C shows the Follow-Form Terms & Conditions (T&Cs).

FIGS. 7A and 7B illustrate the structure of a follow-form tower that includes a request for primary quote (RFPQ), a single primary quote, and two excess quotes.

FIG. 11A shows an example of how the metadata for the request for open quote (RFOQ) representing the benefiting tower object is entered into the placement database

FIG. 13A illustrates how a broker enters the insurance quote for the excess layer coverage to be provided by the insurance carrier as a metadata.

FIGS. 16A and 16B illustrate the management of occurrence and aggregate terms and conditions using the 'terms & conditions' database.

FIG. 17 illustrates flagging of divergent terms and conditions for split coverages.

FIG. 18A shows the system automatically converting the selected terms and conditions to a sideways coverage that is fully described and formed by proposal metadata and coverage metadata in the placement database.

FIG. 21A and FIG. 21B illustrate Bundled Coverages & Inner Structures.

FIG. 23A illustrates how a broker specifies 'P/O' layer quote basis metadata, and enters the risk percentage for the whole facility as a 30% part of the original risk to be placed (RTBP), and the risk percentages for the individual participating facility markets, which must total to 100% so that the insurance facility can provide its full share of capacity when it is placed into other risks.

FIG. 23B illustrates another subscription coverage placed to form an insurance facility, when a broker binds the insurance facility for a 60% share of the risk to be placed (RTBP), and the lead quote for the insurance facility has assumed a 25% risk percentage of the 100/6 total facility share specified in the placement database, the lead quote is visually displayed as a 25% part of the RFLQ representing the whole insurance facility, but only a 15% part of the original RTBP that defines the base tower.

FIGS. 28A, 28B-1, 28B-2, and 28C show a method for extending the visualization methods used for the placement of high-value risk to be used for the administration of a claim reported for a collection of bound coverages associated with a tower.

FIGS. 29A, 29B, 29C and 29D show a method for iterating a complex coverage for use in the administration of a claim reported for a collection of bound coverages associated with a tower.

DETAILED DESCRIPTION

Figure 1A:
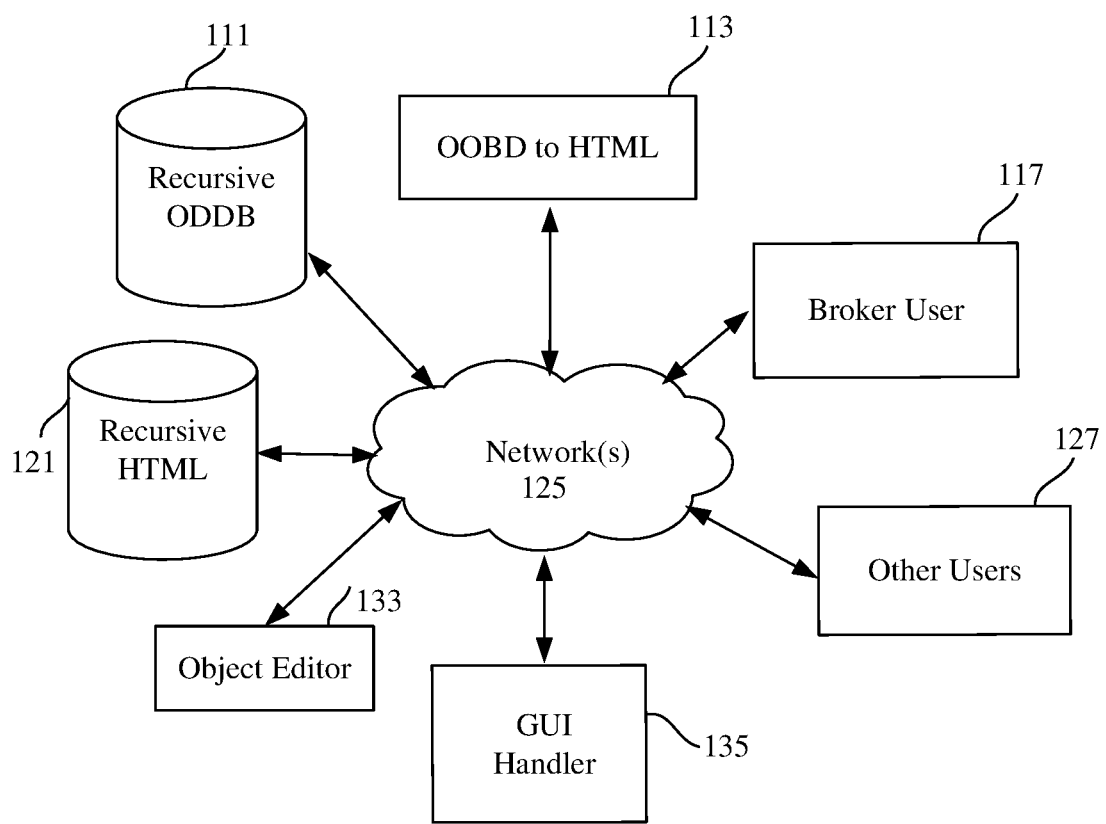
FIG. 1A illustrates a system environment for a special purpose insurance program.

A detailed description of implementations of the technology disclosed is provided with reference to the FIGS. 1-33.

This disclosure begins with an introduction to an industry and to technology disclosed to improve operations, especially during planning and tracking of progress in placement, and in claim administration. Eleven use cases are described, and all use cases are described from the perspective of a system user. The six initial use cases describe technology that improves the technology previously disclosed in U.S. Pat. No. 10,002,392 B2, and is used for placement of high-value risk. The seventh use case describes a three-dimensional (3D) graphical user interface that is used for the placement of time-based insurance or reinsurance policies, or other risk transfer instruments. The eighth use case describes technology that improves industry operations in the planning and tracking of progress in claim administration. The ninth use case describes technology that improves placement by enabling a user to retrieve data outputs from catastrophe modeling systems for use in the automated structuring and pricing of the layers and shares to be included in a complex insurance or reinsurance program. The tenth use case addresses iterated coverages. The eleventh use case address analysis and visualization over time. The twelfth use case describes technology that improves industry operations in the planning and tracking of progress in claim administration. The last use case describes technology that improves placement by enabling a user to retrieve data outputs from catastrophe modeling systems for use in the automated structuring and pricing of the layers and shares to be included in a complex insurance or reinsurance program.

Buying automobile insurance is challenging to car owners, because insurers have different rate structures and terms and conditions of coverage. Online tools simplify the rate shopping, but one popular online tool, as of filing this application, required entry of data on about six screens and displayed 12 terms and conditions of coverage, with varying limits and attachment points, for a single car. Thus, even understanding competing proposals for coverage of a single car is complex.

Placing a tower of insurance for an international account is much more complicated. It can involve multiple coverages in policy bundles, in a primary layer and multiple excess layers, often with multiple insurers providing coverage in a particular excess layer. The insurers favor their own terms and conditions, but sometimes agree, more or less, to follow form to an underlying coverage. (The details of "more or less" can be essential.)

Consider a placement that requires 20 insurance policy bundles to fill the tower. Such a tower involves too many terms and conditions, limits and sublimits, and separate coverages within bundles for any person to hold in mind. Sharding of risks into smaller parts and building towers for very large, low-frequency risks could involve increasing the number of policies in a tower from 20 to 100. Such complexity is practically restricted by limits of comprehension of the resulting placement and lack of integration between placement and claims submission. Practically comprehending a complex placement is a long-felt need.

There are relatively few tools available to support analysis of international or complex account placements. Due to the considerable manual processing effort needed to prepare new versions of visual risk representations, existing graphical tools typically provide a broker, or a buyer purchasing directly, with only limited ability to update and track placement progress on a real-time, automated basis. Reliance on these cumbersome manual methods can therefore constrain a broker's or buyer's capacity to conduct a concurrent evaluation of alternative placement strategies or to re-structure a placement dynamically in response to shifting capacity availability or pricing opportunities in the global marketplace.

The US and international searches in applicant's two prior application families have not identified graphical tools to meet the needs that applicant has addressed.

Applicant has pioneered development of graphical tools that can be useful during placement. Graphical manipulation of towers is addressed in applicant's prior U.S. Pat. No. 10,002,392 B2, "Database system and object manipulation representing placement layers and parts", issued Jun. 19, 2018. See, also, US 2020/0219201 A1, "User-modifiable interactive display of placement channel and status data". Many additional features have been developed that are presented in this application.

The technology disclosed includes features that can be grouped into categories of: nested tower structures (many of the use cases); coverage assembly from terms and conditions (bricolage—building up and assembling, in contrast to nesting and subdividing); iteration during placement of coverages (containers and portability); and time element coverages. The technology also can be extended into claims processing, as described in the provisional application that has been bodily incorporated into this application.

Figure 1B:
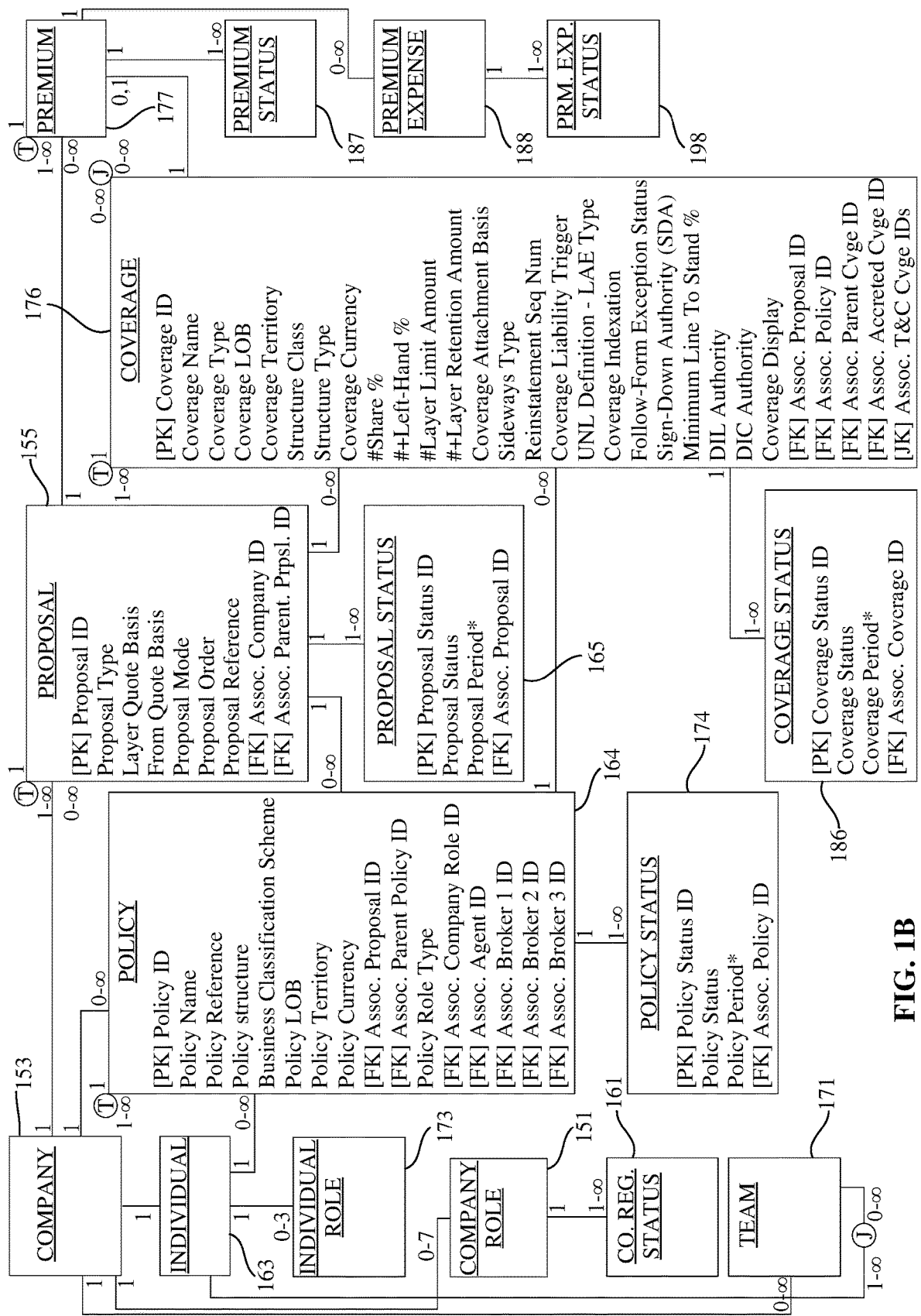
FIG. 1B depicts a schema for an object oriented database (OODB) that holds proposals, policies, and coverages.
Figure 2A:
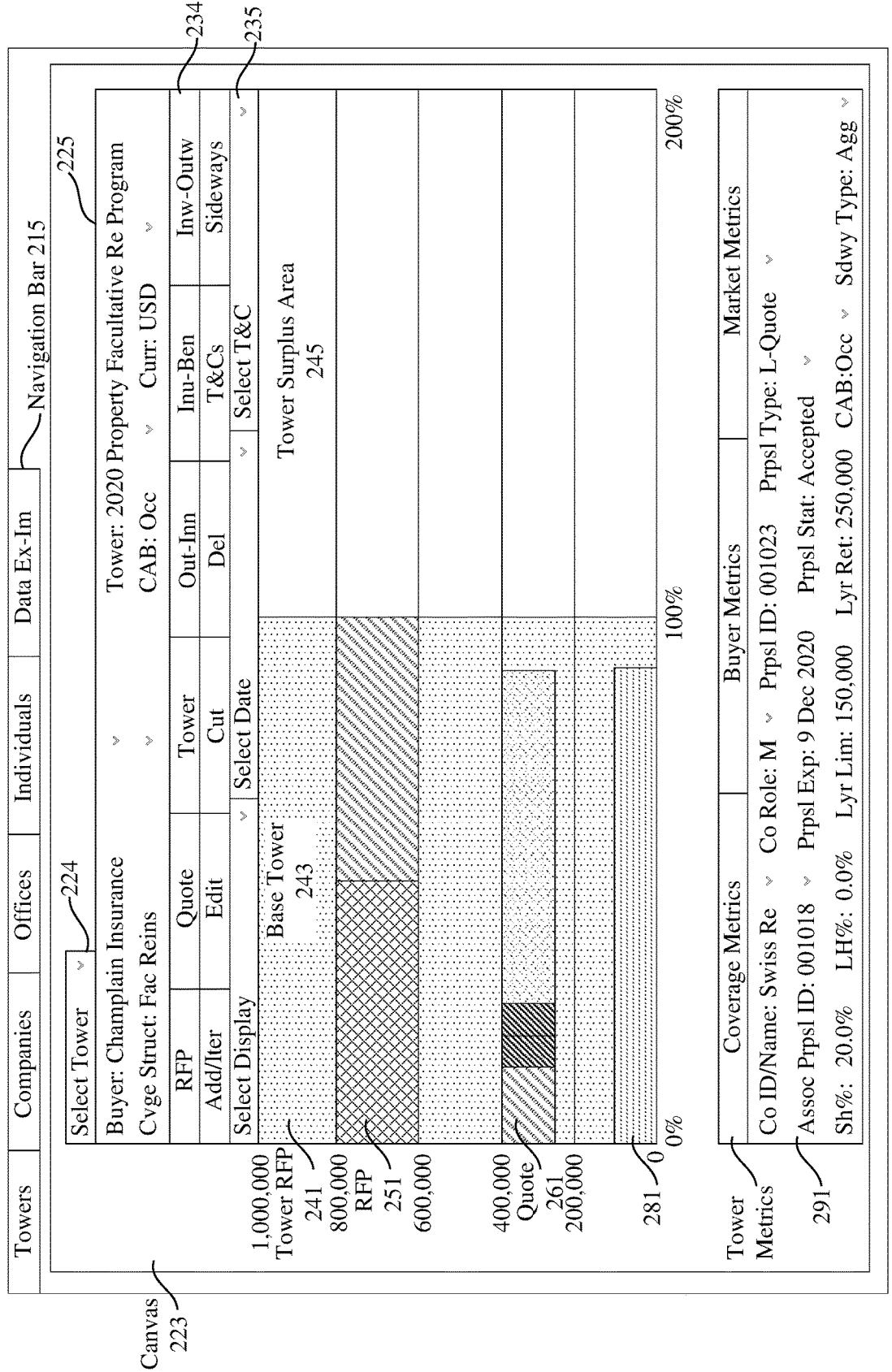
FIGS. 2A and 2B depict a Jigsaw Tower (J-T) which converts coverages to graphical objects, and then enables a user to move and transform these objects.
Figure 2B:
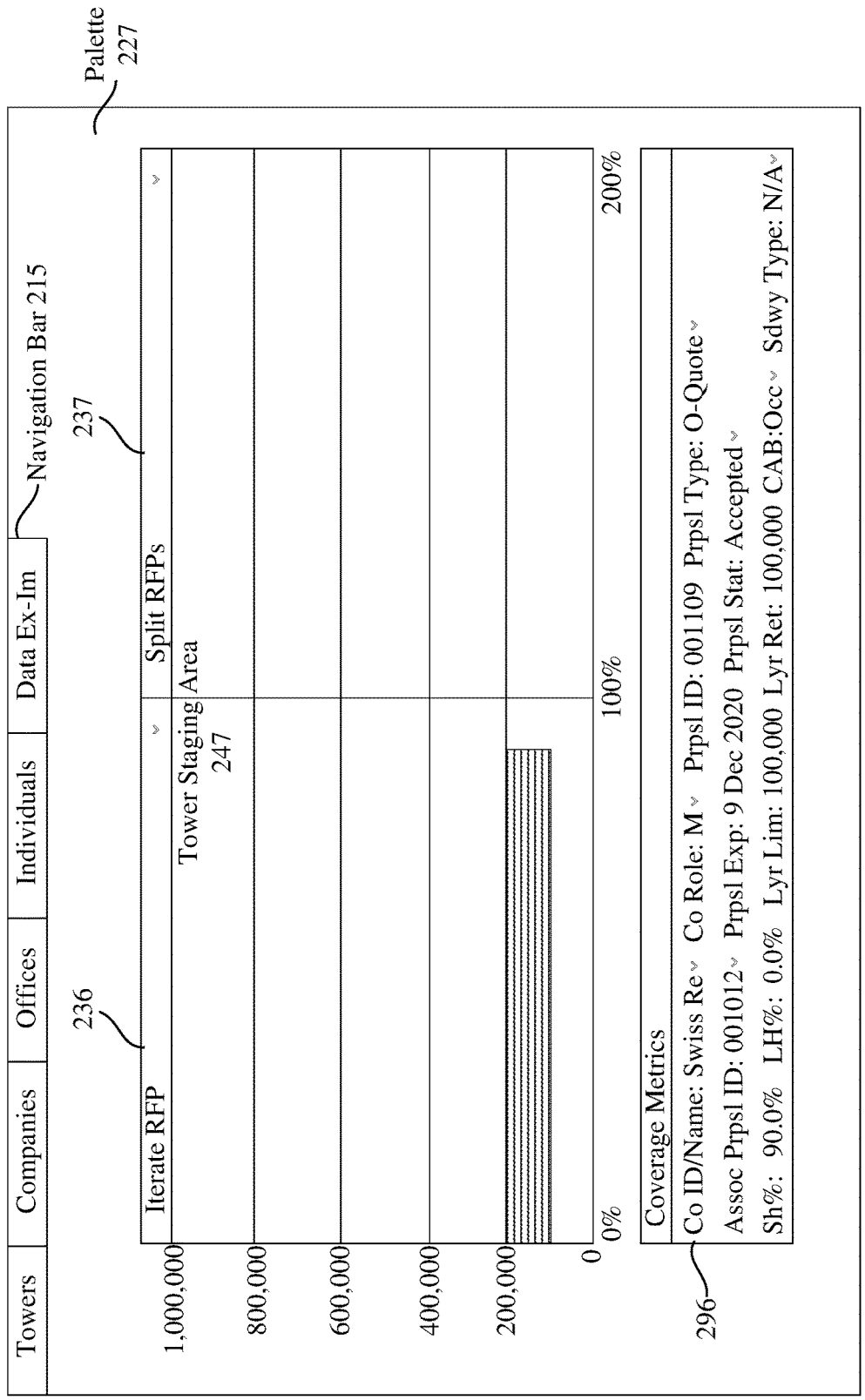

An example schema in FIG. 1B can support these features. Alternative schemas also can provide similar support. The main tables that describe policies and coverages within policies in this example are policy 164, policy status 174, proposal 155, proposal status 165, coverage 176 and coverage status 186 tables. Additional tables relate to companies 153, 151, 161 and individuals 163, 173, 171 in the companies and premiums 177, 187, 188, 198 associated with proposals and coverages. The main tables support nested tower structures with parent-child relationships among proposals, policies, and coverages. For instance, the policy table 164 can include foreign keys for associated policy id and associated parent policy ID. The coverage table 176 can include foreign keys for associated policy id, associated parent policy ID, and parent coverage ID. The proposal table 155 can include a foreign key for associated parent proposal ID. The graphic computing algorithms can depict layers of nesting in multiple towers, side-by-side at different scales in a variety of nesting relationships. Analysis and display rule and GUI structures can be applied to the various nesting relationships.

Coverage assembly from terms and conditions ("T&Cs") is supported by rules applied to populate and analyze the coverage and coverage status tables. The graphical computing tools far exceed the ability of a person to keep bundles of coverage in mind or to aggregate descriptions of individual coverages or T&Cs. Human minds fail badly as aggregators of the types of details involved in coverage assembly. Algorithms and rules that select and analyze cross-sections of coverage and generate GUIs provide valuable tools for readily gaining insights that are presently inaccessible.

Iteration during placement is supported by status tables and proposal types. Information from an RFP 251, such as an RFOQ 241, can be promoted into a Quote 261 by spawning a child object in the Proposal table with corresponding updates to or additions of Proposal Status objects. An accepted Quote can spawn a policy and bundle of coverages with Policy and Coverage Status objects and attributes that represent binding or issuance of a policy.

Time element coverages are supported by policy and coverage period information in the Policy Status and Coverage Status tables. Algorithms and rules can select and analyze either successive periods or ceding of coverage during a period, such as inuring and benefiting coverages. Views can be compared side-by-side.

These categories of technology disclosed are further presented below.

Introduction to Technology Disclosed

FIG. 1A illustrates a system environment in which the technology disclosed can be practiced. The components illustrate one computer and network implementation. At least one data store 111, such as an object oriented database (OODB), holds a variety of data objects, which can be arranged according to schema FIG. 1B. These objects include recursive description of proposals, policies, and coverages, with type attributes that implement the various use cases described below, without a proliferation of different object structures, so that code including HTML DIV structures can be reused for GUI rendering and manipulation.

Objects representing aspects of the GUI (graphic user interface) also can be persisted in a variety of data store structures. GUI elements can include a canvas, palette, controls, and information panels. In some implementations, the data store can store information to form an on-demand database service (ODDS), which can be implemented in many ways, such as a multi-tenant database system (MTDS). A database image can include one or more database objects. In other implementations, the databases can be relational database management systems (RDBMSs), object-oriented database management systems (OODBMSs), distributed file systems (DFS), no-schema database, or any other data storing systems or computing devices.

An OODB to HTML engine 113 receives object data and converts recursive objects into nested HTML structures 121 such as DIVs. GUIs typically are displayed and processed via a network 125, including input from a broker user 117 and other users 127, having their own user computing devices. The user computing devices run at least one application. Applications can be a browser, special purpose application, a spreadsheet, or other form completion application. Data can be entered directly for processing or can be compiled, for instance in a spreadsheet, and uploaded in bulk. Input data can be translated from another system or format. A GUI handler 135 facilitates tool interaction with users. An object editor 135 interacts with the data store 111 to create, update and delete objects, including objects representing proposals, policies, and coverages.

The schema disclosed in FIG. 1B significantly improves on existing market mechanisms that are primarily keyed to policy numbers, after issuance, by presenting a recursive data structure or tree that begins with proposals 155, such as RFPs, before quotes are accepted 165 or policies 164 are bound or issued 174. The schema in FIG. 1B also improves on policy number-based tracking by disaggregating policies 164 into coverages 176.

Input is handled in various stages of interaction by request-proposal workflow engine (not shown). As further explained below, some steps precede others, such as the request for quotation typically preceding a quote, or a lead quote typically preceding a following quote. A request-proposal workflow engine can track the status of outstanding requests and maintain threads of related requests and proposals or quotes.

FIG. 1B illustrates one schema for objects that can be used to represent proposals, policies, and coverages. A handful of base object types (proposals, policies, and coverages) can be differentiated in application by types (e.g., proposal type, policy LOB and coverage type) and differentiated among phases of placement by status tables 165, 174 and 186.

Acronyms

Acronyms used in this disclosure are identified the first time that they are used. These acronyms are terms of art, often used in the industry. Except where the terms are used in a clear and distinctly different sense than they are used in the art, we adopt the industry meanings. For the reader's convenience, many of them are listed here:

| | |
|---|---|
| DFS | Distributed File System |
| GUI | Graphical User Interface |
| MAL | Market Assumed Line |
| MTDS | Multi-Tenant Database System |
| ODDS | On-Demand Database Service |
| OODB | Object Oriented Database |
| OODBMS | Object-Oriented Database Management System |
| RDMS | Relational Database Management System |
| RFLQ | Request for Lead Quote |
| RFOQ | Request for Open Quotation |
| RFP | Request for Proposal |
| RFPQ | Request for Primary Quotation |
| RTBP | Risk to Be Placed |
| T&Cs | Terms and Conditions |

Figure 5A:
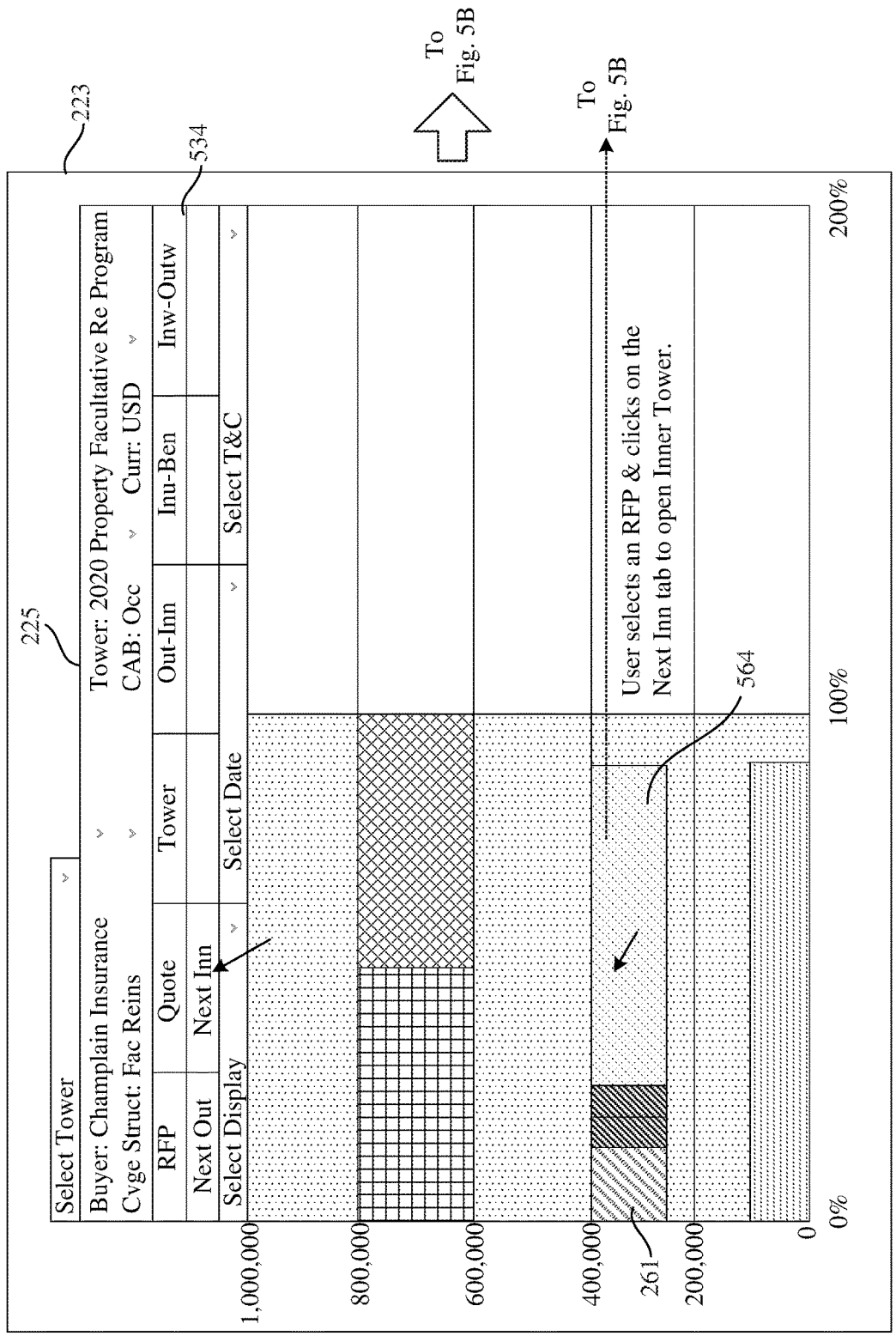
FIGS. 5A and 5B illustrates the risk percentage for the RFLQ used by the reinsurance broker to place the excess facultative reinsurance layer as a subscription coverage on behalf of the insurance carrier

Use Case #1: High-Value Risk Placement by Constructing a Nested, Inner Tower that Enables Placement of a Delimited Part of the Outer Tower One feature of the technology disclosed is creation and handling of properly nested tower objects, and objects contained within these tower objects, in a placement database, such as defined by schema FIG. 1B. Practicing this feature, the first and second objects have complementary types, and are properly nested in a hierarchy, as shown in FIGS. 4B, 5 and 15B. By properly nested, we mean that that one or more second objects 566, 567, 568 are fully contained within the first object 564 within which they are nested. For these purposes, if proposals represented by second objects, before acceptance, total more than 100 percent of the first object, they are nonetheless considered properly nested. This feature of graphic computing can be applied to risk sharding, subscription policies, follow-form policies, and policy-wise facultative reinsurance. The first and second objects can be stated as having different 100% sizes, because they are nested.

This feature addresses a problem of computing final and intermediate results of placement steps, though the same technology can be used after a first stage of placement has been accomplished, either iteratively or recursively for further placement steps, or for the handling of claims. The problem is addressed by representing placement in a first step as first objects, and placement in a second step as second objects, with metadata that describes placement properties of the first and second objects. Groups of the second objects are properly nested within a first object, and linked in a placement database to the first object. A GUI 223 responds to selection of the first object 564, and of a mode control 534, by scaling the selected first object to fit the display panel; depicts the nested second objects 566, 567, 568 within the selected first object 564; allows a user to access by further selection metadata describing one or more of the nested second objects; and allows a user to add nested second objects by either drawing an added second object, or by completing metadata for the added second object. The completed metadata is enforced to be consistent with the nesting of the added second object within the selected first object.

This process can be enhanced by automatically generating a request for proposals (RFP) from metadata for the selected first object. The proposals, when received, will be represented as second objects with a proposal type metadata. Before proposals are received, the requests for proposals (RFP) are represented as one or more second objects with a proposal type metadata.

Usefulness of the technology and tool disclosed for graphic computing can be understood by application to a worked example of a placement involving the sharding of a large risk into small parts. In practice, a facultative reinsurance broker consults with the facultative reinsurance buyer for an insurance carrier that has written an insurance policy for a large corporation and uses the technology disclosed to support a reinsurance placement. The facultative reinsurance broker supplies the GUI 410 with USD 500,000 as the risk to be placed (RTBP) layer limit metadata, and with USD 0 as the RTBP layer retention metadata in the placement database 377, which is shown in FIG. 3B. The tool uses these upper and lower layer bounds to correctly scale the display panel that includes the tower object 463 representing the facultative reinsurance program to be placed. As shown in FIG. 4A, the RTBP is accepted and displayed as a request for open quotation (RFOQ) metadata 410.

Suppose that the broker concludes, after an initial reinsurance market assessment, that the placement can be handled with greater speed and efficiency if the RTBP is subdivided into smaller parts for placement with different facultative reinsurance carriers. To subdivide the initial RTBP, the broker uses the GUI to enter metadata that nests a smaller layer within the initial layer, linking proposal 02 to proposal 01 in the Associated Proposal Number column 410 of the placement database 377. The proposal type metadata is 'RFOQ' and the coverage attachment basis metadata is 'per occurrence'. The coverage layer limit is USD 125,000 metadata, the layer retention USD 375,000 and the risk percentage 50%, all captured in metadata. FIG. 4A shows the metadata concerning the RFP 410 entered into the placement database 377. The technology described can use this metadata to prepare to send a request for proposals (RFP) for a delimited part of the initial RTBP, described as '50% part of USD 125,000 in excess of 375,000 per occurrence', to interested carriers.

When the broker enters metadata concerning the request for proposals (RFP) into the placement database 377 shown in FIG. 3B, and submits that information, the tool produces a layer share part object 461 that visually represents the RFP that is displayed in its correct vertical and horizontal position within the display panel. The position of the layer share part object 461 reflects the coverage limit and retention metadata values of the RFP.

At this stage, when the broker views the display panel, the tool depicts the original 01 request for proposals (RFP) as the outer tower object 461 since it encloses the subsequent, nested RFP 02, specified as an RFOQ. Using the GUI, the broker accesses the enclosed, inner RFP by clicking on the RFP, and then on the 'Next Inner' control in the tower command mode area 234 as shown in FIG. 3A to expand the RFOQ to fill the entire base tower area 243 in the display panel 223. FIG. 4B shows the operation that enables a user to select the inner RFOQ in an outer RFOQ tower 461, and expand the inner RFOQ 463, either replacing the base tower 461 or side-by-side. The broker can later click on the 'Next Outer' control in the tower command mode area 234 of the GUI to return from the inner tower to the outer tower representing the original RTBP.

The broker can use the tool to create one or more requests for proposals (RFP) or quotes within the inner tower object. If the broker creates any RFP or quote within the inner tower object, the visual interface can display a ghosted representation 467 or interactive representation 469 of each new RFP or quote within the RFOQ, which is nested within the outer tower object. These alternative displays are depicted in FIG. 4C.

Figure 10A:
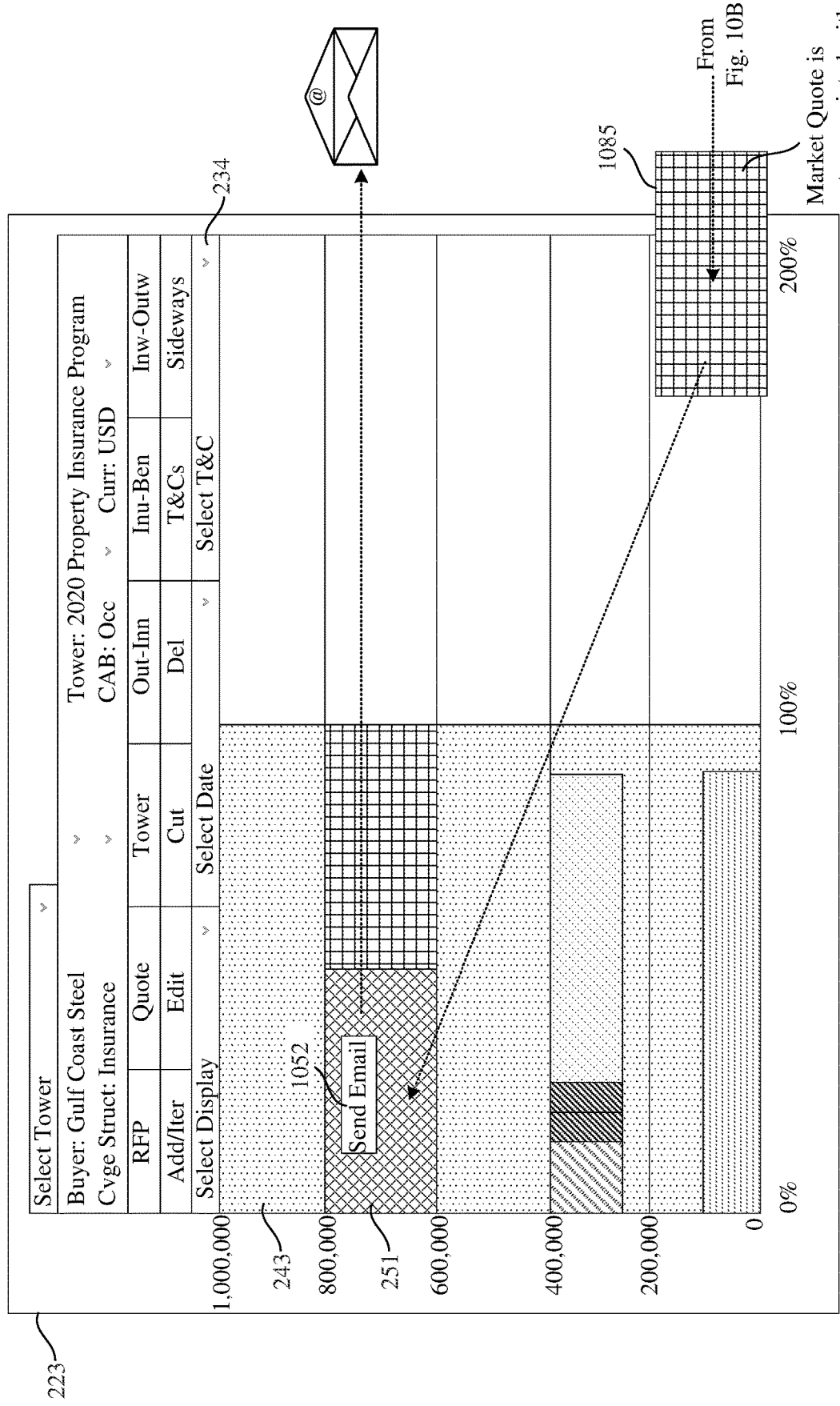
FIGS. 10A and 10B illustrate the round-trip email distribution of any RFP selected by the broker.
Figure 10B:

The broker can use the tool to email or otherwise distribute information concerning a request for proposals (RFP) to interested carriers by clicking on the RFP 251. A control can allow selection of email addresses 1057 for the interested carriers and generation of emails 1052. The tool retrieves tower metadata 1077 and RFP 1087 metadata from the placement database, and it uses the retrieved metadata to prepare the email, and distributes the email to the selected carriers. If the selected carrier indicates interest in the RFP by replying to the email, the tool will automatically capture the new quote 1085 in an object spawned from the original RFP, and position the quote for display within the associated RFP 243 in the display panel 223. FIG. 10A and FIG. 10B illustrate the round-trip email distribution of any RFP selected by the broker.

The process for linking and nesting outer and inner layer share part objects described in this example can be repeated recursively to enable the sharding of a high-value risk structure into ever smaller parts. To extend the current example, the broker can add a new request for proposals (RFP) within the inner tower 463 shown in FIG. 4B, and then click on the 'Next Inner' control to expand this new RFP to fill the entire base tower area 243 in the display panel 223. In this way, one or more third objects are fully contained within the second object within which they are nested. This tool linking outer and inner coverages enables a broker to apply graphical computing to even very small risk structures that would otherwise not be perceptible or manipulable on the screens of most computing devices.

Figure 15A:
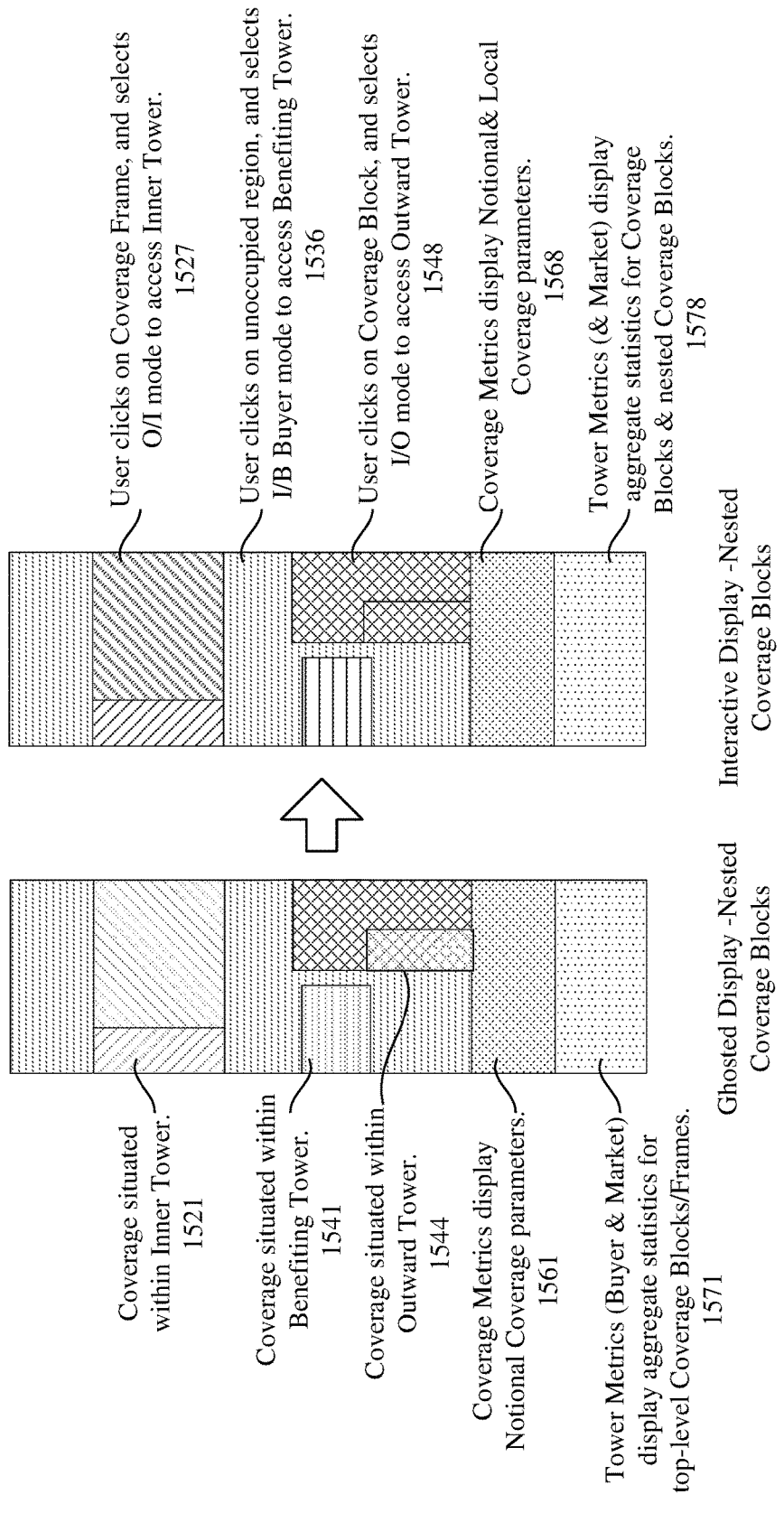
FIG. 15A illustrates the integration of the placement mode technology for linking and nesting inward and outward layer share part objects with other technologies that are used to link outer and inner insurance coverages, and inuring and benefiting insurance coverages.
Figure 15B:
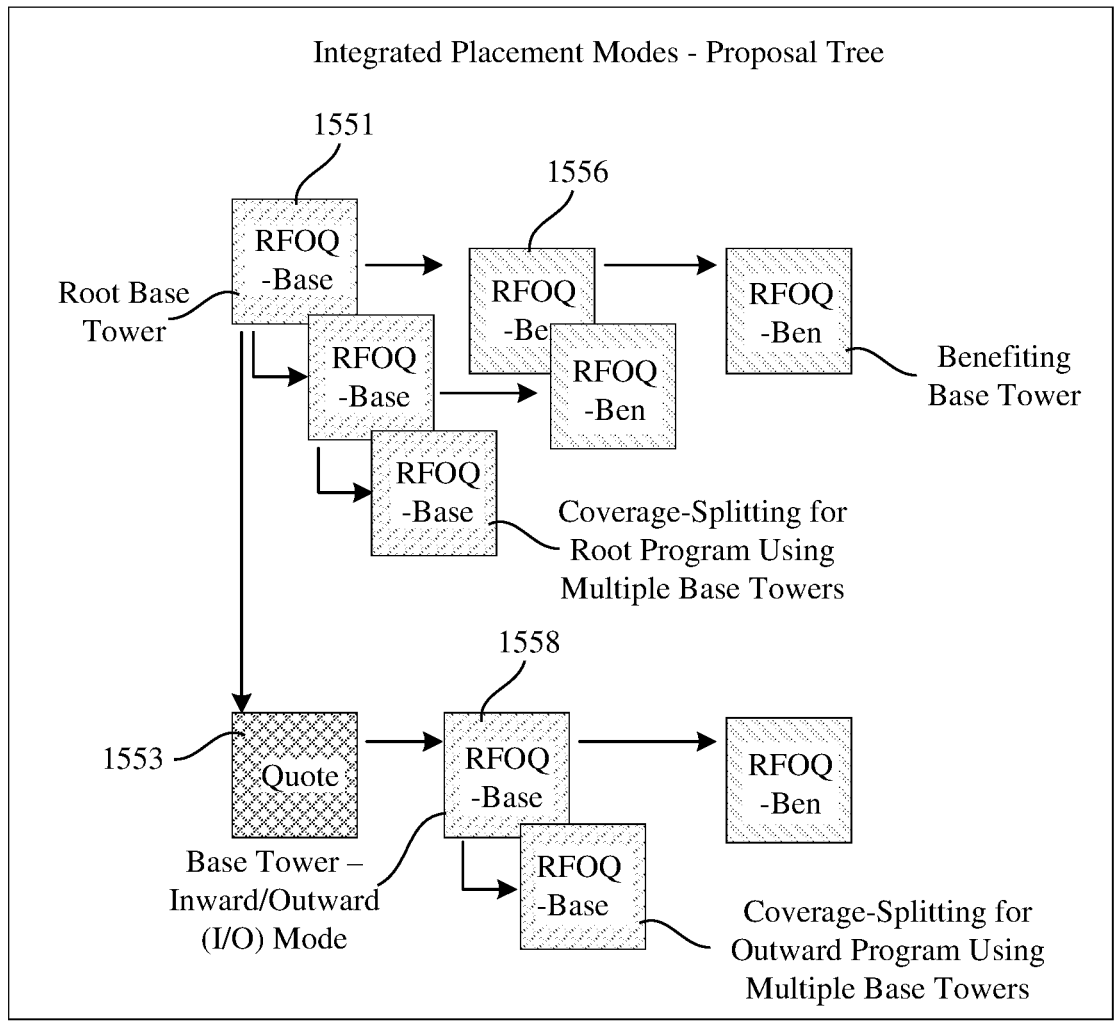
FIG. 15B illustrates how linking inward and outward parts of a complex insurance or reinsurance program is related to managing split insurance or reinsurance coverages within the same complex program.

FIG. 15A illustrates the integration of the placement mode technology for linking and nesting outer and inner layer share part objects with other technologies that are used to link inuring and benefiting insurance coverages, and inward and outward insurance coverages. Through the careful integration of these three placement modes, the broker can manage outer and inner structures without any disruption to the linkages previously formed using either of the remaining placement modes. Meshed together within a unified graphical computing structure, these three placement modes collectively function as a single, integrated risk sharding device.

FIG. 15A illustrates the integration of the placement mode technology that links an outer tower object to one or more nested, inner objects using ghosted representations 1521 or interactive representations 1527 of the inner requests for proposals (RFP) or quotes, along with other placement mode technologies disclosed.

Each insurance or reinsurance program is formed when the broker initially enters proposals, and links between related proposals, thereby gradually building out a proposal hierarchy as shown in FIG. 15B. The recursive metadata structures used to link individual proposals 1551, 1553, 1555, 1558 into a proposal tree are indicated in the proposal schema 155 detailed in FIG. 1B. As program scope and complexity grow, the proposal hierarchy similarly grows, and its extensions can potentially span all three of the placement modes described in these use cases, including the modes linking outer and inner proposals, inuring and benefiting proposals, and inward and outward proposals. The use of similar data structures for all three placement modes underpins the technology's ability to manage these intricate, specialized placement modes using highly similar workflows and visualizations, as shown by FIG. 15A.

Once formed, these high-level proposal linkages are in turn used to automate further associations between related policies, coverages and premiums being negotiated and bound between the parties within the same program, or even between programs. These additional objects also form recursive relationships, and are assembled into their own tree-like structures that are parallel to the proposal hierarchy illustrated in FIG. 15B. Policy, coverage, and premium metadata are included in the policy schema 164, coverage schema 176 and premium schema 177 contained in FIG. 1B. By combining the use of the proposal, policy, coverage and premium linking relationships, the technology can make extensive use of metadata inheritance to ease GUI data entry requirements, as well as metadata validation to control the quality of metadata entered into the placement database 377.

Use Case #2: High-Value Risk Placement by Constructing a Nested, Inner Tower that Enables Placement of a Subscription Coverage The schema in FIG. 1B also can be applied to capture subscription coverages and to generate GUIs for graphical computing of subscription placements. Placement of a subscription coverage for facultative reinsurance provides another worked example of benefits of the disclosed graphical computing. In this application, a first object 564 represents an expandable subscription placement; at least one of the second objects 566 grouped under the first object represents a lead subscription; and a plurality of additional second objects 567, 568 also grouped under the first object represent following market subscriptions.

In this example, the broker, after consultation with the facultative reinsurance buyer for an insurance carrier that has written a large property risk portfolio, uses the tool to enter USD 1,000,000 as the risk to be placed (RTBP) layer limit metadata, along with USD 0 as the RTBP layer retention metadata, in the placement database 377. The tool uses these upper and lower bounds to correctly scale the display panel 223, which includes the tower representing the facultative reinsurance program to be placed. The RTBP is accepted and displayed as a request for open quotation (RFOQ).

Suppose, after an initial reinsurance market assessment, the broker concludes that placement of a 90% excess layer within the facultative reinsurance tower is needed to satisfy the buyer's requirement for ceding off a significant portion of its property catastrophe risk to reinsurance carriers. To place the excess facultative reinsurance layer as a subscription coverage, in which multiple reinsurers participate on the same or similar terms, the broker uses the tool to prepare a request for proposals (RFP) that is specified as a request for lead quote (RFLQ) described as '90% part of USD 150,000 in excess of 250,000 per occurrence' to be sent to interested reinsurers. The broker uses the GUI to enter information concerning the RFP into the placement database 377, including setting the proposal type metadata to 'RFLQ', the coverage attachment basis metadata to 'per occurrence', and the layer quote basis metadata to '100%', and by entering the coverage layer limit USD 150,000 metadata, layer retention USD 250,000 metadata, and risk percentage 90% metadata. FIG. 4A illustrates the process for entering RFP metadata into the placement database 377.

When the broker enters the request for proposals (RFP) metadata into the GUI for the placement database 377 and submits that information, the tool creates a layer share part object 564 that visually represents the RFP and displays it in its correct vertical and horizontal position within the display panel 223. The position of the layer share part object 564 represents the coverage limit and retention metadata values of the RFP entered into the placement database 377.

At this stage, when the broker views the display panel 223, the tool depicts the original request for proposals (RFP) as the outer tower, which encloses the RFP layer share part object 564, including the request for lead quotation (RFLQ) that was last entered by the broker. The broker uses the GUI to select the enclosed, inner RFP by clicking on the RFP layer share part object 564, and then clicks on the 'Next Inner' control in the tower command mode area 534 to expand the RFLQ object to fill the entire tower area in the same display panel 223. The expanded RFLQ object can replace, or be displayed side-by-side with, the prior tower. The broker can later click on the 'Next Outer' control in the tower command mode area 534 to return from the inner tower object to the outer tower object representing the original RTBP.

Figure 5B:
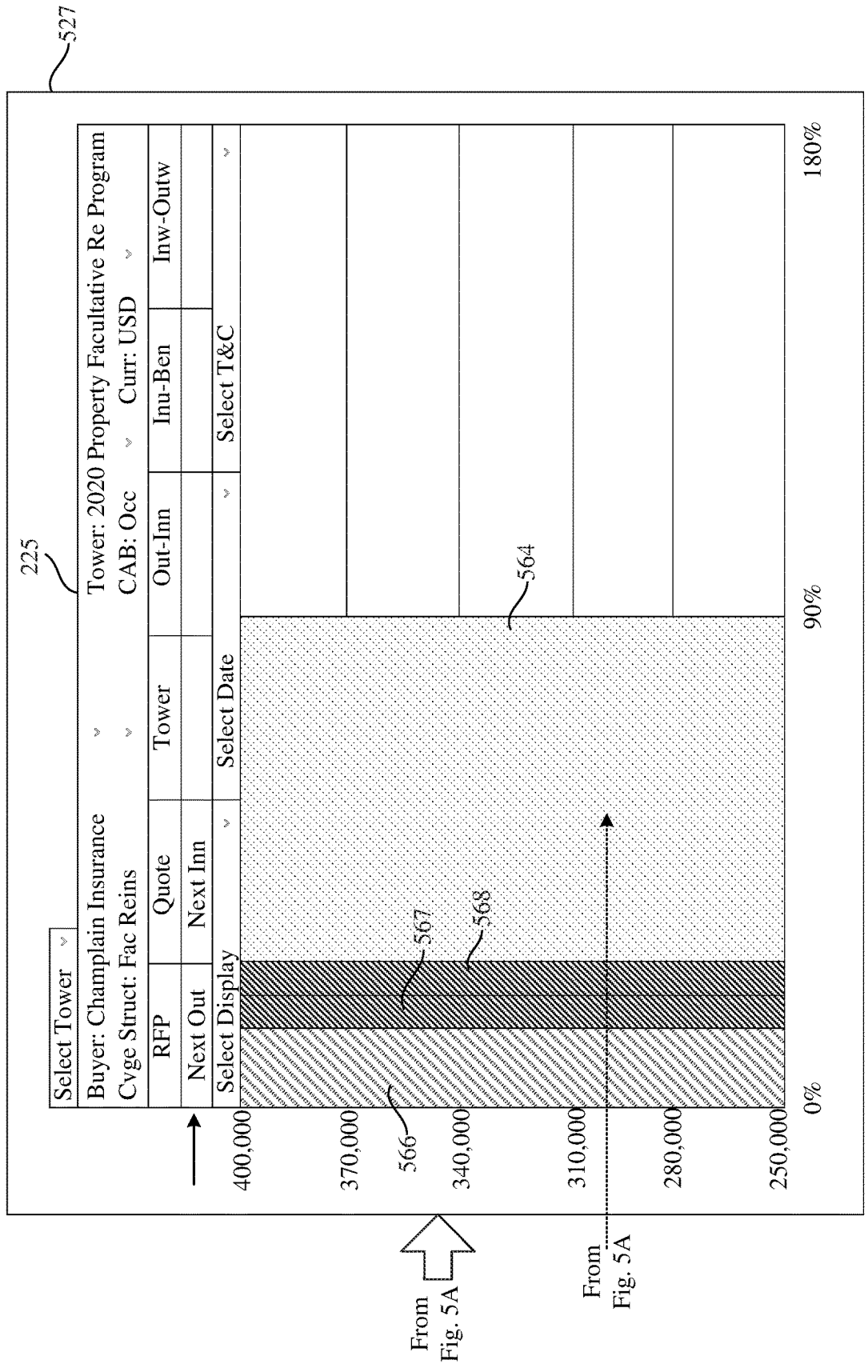

FIG. 5B illustrates the risk percentage for the RFLQ used by the reinsurance broker to place the excess facultative reinsurance layer as a subscription coverage on behalf of the insurance carrier. The broker can use the tool to create one or more lead quotes 566 or following quotes 567, 568 within the request for lead quotation (RFLQ) 564 used to place the excess facultative reinsurance coverage. Since the broker has previously specified '100%' layer quote basis metadata for the RFLQ, the risk percentage entered by the broker into the placement data table 377 for each 566 or following quote 567, 568 is defined in relation to the risk percentage specified for the original RTBP in the placement. If the broker creates any lead quote 566 or following quote 567, 568 within this RFLQ 564, the visual interface displays a ghosted representation of each new lead quote or following quote within the RFLQ 564 that is displayed in the base tower object. In this case, when broker receives a lead quote, and enters 15% risk percentage metadata for the lead quote in the placement data table 377, the lead quote 566 is visually displayed as a 15% part of the RFLQ 564, and also as a 15% part of the original RTBP that defines the base tower object.

Alternatively, if the broker previously specified 'P/O' layer quote basis metadata for the RFLQ, the risk percentage entered by the broker into the placement database 377 for each lead quote or following quote is defined in relation to the risk percentage previously specified for the associated RFLQ, and not in relation to the risk percentage specified for the original RTBP in the placement data table. FIG. 23A illustrates how a broker specifies 'P/O' layer quote basis metadata 2325, and then enters the risk percentage for the whole facility as a 30% part of the original risk to be placed (RTBP) 2321, and the risk percentages for the individual participating facility markets 2321, which must total to 100% so that the insurance facility can provide its full share of capacity when it is placed into other risks.

FIG. 23B illustrates another subscription coverage placed to form an insurance facility 2357. When a broker binds the insurance facility 2357 for a 60% share of the risk to be placed (RTBP), and the lead quote 2377 for the insurance facility 2357 has assumed a 25% risk percentage of the 100% total facility share specified in the placement database 377, the lead quote is visually displayed as a 25% part of the RFLQ representing the whole insurance facility 2357, but only a 15% part of the original RTBP that defines the base tower.

Where the outer and inner nesting relationship is tied to particular proposal type metadata, in this case an outer proposal specified with 'RFLQ' metadata and inner proposals specified with 'Lead Quote' and 'Following Quote' metadata, certain metadata types can be automatically entered into the placement database 377 based solely on the relationship specified between the linked proposals. Moreover, specialized technology can be applied to the insurance or reinsurance transaction type represented by the linked proposals. For example, in this use case, technology can be used to automate the allocation of risk percentages across the lead quotes and following quotes responding to the 'RFLQ' proposal type to improve the efficiency of the placement process.

Use Case #3: High-Value Risk Placement by Constructing a Follow-Form Tower that Enables Placement of a Stack of Vertical Layer Nesting applies to layers within a tower, as well as shares within a layer. Placement of a follow-form tower for an insurance program provides another worked example of a placement that benefits from this graphic computing, with nesting of vertically stacked layers within a tower, as shown, for instance, in FIG. 7A. In this application, a first object represents an expandable follow-form placement, in a tower 743. At least one of the second objects grouped under the first object represents a primary coverage 781 provided by one or more insurance carriers, and a plurality of additional second objects 771 also grouped under the first object represent a stack of excess coverage layers 771 provided by one or more insurance carriers.

The insurance broker, after consultation with the insurance buyer for a large corporation, determines the need to place a casualty insurance program that provides USD 1,000,000 of insurance protection for the corporation. Since the risk exceeds the capacity of any single insurance carrier, the broker concludes the insurance program should be subdivided into a stack of vertical layers enabling placement of the risk with different insurance carriers.

The insurance broker uses the tool to enter USD 1,000,000 as the risk to be placed (RTBP) layer limit metadata, and USD 0 as the RTBP layer retention metadata in the placement database 377. The tool uses these upper and lower bounds to correctly scale the display panel that includes the tower 243 representing the insurance program to be placed.

FIGS. 6A, 6B and 6C illustrate common process elements of follow-form coverages. As shown by FIG. 6A, follow-form placements typically begin with placement of a request for primary quote (RFPQ) 253, and continue with the placement of a primary coverage 273 situated at the bottom of tower, and later continue with the placement of excess layers 263 through the middle and upper regions of the risk tower 243. As illustrated in FIG. 6B, once pricing has been established for the primary coverage, pricing for excess layers can be benchmarked against primary coverage pricing. As shown in FIG. 6C, since follow-form placements are designed to provide uniform coverage within the whole program, brokers and buyers can benefit from tools that help them identify potential coverage gaps arising from divergent, inconsistent terms and conditions.

The broker enters information concerning the RFCP into the placement database 377 to subdivide the initial risk to be placed (RTBP) 243, and to prepare a request for coverage proposal (RFCP) to implement a follow-form coverage described as '100% part of USD 550,000 in excess of 50,000 per occurrence'. This includes using the GUI to set the proposal type metadata to 'request for primary quote (RFPQ)' 773 and the coverage attachment basis metadata to 'per occurrence', and by entering the coverage layer limit USD 550,000 metadata, layer retention USD 50,000 metadata, and risk percentage 100% metadata into the placement database 377.

When the broker uses the GUI to enter metadata concerning the request for proposals (RFP) specified as a request for primary quote (RFPQ) 773 into the placement data table 377, and submits that information, the tool creates a layer share part object and visually represents this object and the RFPQ 773 in its correct vertical and horizontal position within the display panel 223. The position of the RFPQ object 773 reflects the coverage limit and retention metadata values of the RFPQ 773.

At this stage, when the broker views the display panel 223, the tool depicts the original request for proposals (RFP) functions as the outer tower, which encloses the RFP, specifically a request for primary quote (RFPQ) 773. The broker selects the enclosed, inner RFPQ from the GUI by clicking on the RFPQ 773, and clicking on the 'Next Inner' control in the tower command mode area 234 to expand the RFPQ 773 to fill the entire base tower area 243. The broker can later click on the 'Next Outer' control in the tower command mode area 234 to return from the inner tower to the outer tower representing the original risk to be placed (RTBP).

FIG. 10A and FIG. 10B illustrate the round-trip email distribution of any RFP selected by the broker. The broker can use the tool to email or otherwise distribute a request for primary quote (RFPQ) 773 to interested carriers by clicking on the RFPQ 773. The broker can select email addresses 1057 for the interested carriers and trigger emails 1052. The system uses tower metadata 1077 and RFPQ 1087 metadata from the placement database to generate the email, and distributes the email to the selected carriers. If the selected carrier indicates interest in the RFPQ 1087 by replying to the email, the system will automatically create a new primary quote 1085 that corresponds to the original RFPQ 1087, and position the primary quote for display within the associated RFPQ 1087 in the tower request for proposals (RFP) 241 situated in the base tower area 243 of the display panel 223.

When the broker receives a primary quote from an interested insurance carrier, the broker enters the primary quote metadata into the placement database 377 by setting the proposal type metadata to 'Primary Quote', and entering the coverage layer limit USD 200,000 metadata, layer retention USD 50,000 metadata, and risk percentage 100% metadata. Due to its significance in pricing and administering the follow-form tower, the primary quote received, and any competing primary quote received from another carrier, is positioned at the bottom of the follow-form tower represented by the request for primary quotation (RFPQ) 773.

When the broker enters the primary quote metadata into the placement database 377 and submits that information, a layer share part that visually represents the primary quote 781 is created and displayed in its correct vertical and horizontal position within the tower base area 243 of the display panel 223. The position of the layer share part object reflects the coverage limit and retention metadata values of the primary quote 781.

Once the insurance broker has selected a primary quote, the broker receives and enters excess quotes that represent the stack of vertical layers within the follow-form tower until the tower is fully or partially occupied by the primary quotes and excess quotes. The broker enters the metadata for each excess quote into the placement database 377.

When the broker enters the excess quote metadata into the placement database and submits that information, a layer share part object that visually represents the excess quote 771 is created and displayed in its correct vertical and horizontal position within the base tower area 243 of the display panel 223. The position of the layer share part object reflects the coverage limit and retention metadata values of the excess quote 771.

Figure 7A:
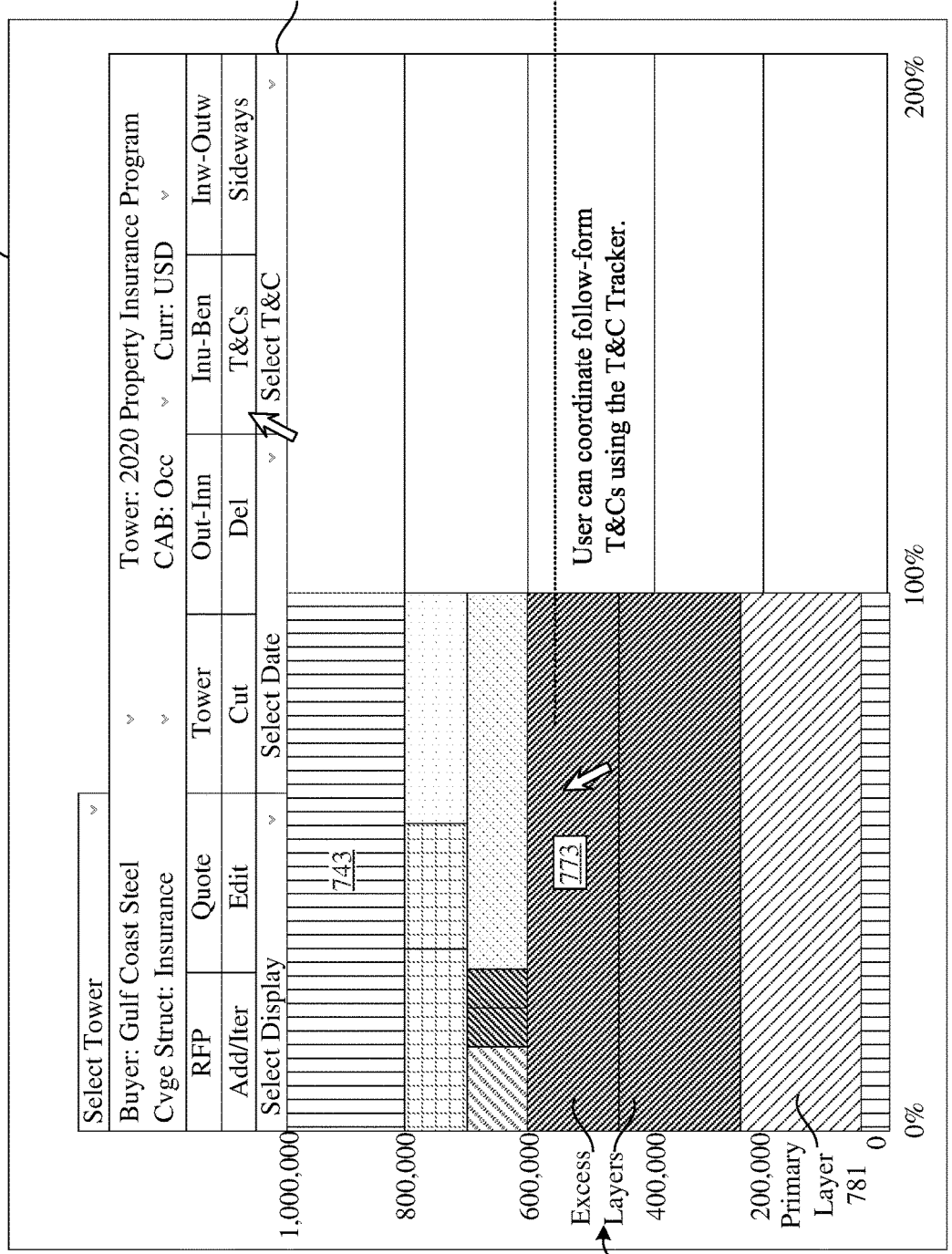

FIG. 7A illustrates the structure of a follow-form tower that includes a request for primary quote (RFPQ), a single primary quote, and two excess quotes. If the broker creates any primary quote or excess quote within the inner tower, the visual interface displays a ghosted representation of each new primary quote 781 or excess quote 771 within the RFPQ 773 that is displayed in the follow-form tower. This display structure is illustrated in FIG. 7A.

To prevent the occurrence of coverage gaps in a follow-form tower due to differential coverage terms and conditions, the broker can select a coverage, and click on the 'Tower Terms and Conditions' control in the tower command mode area 234 to add, edit or delete individual terms and conditions for the selected coverage. FIG. 17 shows a table and GUI used to flag terms and conditions associated with a primary quote 781, and with each excess quote 771. The GUI allows quick visualization of potential gaps.

Using the terms and conditions data table shown in FIG. 7B, the broker may compare each individual term and condition across all of the primary quotes 781 and excess quotes 771 positioned within the follow-form tower by using a data filter in the tower utility area 235 to select a term or condition to be reviewed, and by clicking on the 'Tower Terms and Conditions' control in the tower command mode area 234. The display of each primary quote 781 or excess quote 771 will be differentiated using colors or other markings 1763, 1765, 1767 based on the inclusion, partial inclusion using a sublimit, or exclusion of the selected term or condition. FIG. 17 shows a table and GUI for comparing terms and conditions across the primary and excess quotes 781, 771 contained in a follow-form tower.

Figure 16A:
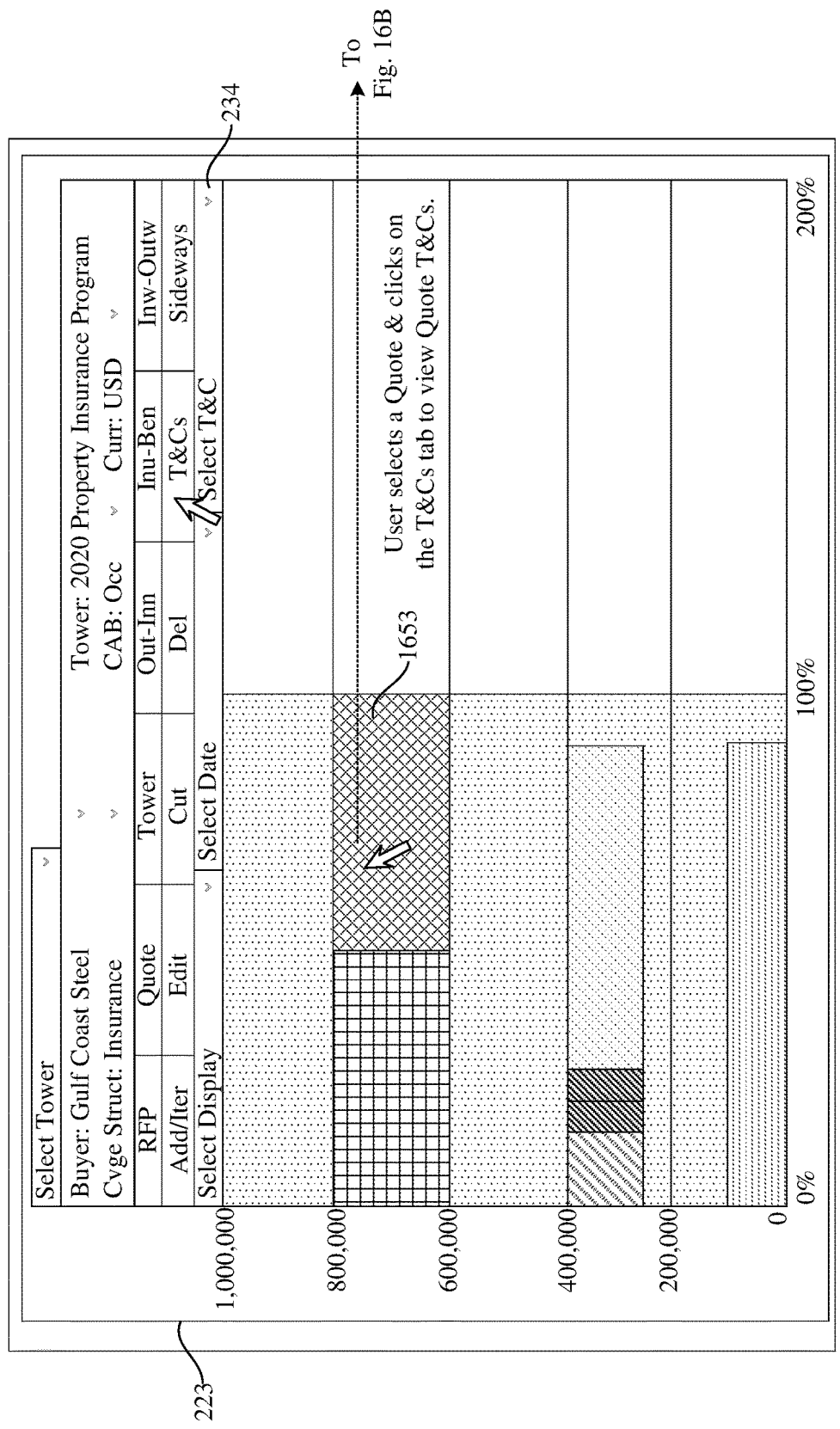

The broker and interested carriers may agree on the inclusion of certain terms and conditions that impose occurrence or aggregate limits on the layer limit specified for a coverage. The broker can manage these 'inner aggregate' terms and conditions on the coverage data entry table by clicking on the coverage 'Terms & Conditions' control in the tower command mode area 234 to access the 'terms & conditions' database, and adding, editing or deleting individual terms and conditions as necessary. FIG. 16A and FIG. 16B illustrate the management of occurrence and aggregate terms and conditions using the 'terms & conditions' database. FIG. 18A illustrates the display of a sideways tower that represents the inner aggregate terms and conditions entered into the coverage 'terms and conditions' database by the broker.

Figure 8A:
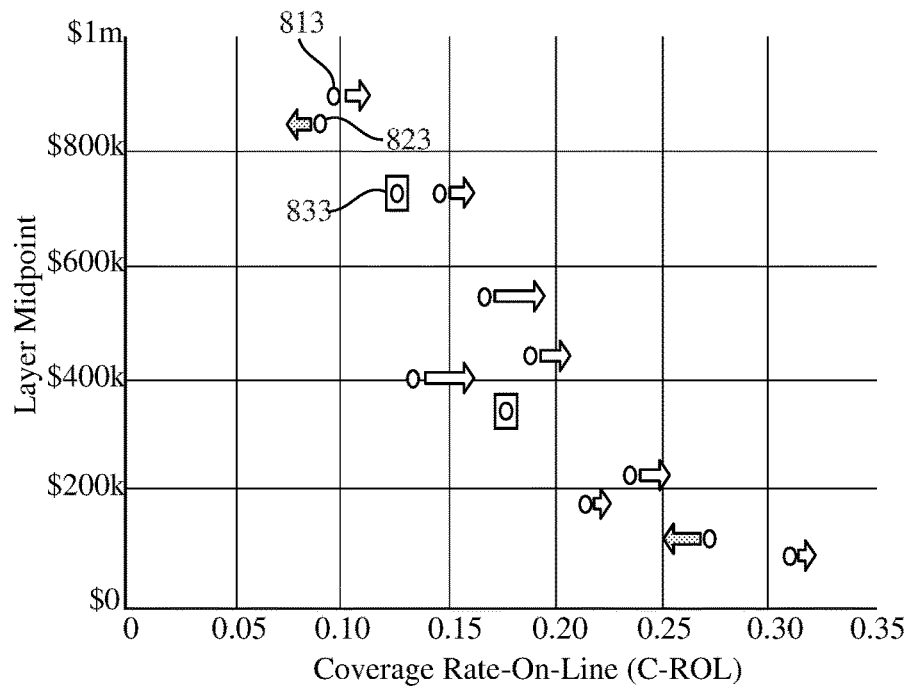
FIG. 8A depicts Year-To-Year pricings shifts.
Figure 8B:
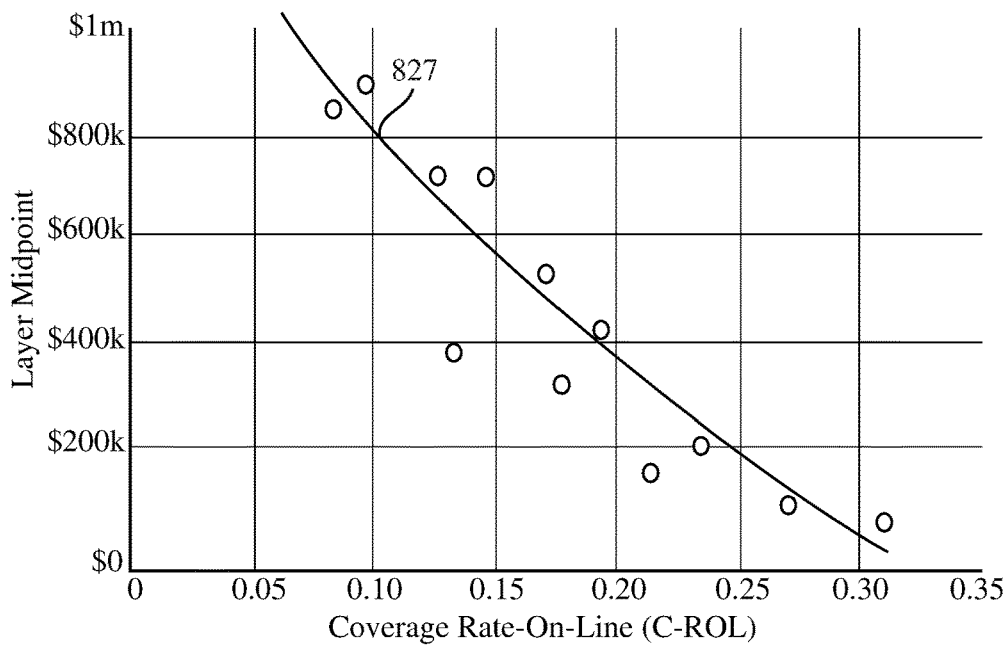
FIG. 8B is Layer Curve Fitting of FIG. 8A.

The broker can evaluate the pricing behavior for all of the primary quotes 781 and excess quotes 771 contained in the follow-form tower by clicking on the 'Analyze Layer Pricing' control in the tower command menu area 234 to access the layer pricing controls. FIGS. 8A and 8B illustrate the visualization displays that are used to evaluate year-to-year layer pricing trends 813, 823, 833, and fit pricing curves 827 across the premiums reported for all of the primary quotes 781 and excess quotes 771 contained in the follow-form tower.

Again, by linking outer and inner coverages within a particular insurance transaction form, in this case the follow-form risk transfer type, specialized technology can be applied to the inner structures nested within the request for primary quote (RFPQ) 773 proposal type. For example, as illustrated in FIG. 6B, technology can be used to automate the benchmarking of primary coverage pricing upwards through the stack of excess layers in the follow-form tower.

Use Case #4: High-Value Risk Placement Method that Enables Placement of Multiple, Split Coverages for a Complex Program The structure of the schema in FIG. 1B supports the spawning of split placements with coverages split between two towers of policies that can be placed with separate carriers and could, potentially, have different layering. Suppose, for example, that the broker, after consultation with the insurance buyer for a large corporation, is placing a complex property insurance program that provides insurance protection for a large property portfolio against a number of different perils, including earthquake exposure. After performing an assessment of available market capacity for different coverage business lines, including earthquake coverage, the broker concludes that the placement can be performed most efficiently by purchasing USD 1,000,000 in property insurance, split into two coverages, including an 'All-Risks excluding USA Earthquake' coverage and an 'USA Earthquake Only' coverage.

The insurance broker initially uses the GUI to add the risk to be placed (RTBP) by setting the coverage type metadata to 'All-Risks excluding USA Earthquake', and entering USD 1,000,000 as the risk to be placed (RTBP) layer limit metadata, USD 0 as the RTBP layer retention metadata, and risk percentage 100% metadata in the placement database 377. The tool uses these upper and lower bounds to correctly scale the display panel that includes the tower request for proposals (RFP) 241 representing the insurance program to be placed. When the broker enters the coverage metadata into the placement database 377 and submits that information, the tool generates a visualization of a layer share part that represents the tower RFP 241 specified as a request for open quotation (RFOQ) and displays it in its correct vertical and horizontal position within the base tower area 243. The position of the layer share part object reflects the coverage limit and retention metadata values of the RFOQ 241.

The broker can use the tool to generate one or more requests for proposals (RFP) 251 or quotes 261 within the request for open quotation (RFOQ) 241 used to place the 'all-risks excluding earthquake' insurance coverage. If the broker creates any RFP 251 or quote 261 within this RFOQ 241, the visual interface can display each new RFP 251 or quote 261 within the RFOQ 241 in its correct vertical and horizontal position within the base tower area 243 of the display panel 223.

To split the coverages for the complex program, the broker clicks on the 'Add Split RFP' control 237 in the tower command mode area 234 to add a new request for open proposal (RFOQ) 241 to be used for the placement of the 'earthquake only' insurance coverage. In this example, the broker uses the tool to prepare and send a request for proposals (RFP) for the earthquake part of the program as '100% part of USD 1,000,000 in excess of USD 0 per occurrence' to interested carriers. Upon the execution of this command by the broker, the system automatically spawns a new, split RFOQ 241 by setting the proposal type metadata to 'RFOQ' and the coverage attachment basis metadata to 'per occurrence, and entering the coverage layer limit USD 1,000,000 metadata, layer retention USD 0 metadata, and risk percentage 100% metadata in the placement database 377. These parameters can, of course, be edited. The RFOQ used for the placement of the 'USA Earthquake Only' insurance coverage can easily be generated using coverage metadata that mirrors the metadata for the 'All-Risks excluding USA Earthquake' insurance coverage, thereby reducing the chance of any hidden coverage gaps between the two split coverages that are intended to be complementary.

When the broker enters the coverage metadata into the placement database 377 and submits that information, the tool produces a layer share part object that visually represents the request for open quotation (RFOQ) 241 that is displayed in its correct vertical and horizontal position within the base tower area 243 of the display panel 223. The position of the layer share part object reflects the coverage limit and retention metadata values of the RFOQ 241.

Figure 9:
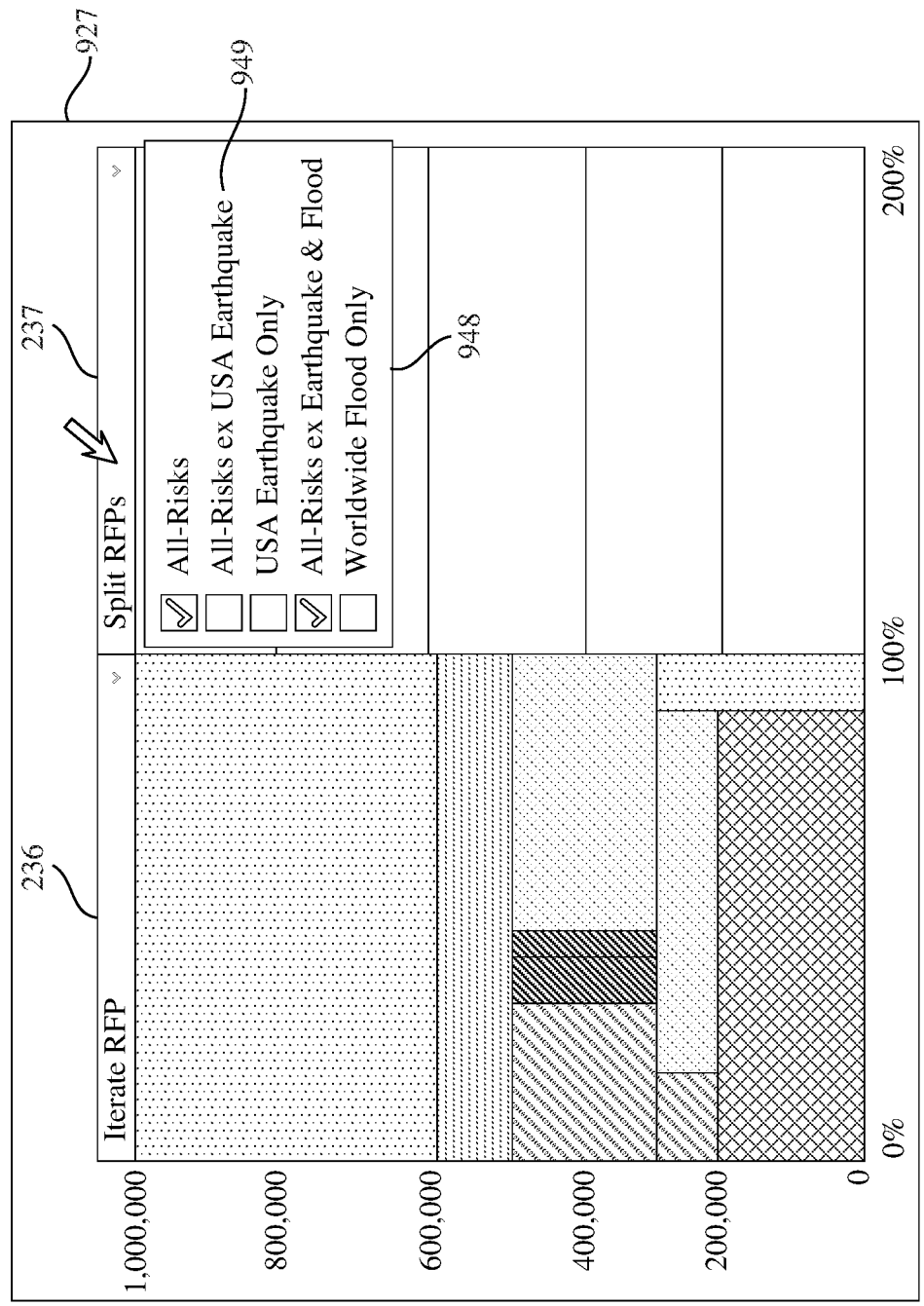
FIG. 9 illustrates a tower for split coverages that includes requests for proposal (RFP) 251 and quotes.

The broker can use the tool to create one or more requests for proposals (RFP) 251 or quotes 261 within the request for open quotation (RFOQ) 241 used to place the 'earthquake only' insurance coverage. If the broker creates any RFP 251 or quote 261 within this RFOQ 241, the visual interface can display each new RFP 251 or quote 261 within the RFOQ 241 in a correctly scaled vertical and horizontal position within the base tower area 243. FIG. 9 illustrates a tower for split coverages that includes requests for proposals (RFP) 251 and quotes 261.

Once a broker has added one or more split coverages to a complex insurance program, the broker can use the tool to place the 'earthquake only' coverage, or any other split coverage, by clicking on the 'Split RFP' control 237 in the tower utility area 235, and electing the 'USA Earthquake Only' request for proposals (RFP) value 949, or any other split coverage of interest 949, from the list provided in the 'Split RFP' pull-down/pop-up or other interface 948 to retrieve and display the RFP in the base tower area 243. This RFP is specified in the placement database as a request for open quotation (RFOQ) 241, and the system scales it to fill the entire base tower area 243 of the display panel 223.

The broker can use the GUI and its 'Split RFP' control 237 in the tower utility area 235 to retrieve and display a request for open quotation (RFOQ) being used to place a different split coverage 948, 949, or alternatively return to the original RFOQ being used to place the 'All-Risks excluding USA Earthquake' coverage 948, 949 using the same control 237.

Figure 20A:
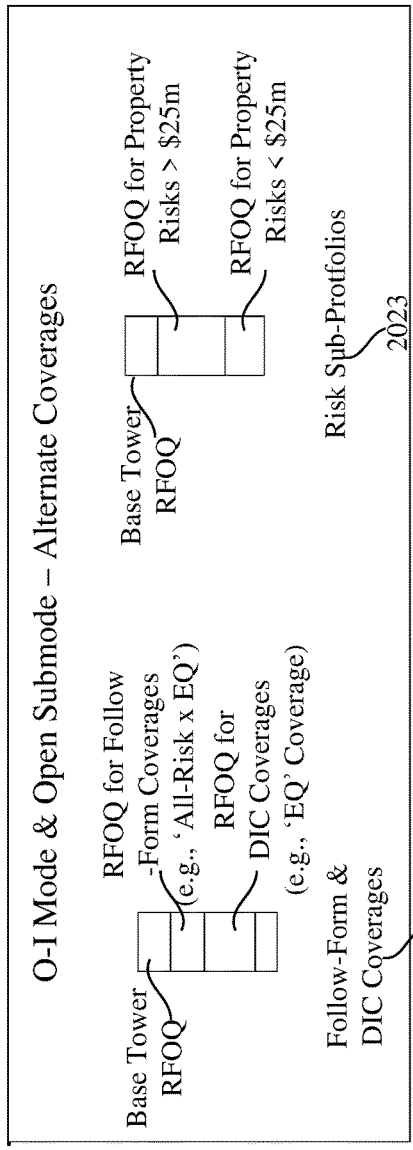
FIGS. 20A and 20C illustrate overlaid and side-by-side display of multiple requests for open quotation (RFOQ).
Figure 20C:
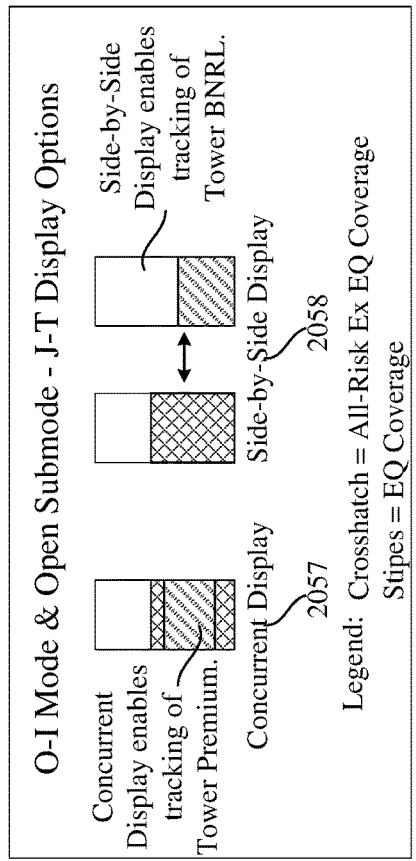

FIGS. 20A and 20C illustrate overlaid and side-by-side display of multiple requests for open quotation (RFOQ). The overlay display is illustrated in FIG. 20A, 2021, 2023 with split coverages within the same display panel 223. An alternative side-by-side display is shown in FIG. 20C, 2058B with separate, juxtaposed displays of multiple requests for open quotation used to represent split coverages 2058, compared with juxtaposed against concurrent display 2057. FIG. 1D provides another illustration of a stack of split coverages added for the same program is provided by FIG. 1D.

The split coverages placed by the broker will include different terms and conditions to be tracked by the broker. To implement the terms and conditions for each coverage, a broker will use the GUI to select a coverage by clicking on the coverage, and clicking on the 'Tower Terms and Conditions' control in the tower command mode area 234 to access the 'terms and conditions' database allowing the user to add, edit or delete individual terms and conditions for the selected coverage. Flagging of divergent terms and conditions for split coverages is illustrated by FIG. 17.

Use Case #5: High-Value Risk Placement for a Complex Program that Includes a Series of Inuring and Benefiting Coverages Inuring and benefiting is an obscure insurance industry terminology that is easily misunderstood and that benefits greatly from tracking, analysis, and visualization. Without describing priority among reinsurance recoveries for a normal mix of treaty and facultative type reinsurance coverage, it is possible for an insurer to recover more from reinsurers than it pays out to a policy holder. Inuring clauses are used to clearly express the intended results and eliminate double recovery. However, the wording differences in policies that produce widely divergent results can be as subtle as whether a reinsurance policy 'inures to the benefit of the insurer' or 'inures to the benefit of another reinsurance policy'. The technology disclosed includes tracking and visualization of inuring and benefiting relationships in towers, including reinsurance towers.

The next worked example involves tracking the ordering of recovery from a complex series of inuring and benefiting treaty reinsurance coverages for an insurance carrier. Suppose, after consultation with the treaty reinsurance buyer for an insurance carrier, a reinsurance broker concludes that the insurance carrier will require a complex treaty reinsurance program comprising a number of related treaty coverages. The broker notes that this complex program will need to arrange and place coverages that have different indemnity priority for premium and claim payments made by the participating reinsurance carriers, including certain treaty reinsurance coverages that inure to the benefit of other treaty reinsurance coverages.

The reinsurance broker uses the GUI initially to enter USD 1,000,000 as the risk to be placed (RTBP) layer limit metadata, and USD 0 as the RTBP layer retention metadata in the placement database 377. These upper and lower bounds enable the tool to correctly scale the tower object representing the inuring treaty reinsurance program to be placed by the broker. The RTBP object is automatically created, and the tool scales the object for display as a request for open quotation (RFOQ) 241 in the base tower area 243.

Figure 12A:
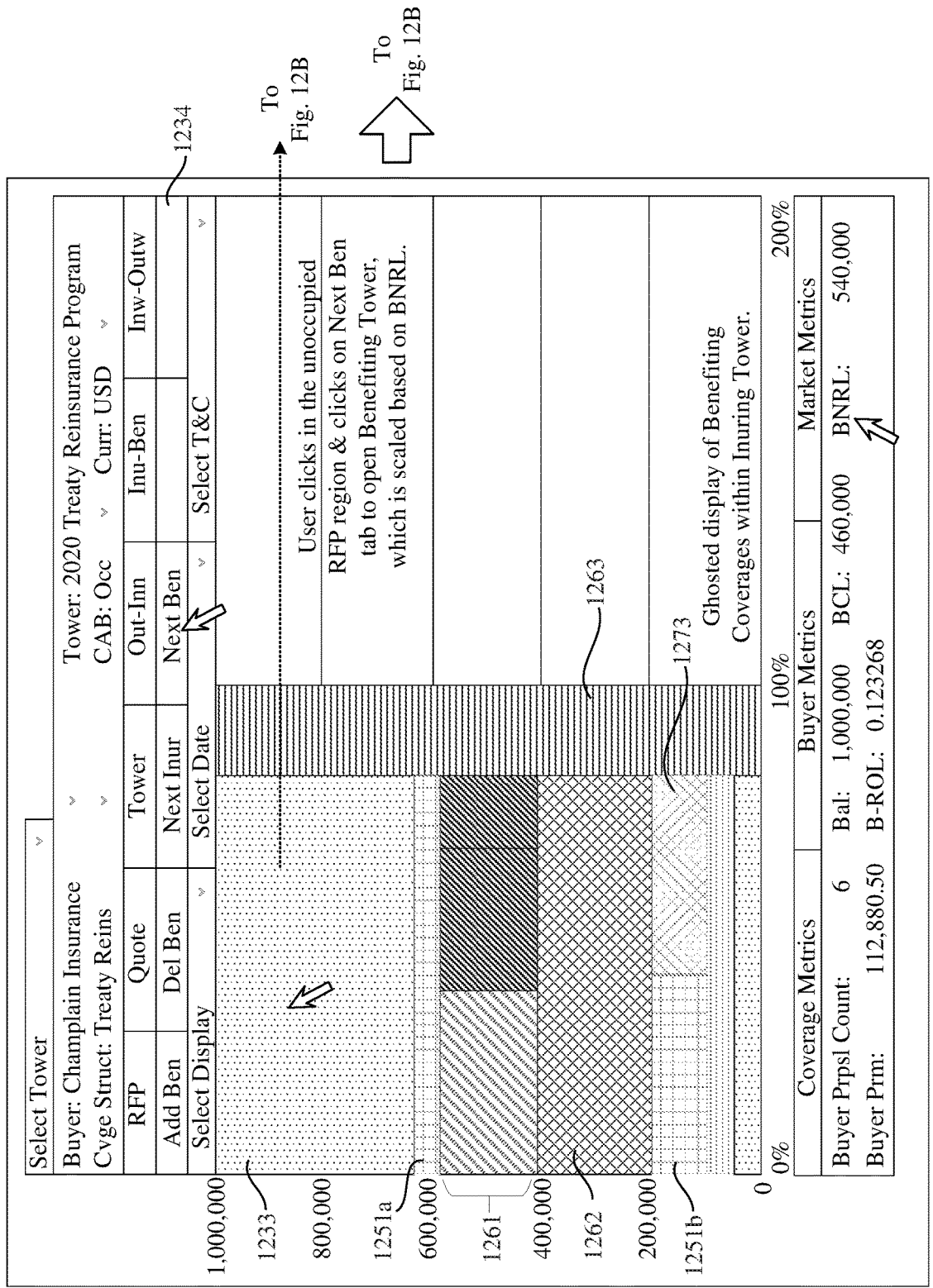
FIGS. 12A and 12B illustrate the Inuring-Benefiting structuring mode to coordinate complex inuring and benefiting coverages.

The broker can use the tool to create one or more requests for proposals (RFP) or quotes 1261, 1262, 1263 within the request for open quotation (RFOQ) 241 used to place the inuring treaty reinsurance coverages to be included in the complex program. If the broker creates any RFP or quotes 1261, 1262, 1263 within this RFOQ 241, the visual interface can display a layer share part object that represents each new RFP or Quote 1261, 1262, 1263 within the RFOQ 241 in its correct vertical and horizontal position within the base tower area 243. In this example, these inuring coverages, comprising quote share treaty reinsurance 1263, excess of loss treaty reinsurance 1262, and a second excess of loss treaty reinsurance placed as a subscription coverage 1261, provide a total of USD 460,000 in insurance protection, as illustrated in FIG. 12A.

Figure 12B:
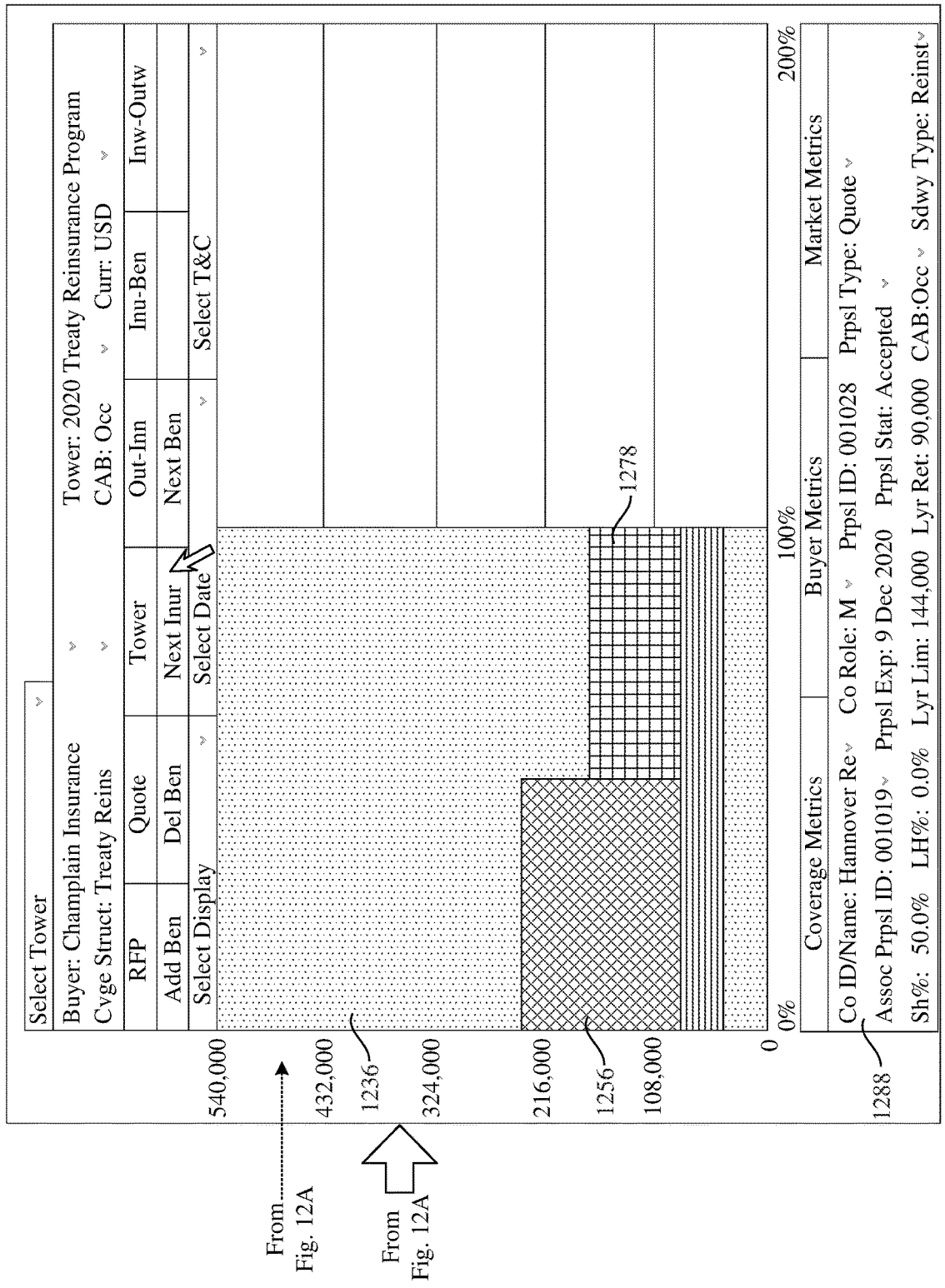

To express this structure in the contract wording commonly used by the industry, these inuring coverages 1261, 1262, 1263 would 'inure to the benefit of the ceding carrier' since they are assigned a greater inuring priority than the benefiting coverages included in FIG. 12B, and any reinsurance claim payments due to the insurance carrier will be fully paid, and not reduced by other reinsurance, including any reinsurance ultimately placed and included in the benefiting tower 1236. Some contract wordings will provide instructions that these other reinsurances 'should be disregarded' for the purposes of determining the claim amounts due to the insurance carrier.

Once the inuring treaty reinsurance coverage is placed, the broker implements the inuring and benefiting program structure by clicking on any location within the unoccupied region 1233 of the inuring tower object, and clicking on the 'Next Benefiting' control in the tower command mode area 1234 to open a new benefiting tower 1236. To scale the benefiting tower 1236, the system will calculate the buyer net retained line (BNRL) metadata for the inuring tower, and set the coverage limit for the benefiting tower 1236 equal to the BNRL. In the illustration provided by FIG. 12A, since the inuring tower has been entered with USD 1,000,000 layer limit, and the broker has previously placed a USD 460,000 of inuring treaty reinsurance coverage, the BNRL metadata is calculated as USD 540,000, and this amount is used to define the tower coverage layer limit for the benefiting tower 1236.

When the broker uses the GUI to add the benefiting tower, the information concerning the new request for proposals (RFP) is automatically entered into the placement data table by setting the proposal type metadata to 'RFOQ, the proposal mode metadata to 'Benefiting' and the layer quote basis metadata to 'I/R/O', and by entering the coverage layer limit USD 540,000 metadata, layer retention USD 0 metadata, and risk percentage 100% metadata. FIG. 11A shows an example of how the metadata 1121, 1123, 1127,1129 for the request for open quote (RFOQ) representing the benefiting tower object is entered into the placement database.

When the broker enters the metadata for the request for open quotation (RFOQ) 1236 representing the benefiting tower, a layer share part object that visually represents the benefiting tower is created and displayed in its correct vertical and horizontal position within the base tower area 243 of the display panel 223. The position of the layer share part object representing the benefiting tower 1236 reflects the coverage limit and retention metadata values of the RFOQ.

Figure 11B:
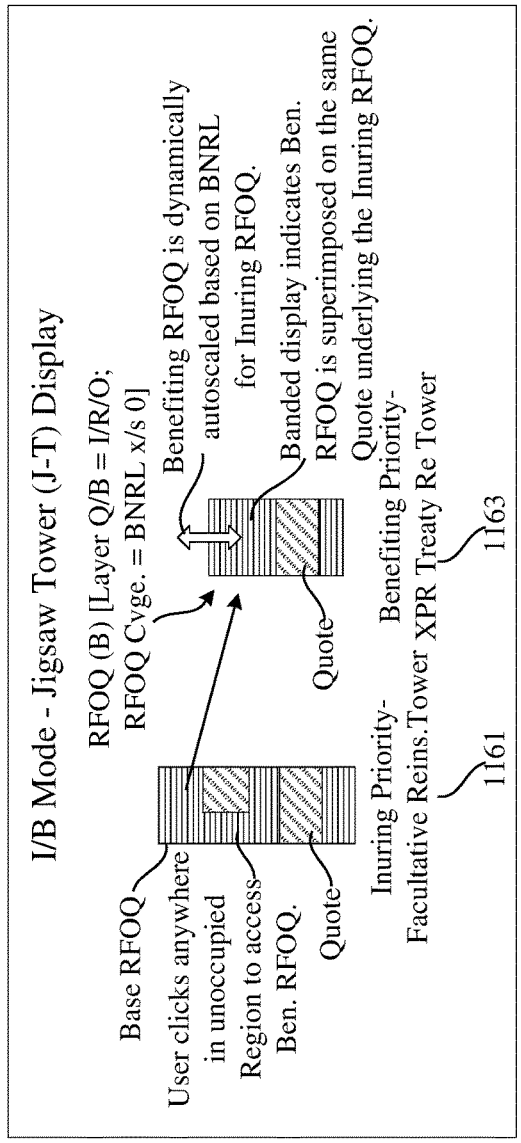
FIG. 11B shows a pair of inuring and benefiting towers.
Figure 11C:
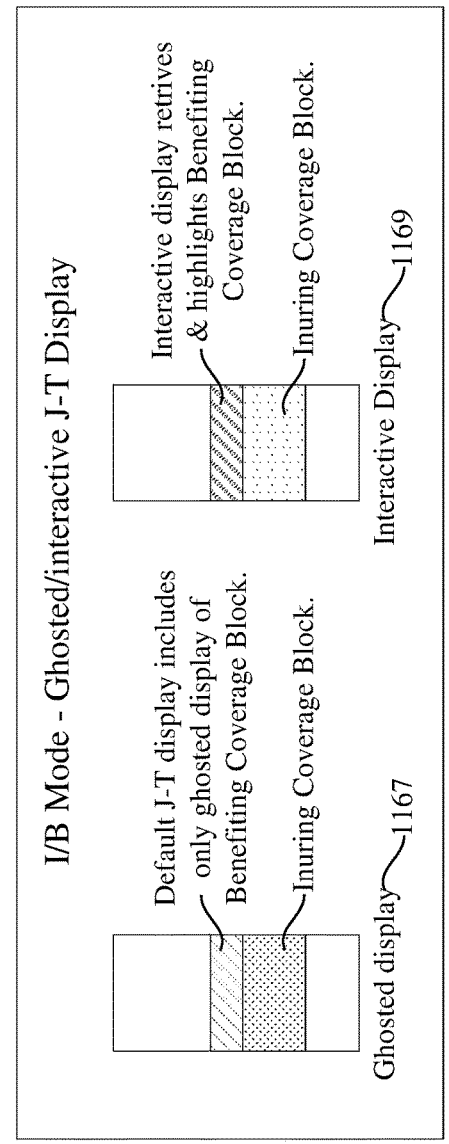
FIG. 11C shows alternative display methods for providing for a ghosted display or an interactive display of benefiting RFPs and quotes within the inuring tower object.

As illustrated in FIG. 11B, once these linked inuring and benefiting towers are formed, the broker can access the linked, benefiting tower at any time by clicking on the unoccupied region of the inuring tower 1161, and clicking on the 'Next Benefiting' control in the tower command mode area 1234 to display the linked RFOQ 1163 representing the benefiting tower object, which is expanded to fill the whole base tower area 243 within the display panel 223. The broker can click on the 'Next Inuring' control in the tower command mode area 1234 to return from the benefiting tower object to the inuring tower object representing the original risk to be placed (RTBP).

A brief explanation of FIG. 12A and FIG. 12B, and their differential treatment of inuring and benefiting coverages, may be helpful. In the event a USD 1,000,000 claim were to be presented by the insurance carriers to all of its reinsurers, both inuring and benefiting reinsurers, the claim would initially be paid by the reinsurers providing the benefiting coverages only because these coverages have lower attachment points than all of the inuring reinsurances. These benefiting coverages, originating in the benefiting tower, and displayed as ghosted representations 1273, 1251*b* positioned beneath all of the inuring coverages 1261, 1262, 1263 in the inuring tower, would make USD 150,000 in claim payments for the layer beginning at USD 50,000 and extending upwards to USD 200,000.

Once the USD 200,000 tower level is reached, however, the inuring coverages 1261, 1262, 1263 would step in front of the benefiting coverages 1273, 1251*b* based on their inuring priority, and would begin to make claim payments from the USD 200,000 tower level upwards to the USD 600,000 tower level, at which point these inuring coverages 1261, 1262, 1263 would be fully exhausted. With inuring coverage recoveries now complete, the insurance carrier would return to the benefiting reinsurers and request further claim payments for any benefiting reinsurance that has not yet been fully exhausted 1251*a*, or has not yet attached due to a higher its layer retention. In this example, one such benefiting coverage began to pay 1251*b*, but was not yet fully exhausted when the inuring coverages 1261, 1262, 1263 assumed inuring priority. As a result, and this benefiting coverage 1251*a* has not yet been fully exhausted, and would therefore be required to resume claim payments for the narrow, ghosted layer 1251*a* shown above the inuring coverages 1261, 1262, 1263 in the tower. Using ghosted representations for the benefiting coverages 1251*a*, 1251*b*, 1273, the inuring tower display in the inuring tower differentiates between the inuring coverages, which take precedence in both premium and claim payment priority, and the benefiting coverages, which are relegated to lower inuring priority.

Once the benefiting tower object is created, the broker can create one or more requests for proposals (RFP) 1256 or quotes 1278 within the request for open quotation (RFOQ) 1236 representing the benefiting tower object that is being used to place the benefiting treaty reinsurance coverages to be included in the complex program. If the broker creates any RFP 1256 or quote 1278 within this RFOQ 1236, the visual interface displays a layer share part object for each new RFP 1256 or quote 1278 within the RFOQ 1236 in its correct vertical and horizontal position within the base tower area 243 of the display panel 223. These various benefiting coverages are illustrated in FIG. 12B.

If the broker creates any request for proposals (RFP) 1256 or quote 1278 within the benefiting tower, the visual interface displays a ghosted representation of each RFP 1273 or quote 1251*a*, 1251*b* within the unoccupied region 1233 of the request for open quotation (RFOQ) representing the inuring tower object. Since inuring coverages always take premium and claim precedence over benefiting coverages, the ghosted representations of the benefiting coverages 1251*a*, 1251*b* are sometimes displaced and fragmented into multiple parts when displayed and ghosted within the inuring tower. Display methods providing alternatively for either a ghosted display 1167 or an interactive display 1169 of benefiting RFPs 1273 and quotes 1251*a*, 1251*b* within the inuring tower object are described in FIG. 11C.

The process for linking and nesting inuring and benefiting layer share part objects described in this example can be repeated recursively to enable the management of additional inuring and benefiting priority levels. An insurance carrier's reinsurance will commonly include inuring facultative reinsurance that applies to individual risks or policies, followed by quota share treaty reinsurance, followed by excess of loss treaty reinsurance, and even other reinsurance. The program may also need to set forth additional inuring priorities for more aggregate forms of reinsurance such as aggregate excess, stop-loss or whole account reinsurance protection.

To extend the current example, the broker can click anywhere within the unoccupied region of the benefiting tower 1163, and then click on the 'Next Benefiting' control to form a new request for proposals (RFP) that fills the entire base tower area 243 in the display panel 223. In this way, any third objects added within the new RFP are fully contained within the second object within which they are nested. This tool linking inuring and benefiting coverages enables a broker to apply graphical computing to the most complex, dynamic reinsurance placed by insurance carriers and brokers, and greatly reduce the inefficiency associated with the placement and administration of these programs.

FIG. 15A illustrates the integration of the placement mode technology for linking and nesting inuring and benefiting layer share part objects with other technologies that are used to link outer and inner insurance coverages, and inward and outward insurance coverages. By meshing these three placement modes, this graphical computing tool functions as a single, integrated risk sharding device.

FIG. 15A illustrates the integration of the placement mode technology that links an inuring tower object to one or more nested, benefiting objects using ghosted representations 1541 or interactive representations 1536 of the inner requests for proposals (RFP) or quotes, along with other placement mode technologies disclosed. FIG. 15B shows how the technology disclosed that is used to link inuring and benefiting parts of a complex insurance or reinsurance program is related to the technology disclosed that is used to manage split insurance or reinsurance coverages within the same complex program.

Use Case #6: High-Value Risk Placement for a Complex Program that Includes Linked Inward Insurance and Outward Reinsurance Coverages The difference between outer and inner towers, described in use case #1, and inward insurance followed by outward reinsurance, described in this use case, deserves a few words. Outer and inner towers are used to zoom into subparts of a placement, such as leading and following support for a subscription policy or layered policies in a follow-form tower. In contrast, linked inward insurance and outward reinsurance coverages are successive placements, in which insurance carriers cede part of the risk they have previously assumed, or plan to assume, to facultative or treaty reinsurers. The insurance and reinsurance are successive placements, not constituent parts of a single thing. Inward refers to the initial insuring of risk, and outward the concurrent or subsequent ceding of the risk to a reinsurer.

The benefits of this graphic computing can be understood by its application to linkage between an inward corporate risk underwritten and assumed by an insurance carrier, and outward placement of some portion of the same risk with reinsurance carriers. In this use case, an insurance carrier is interested in writing an insurance coverage for a large corporation, but is concerned that the risk to be assumed by the carrier may exceed its financial capacity or risk concentration standards. As a result, the insurance carrier retains a reinsurance broker to place a facultative reinsurance policy enabling the carrier to cede off some portion of the risk to be assumed in connection with the corporate account.

In the inward phase, the insurance broker placing the risk with the insurance carrier on behalf of the large corporation initially uses the tool to enter USD 1,000,000 as the risk to be placed (RTBP) layer limit metadata, and USD 0 as the RTBP layer retention metadata in the placement database 377. These upper and lower bounds enable the system to correctly scale the inward tower object representing the inward insurance program. The RTBP object is automatically created, and the GUI can display a visualization of the request for open quotation (RFOQ) 241 in the base tower area 243.

Figure 14A:
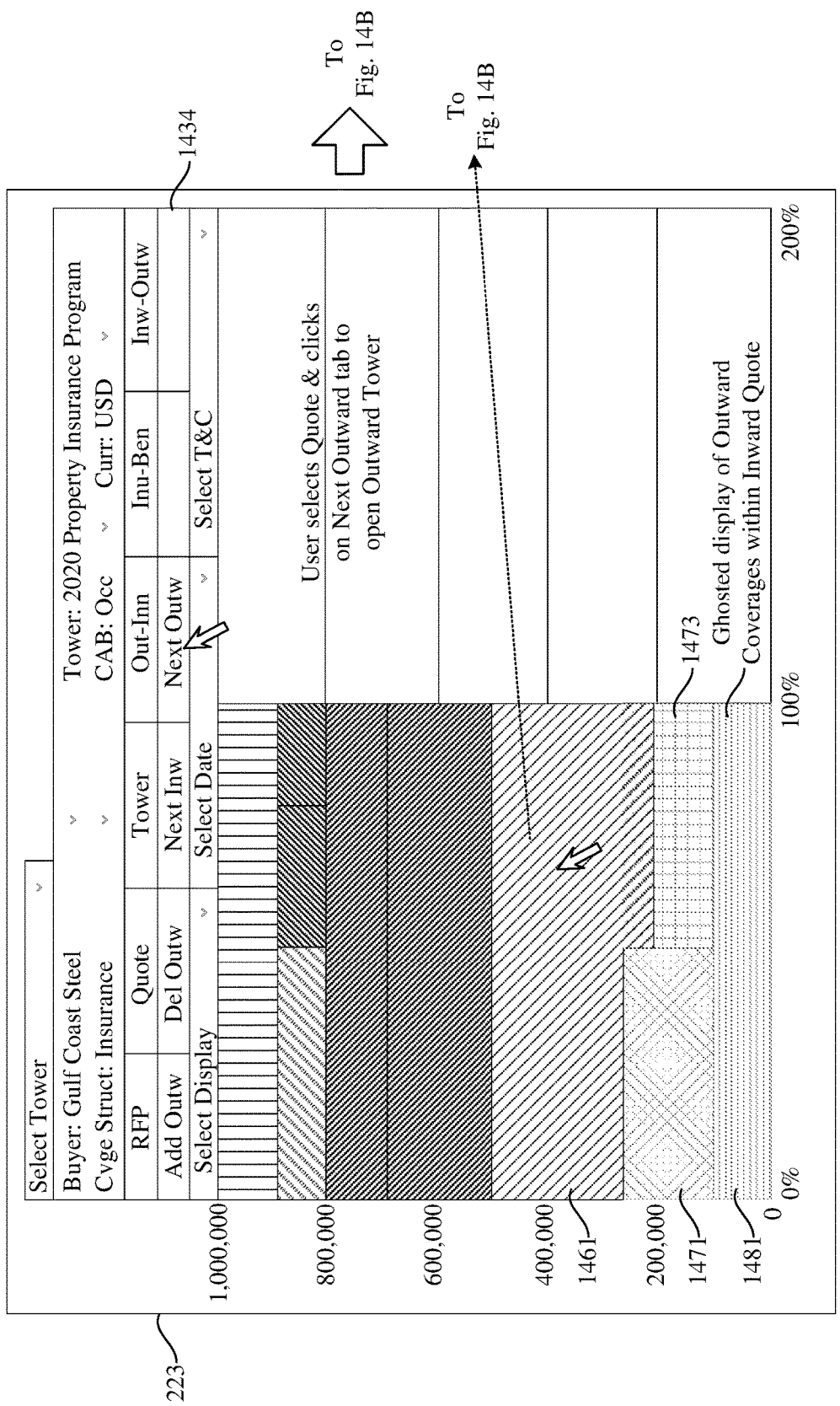
FIG. 14A depicts various inward coverages, including a quote specified with proposal type primary quote metadata
FIG. 14B various outward coverages

The broker can use the tool to create one or more requests for proposals (RFP) 251 or quotes 261 within the request for open quotation (RFOQ) 241 used to place the inward insurance coverages in the corporate insurance program. If the broker creates any RFP 251 or quote 261 within this RFOQ 241, the visual interface displays a layer share part object that is used to represent each new RFP 251 or quote 261 within the RFOQ 241 in its correct vertical and horizontal position within the base tower area 243 of the display panel 223. These various inward coverages, including a quote specified with proposal type primary quote metadata 1461, are illustrated in FIG. 14A.

FIG. 13A illustrates how a broker enters the insurance quote for the excess layer coverage to be provided by the insurance carrier as a metadata 1324, 1326 in the placement database. In the example shown in FIG. 13A, the quote 1324 is entered by setting the proposal type metadata to 'quote' and the layer quote basis metadata to 'I/R/O', and by entering coverage layer limit USD 250,000 metadata and layer retention USD 500,000 metadata.

The outward phase of placement follows the inward insurance coverage placement by the broker. Metadata from the inward placement is available in the placement data table 377. The broker links the inward program objects to an outward program structure using the GUI by clicking on the inward excess primary layer quote 1461, and clicking on the 'Next Outward' control in the tower command mode area 1434 to open a new outward tower object 1466. To scale the outward tower, the system will calculate the market assumed line (MAL) for the inward primary quote 1461, and set the outward tower coverage limit equal to the MAL. In the illustration provided by FIG. 14A, since the inward primary quote 1461 has been entered with USD 500,000 layer limit metadata, USD 0 layer retention metadata, and risk percentage 100% metadata, the MAL is calculated as USD 500,000, and this inward limit amount is used to define the tower coverage layer limit metadata for the outward tower object 1466. Once the outward tower is added by the broker, the information concerning the request for proposals (RFP) representing the outward tower object 1466 is automatically entered into the placement database by setting the proposal type metadata to 'RFOQ', and by entering the coverage layer limit USD 250,000 metadata, layer retention USD 0 metadata, and risk percentage 100% metadata. FIG. 13A illustrates how metadata for linked inward and outward coverages is entered into the placement data table 377.

When the broker enters the metadata for the request for open quotation (RFOQ) 1466 representing the outward tower, the tool creates a layer share part object, and adds to the visualization a block that represents the outward tower. This block is displayed in its correct vertical and horizontal position within the base tower area 243. The position of the layer share part object is represented in the outward tower 1466, and reflects the coverage limit and retention metadata values of the RFOQ.

At this stage, when the broker views the base tower area 243 of the display panel 223, the original request for proposals (RFP), specified as a request for open quotation (RFOQ), functions as the inward tower object since it represents the risk to be assumed by the insurance carrier. Beginning with any quote 1461 in the inward tower 241, the broker can access the linked, outward tower by clicking on the quote 1461 within the inward tower 241, and clicking on the 'Next Outward' control in the tower command mode area 1434 to display the linked RFOQ representing the outward tower object 1466, which is expanded to fill the whole base tower area 243 within the display panel 223.

Figure 13B:
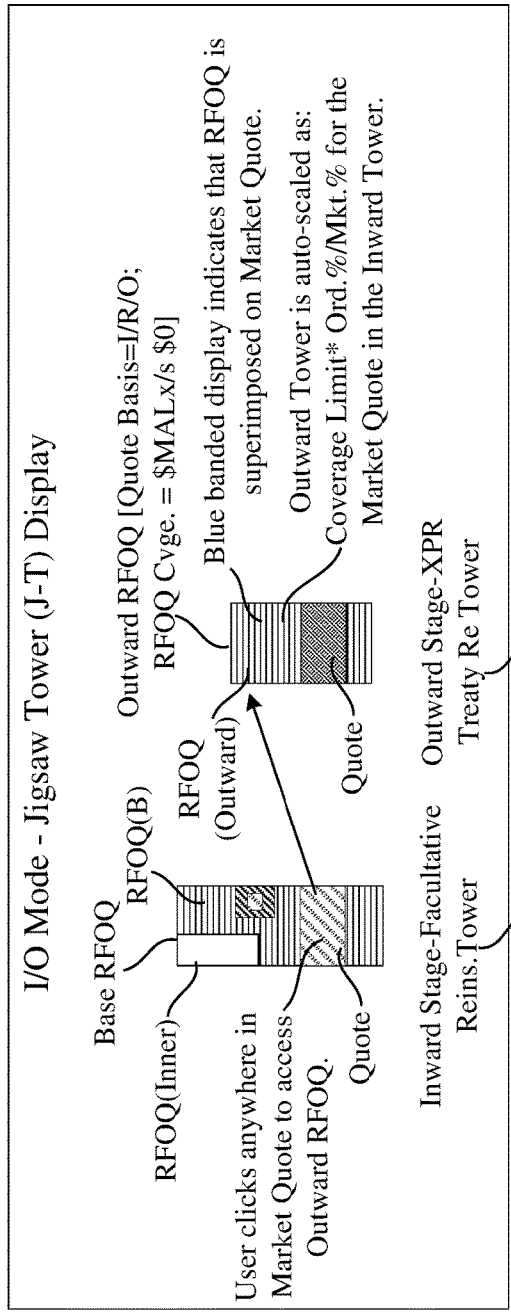
FIG. 13B illustrates the operation that enables a user to click on quote within the inward tower 1361, and expand the RFOQ for the outward tower 1363 to proceed with the customary placement methods within the expanded, outward tower.
Figure 13C:
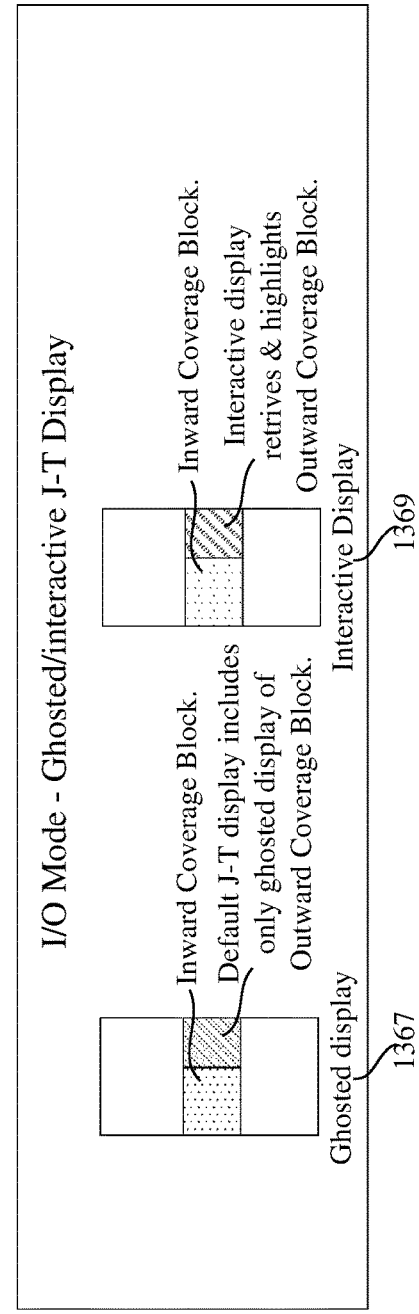
FIG. 13C shows alternatively ghosted display and interactive display of outward RFPs and quotes within the inward tower object.

FIG. 13B illustrates the operation that enables a user to click on a quote within the inward tower 1361, and expand the RFOQ for the outward tower 1363 to proceed with the customary placement methods within the expanded, outward tower. The broker clicks on the 'Next Inward' control in the tower command mode area 1434 to return from the outward tower object to the inward tower object representing the original risk to be placed (RTBP).

Figure 14B:
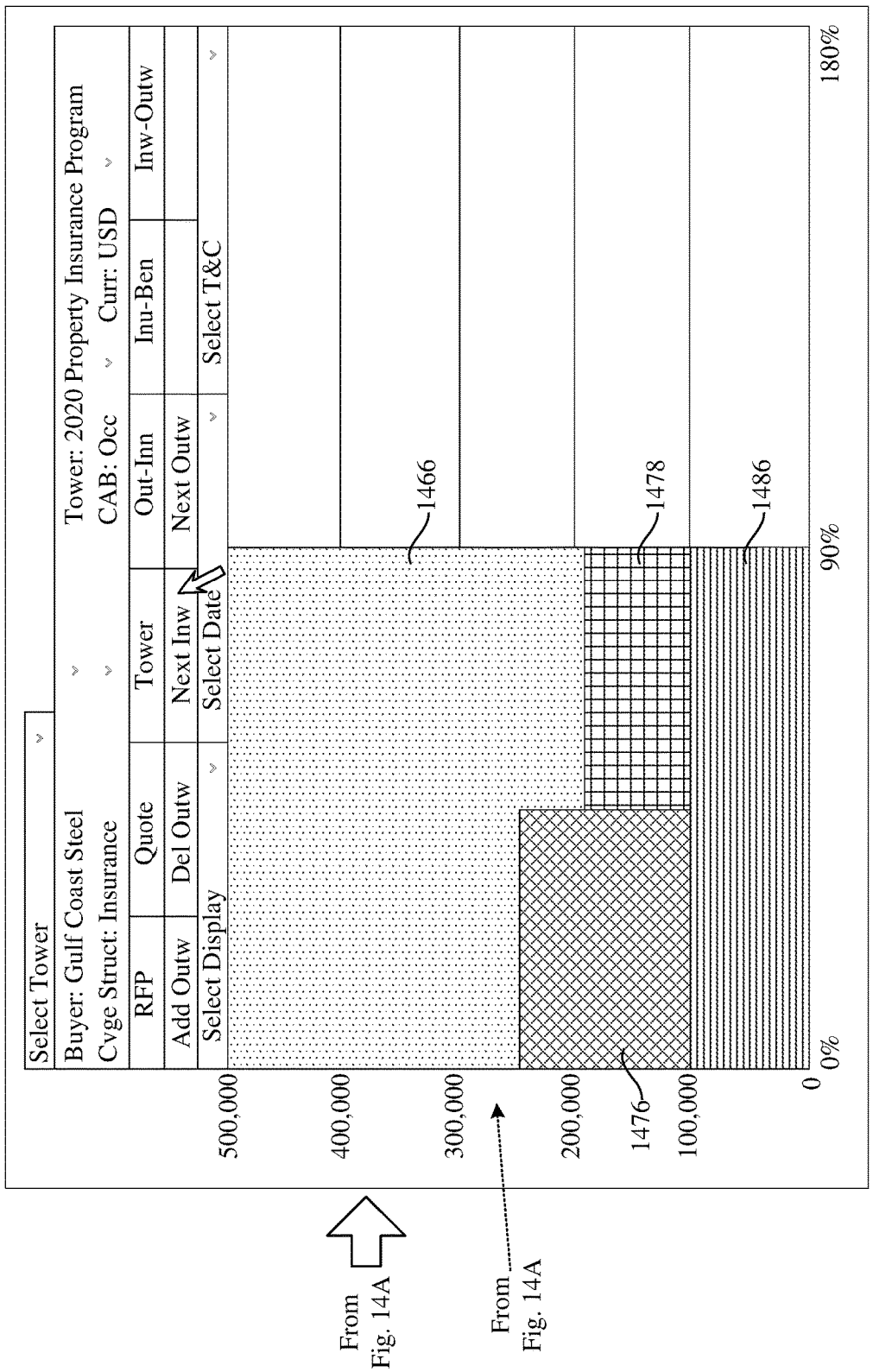

Once the outward benefiting tower object is created, the broker can create one or more requests for proposals (RFP) 1478 or quotes 1476, 1486 within the request for open quotation (RFOQ) 1466 representing the outward tower object that is being used to place the outward facultative reinsurance coverages to be linked to the inward insurance coverages. If the broker creates any RFP 1478 or quote 1476, 1486 within this RFOQ 1466, the visual interface displays a layer share part object representing each new RFP 1278 or quote 1476, 1486 within the RFOQ 1466 in its correct vertical and horizontal position within the base tower area 243 of the display panel 223. These various outward coverages are illustrated in FIG. 14B.

If the broker creates any request for proposals (RFP) 1478 or quote 1476, 1486 within the outward tower, the visual interface displays a ghosted representation of each RFP 1473 or quote 1471, 1481 within the inward quote 1461 within the inward tower object 241, and the ghosted representation of each RFP 1473 or quote 1471, 1481 is correctly positioned within the inward quote 1361 to reflect the relative relationship as structured by the broker between the inward and outward coverages. Display methods providing alternatively for either a ghosted display 1367 or an interactive display 1369 of outward RFPs 1473 and quotes 1471, 1481 within the inward tower object are described in FIG. 13C.

The process for linking and nesting inward and outward layer share part objects described in this example can be repeated recursively to enable the management of additional levels of reinsurance indemnity provided by reinsurance, retrocessionaires and insurance-linked securities markets, such as catastrophe bonds. A broker placing a high-value risk will commonly need to implement multiple levels of risk transfer to ensure that no individual insurance or reinsurance carrier at any stage in the global risk distribution chain is left holding an excessive amount of risk on its balance sheet.

To extend the current example, the broker can click on any quote within the outward tower 1363, and then click on the 'Next Outward' control to form a new request for proposals (RFP) that fills the entire base tower area 243 in the display panel 223. In this way, any third objects added within the new RFP are fully contained within the second object quote within which they are nested. This tool linking inward and outward coverages enables a broker to apply graphical computing to the high-value risk that require capacity in the most remote segments of the global reinsurance market.

FIG. 15A illustrates the integration of the placement mode technology for linking and nesting inward and outward layer share part objects with other technologies that are used to link outer and inner insurance coverages, and inuring and benefiting insurance coverages. As a result of this close, intricate coordination of these three placement modes, this graphical computing tool functions as a single, integrated risk sharding device.

FIG. 15A illustrates the integration of the placement mode technology that links an inward tower object to one or more nested, outward objects using ghosted representations 1544 or interactive representations 1548 of the outward requests for proposals (RFP) or quotes, along with other placement mode technologies disclosed. FIG. 15B shows how the technology disclosed that is used to link inward and outward parts of a complex insurance or reinsurance program is related to the technology disclosed that is used to manage split insurance or reinsurance coverages within the same complex program.

Use Case #7: High-Value Risk Placement by Constructing a Follow-Form Tower that has Consistent Terms & Conditions Across a Stack of Vertical Layers Checking of follow-form terms is facilitated by the disclosed tool and the nesting of policy and coverage objects within a common tower. The tool understands requirements of a follow-form placement, provides means for collection of follow-form T&Cs, analyzes the tower and nested coverages for potential gaps, and provides a convenient display for spotting and drilling down into potential gaps. The worked example of the follow-form insurance placement presented in use case #3 can be extended to illustrate how this graphic computing can ensure the consistent selection and application of coverage terms and conditions between the primary coverages and excess coverages in a stack of related vertical layers.

Suppose the broker has concluded that the corporate risk exceeds the capacity of any single carrier, and uses the tool to subdivide the insurance program into a stack of vertical layers enabling placement of the risk with different insurance carriers.

The insurance broker uses the GUI initially to enter USD 1,000,000 as the risk to be placed (RTBP) layer limit metadata, and USD 0 as the RTBP layer retention metadata in the placement database 377. These upper and lower bounds enable the tool to correctly scale the display panel that includes the tower 243 representing the insurance program to be placed by the broker. As shown in FIG. 7A, the broker has applied the tool to the follow-form placement to create a request for primary quotation (RFPQ) object 773 described as '100% part of USD 550,000 in excess of 50,000 per occurrence', and then to generate a subsequent primary quote 781 described as '100% part of USD 200,000 in excess of 50,000 per occurrence', and two excess layers 771 described as '100% part of USD 200,000 in excess of 250,000 per occurrence' and '100% part of USD 150,000 in excess of 450,000 per occurrence'. These objects are linked within a tower.

FIG. 16A and FIG. 16B illustrate how the broker can use the tool to manage the terms and conditions metadata for each individual coverage object that represents the placement. The broker selects a coverage in the GUI, in this case a coverage specified with 'quote' proposal type metadata 1653, and clicks on the 'Terms and Conditions' control in the tower command mode area 234 to access the terms and conditions metadata 1657 for the selected coverage in the placement database 377. The broker can use this tool to add, edit or delete each individual term & condition in this data table, and to enter terms and condition metadata 1657. This metadata includes coverage line of business type metadata, structure type metadata, coverage amount metadata describing the size of sublimits, deductibles, reinstatements and other structures associated with the base coverage, and coverage status metadata 1657.

FIG. 7B shows the display of the same terms and conditions metadata 777 for one of the excess coverages 771 included in a follow-form placement implemented by a broker. In this example, the broker adds the terms and conditions metadata for each primary quote layer share part object 781 or excess quote layer share part object 771 responding to the request for primary quote (RFPQ) layer share part object 773 within the follow-form placement.

Figure 20B:
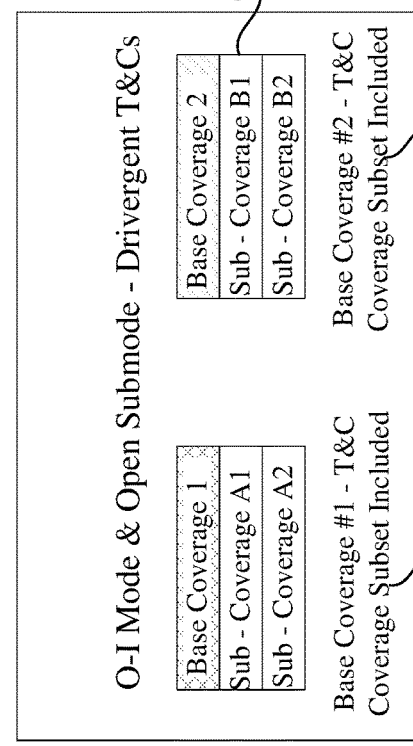
FIG. 20B shows separate, juxtaposed displays of multiple requests for open quotation used to represent split coverages.

To establish a lead-following relationship between objects representing the terms and conditions of two coverages within a tower, in this case the primary quote layer share part object 781, which functions as the lead coverage, and the excess quote layer share part object 771, which functions as the following coverage, the broker uses the tool to associate the following excess coverage object 771 with the lead primary coverage object 781, by entering the proposal ID metadata value for the lead primary coverage 781 as the associated proposal ID metadata for the following excess coverage 771, and by setting the form quote basis metadata value for the following coverage to 'Follow' to characterize the nature of the contractual relationship between the two coverages. Alternatively, in the event if the following coverage is an umbrella insurance coverage that is intended to address coverage gaps in the lead coverage as illustrated by FIG. 20B, the broker would will set the form quote basis metadata value to 'Wrap' for the following coverage. This coverage metadata is entered into the placement database 377, for instance in a proposal table 155, and displayed for each coverage included in the follow-form tower 291, 296.

To compare the individual terms and conditions between the designated lead primary coverage 781 and following excess coverage 771, the broker uses the GUI to select the following excess coverage 771 within the follow-form tower, and clicks on the 'Terms and Conditions' control in the tower command mode area 234 to access the terms and conditions metadata 777, 1657 for the selected following excess coverage 771. The system compares the terms and conditions for the following excess coverage 771 with the same terms and conditions for the lead primary coverage 781, using the coverage line of business type metadata, structure type metadata, coverage amount metadata, and coverage status metadata, and identifies differences in the terms and conditions for the two coverages as 'follow-form exception' metadata in the placement database 377, which can be displayed graphically as in FIG. 17. After reviewing the terms and conditions metadata 777, 1657 in the placement database 377 for any differences, the broker can add, edit or delete individual terms and conditions metadata 777, 1657 for either the following excess coverage 771, or the lead primary coverage after accessing its terms and conditions metadata 777, 1657, to remove any problematic differences between the terms and conditions for the two coverages.

FIG. 16A and FIG. 16B illustrate how the broker uses the tool to manage the terms and conditions metadata for each individual coverage included in a placement. The broker selects a coverage using the GUI, in this case a coverage specified with 'quote' proposal type metadata 1653, and clicks on the 'Terms and Conditions' control in the tower command mode area 234 to access the terms and conditions metadata 1657 for the selected coverage in the placement database 377. The broker can use the tool to add, edit or delete each individual term & condition in this data table, and enter terms and condition metadata 1657, including coverage line of business type metadata, structure type metadata, coverage amount metadata describing the size of sublimits, deductibles reinstatements and other structures associated with the base coverage, and coverage status metadata 1657.

In the event that viewing a display, such as in FIG. 17, causes the broker to identify any differences in terms and conditions between the lead primary quote layer share part object 781 and the following excess quote layer share part object 771 that are unacceptable to the corporation purchasing the insurance coverage, the broker can use the tool to select the coverage to be modified, and click on the 'Terms and Conditions' control in the tower command mode area 234 to access the terms and conditions metadata 1657 for the selected coverage in the placement database 377, and add, edit or delete the metadata values for any individual term & condition to address the concerns of the insurance buyer.

FIG. 17 illustrates a GUI interface that helps a broker identify potentially troublesome coverage gaps anywhere within a follow-form tower due to differences in the coverage terms and conditions metadata associated with the various individual coverage layer share part objects. The broker uses the GUI to select at least one particular term or condition to be reviewed using a 'Select T&C' data filter in the tower utility area 235. The display of each primary quote 781 or excess quote 771 in the follow-form tower will be differentiated using colors or other markings 1763, 1765, 1767 based on the inclusion, partial inclusion using a sublimit, or exclusion of the selected term or condition. FIG. 17 shows the method for comparing terms and conditions across the primary and excess quotes 781, 771 contained in a follow-form tower.

In the event the broker identifies any differences in terms and conditions between the primary quote 781 and excess quotes 771 in the follow-form tower that are unacceptable to the insurance buyer, the broker can use the GUI to select the coverage to be modified, and click on the 'Terms and Conditions' control in the tower command mode area 234 to access the terms and conditions metadata 1657 for the selected coverage in the placement database 377, and add, edit or delete the metadata values for any individual term & condition to address the concerns of the insurance buyer.

Use Case #8: High-Value Risk Placement by Constructing a Follow-Form Tower Consisting of Coverages and their Associated Sideways Coverages Application of the tool disclosed to a follow-form tower can be extended to sideways coverages, such as aggregate limits and reinstatements of aggregate limits. A separate graphic presentation is needed to extend the understanding of the response of coverages in a tower to a single event or occurrence to consider an aggregation of such events over a policy period, typically a policy year. The worked example of a facultative reinsurance placement can be used to illustrate how this graphic computing can enable a broker to place not only the base coverages within the follow-form tower, but also the terms and conditions that specify occurrence limits, aggregate limits, reinstatements and other sideways coverages that determine the extent of aggregate protection provided by each base coverage. Each base coverage is typically defined by certain core coverage parameters, including its per occurrence layer limit, layer retention and risk percentage. These parameters, by themselves, do not fully describe the behavior of the coverage in the event it is applied to multiple, or even frequent, claims. Sideways coverages, such as aggregate limits, are commonly used to specify coverage extent in these cases.

The broker and interested carriers may agree on the inclusion of certain coverage terms and conditions that impose occurrence or aggregate limits on the layer limit specified for a coverage. As shown by FIG. 16A and FIG. 16B, the broker can use the tool to manage these sideways terms and conditions by selecting the applicable base coverage 1653, clicking on the coverage 'Terms & Conditions' control in the tower command mode area 234 to access the 'terms & conditions' metadata 1657 in the placement database 377, and adding, editing or deleting individual terms and conditions as necessary.

When adding each individual term or condition, the broker specifies in the GUI the coverage line of business type metadata, the structure type metadata, and the coverage attachment basis metadata. The broker uses the GUI to enter the coverage amount metadata for the deductible, sublimit, self-insured retention, reinstatement, or other structure contained in the term or condition. In this worked example, the broker has selected the base coverage 1653 specified as '50% part of USD 200,000 in excess of 600,000' to access the terms and conditions metadata 1657 in the placement database, and has added two individual reinstatements to be associated with the base coverage 1653. Each reinstatement provides an additional USD 200,000 in aggregate limit capacity for the associated base coverage 1653, and the broker accordingly sets the coverage attachment basis metadata value to 'aggregate' for each reinstatement.

Once the broker has entered the terms and conditions metadata 1657 in the placement database 377, the broker can have the tool create a sideways coverage display by selecting the one or more individual terms and conditions to be included in the sideways coverage, and by clicking on the 'Add Sideways Coverage' control in the terms and conditions metadata 1657. As illustrated by FIG. 18A, the system automatically converts the selected terms and conditions to a sideways coverage that is fully described and formed by proposal metadata and coverage metadata 1841, 1842 in the placement database 377. Each sideways coverage is automatically associated 1863 in the placement database 377 with its corresponding base coverage 1821, 1830 and any other related sideways coverages, and certain sideways coverage metadata, such as proposal type metadata, are inherited from the associated base coverage 1867.

Figure 18B:
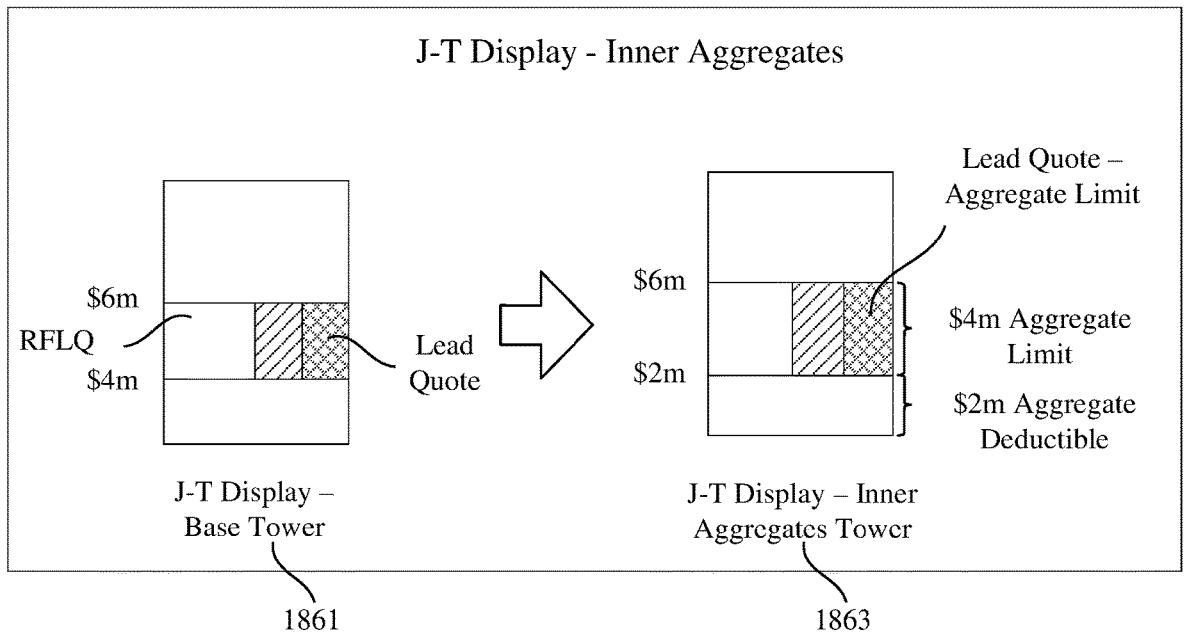
FIG. 18B illustrates the proposal and coverage metadata added to the placement database, enabling the tool to create and display sideways coverages associated with a particular base coverage.

As shown in FIG. 18B, the proposal and coverage metadata added to the placement database 377 enables the tool to create and display sideways coverages 1863 associated with a particular base coverage 1861.

Figure 19A:
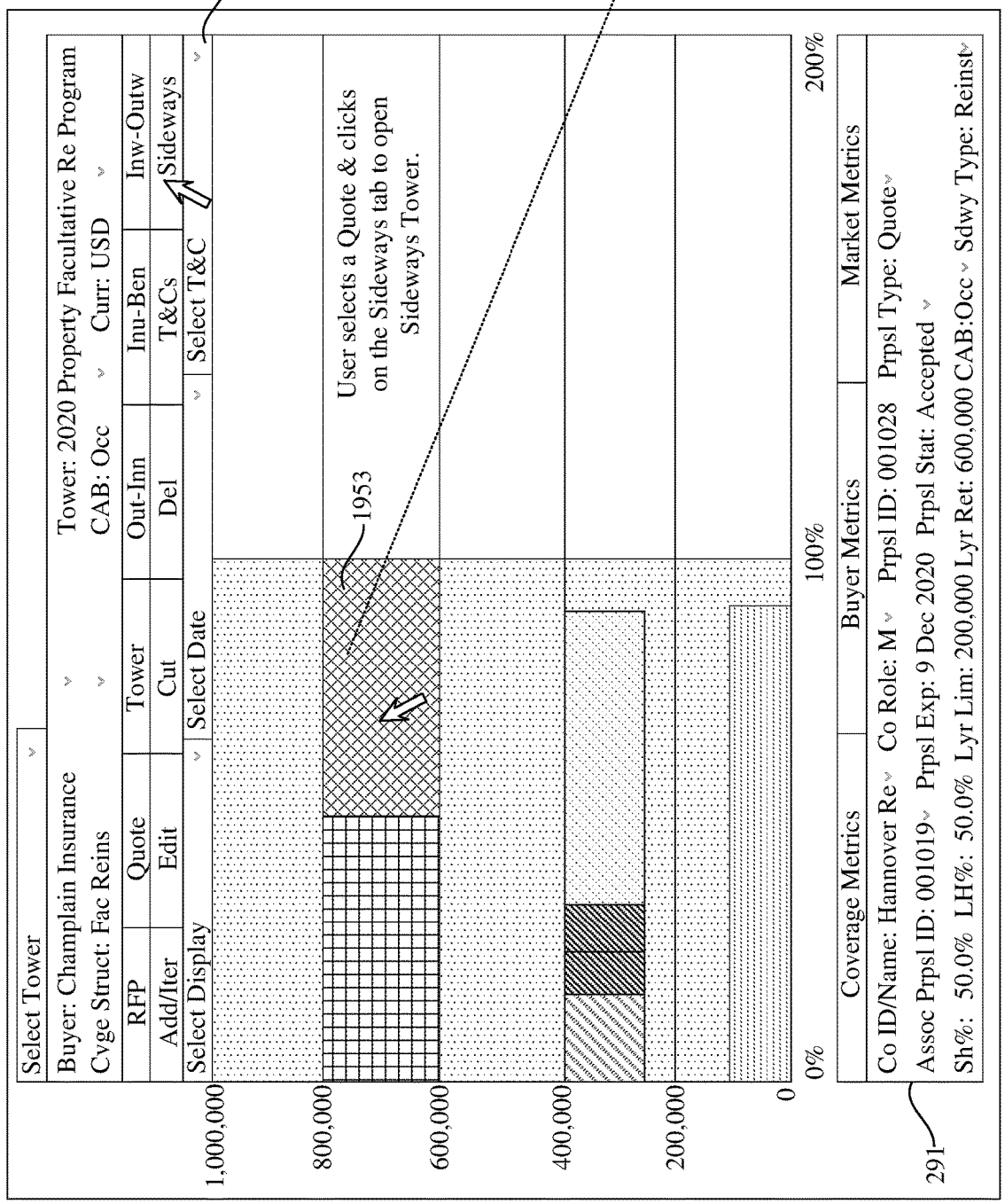
FIGS. 19A and 19B show the second reinstatement as a sideways coverage specified as '50% part of USD 200,000 in excess of 400,000 in aggregate'.
Figure 19B:
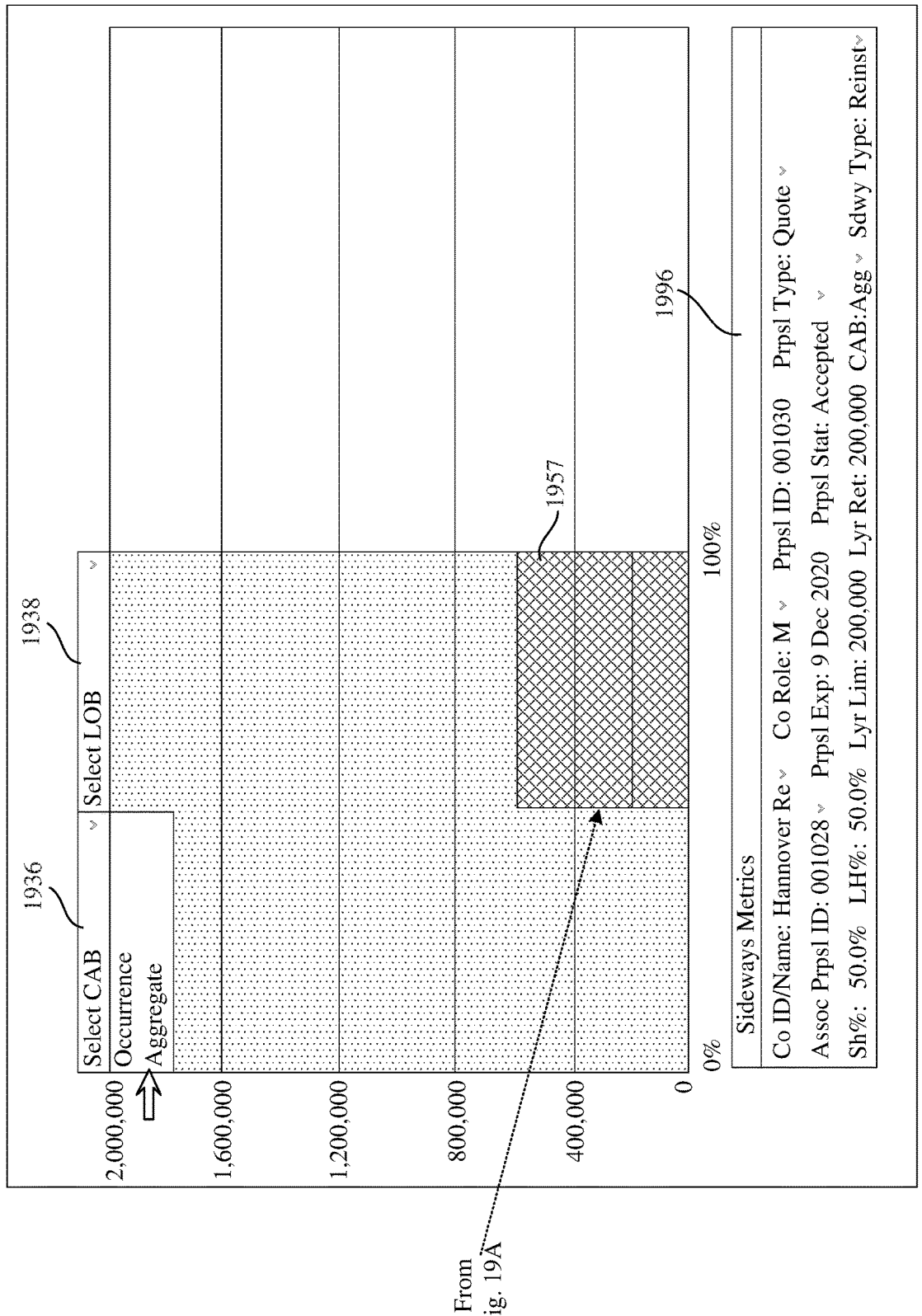

To view the sideways coverages for a particular base coverage, the broker uses the GUI to select the base coverage 1953 to be reviewed, and clicks on the 'Sideways' control in the tower command menu area 243 to access the display for the sideways coverages as shown in FIG. 19B. Since sideways coverage may be specified for multiple coverage attachment bases or coverage lines of business, the broker may utilize the coverage attachment base filter 1936 or coverage line of business filter 1938 in the palette utility area in the palette 227 to isolate the sideways coverages to be viewed.

In the worked example illustrated in FIG. 19A and FIG. 19B, the broker uses the tool to select the base coverage 1953 specified as '50% part of USD 200,000 in excess of 600,000 per occurrence', and clicks the 'Sideways' control in the tower command menu area to view the aggregate capacity provide by the original base coverage and its two reinstatements 1957 within a sideways tower set to the 'aggregate' filter value. Using the proposal and coverage data previously entered into the placement database 377, the system automatically formulates the coverage parameters needed to properly display the reinstatements within the sideways tower. For example, as shown in FIG. 19B, the second reinstatement 1957, positioned immediately above the capacity provided by the original base coverage and the first reinstatement, is presented as a sideways coverage specified as '50% part of USD 200,000 in excess of 400,000 in aggregate'. The system has automatically formulated the proposal and coverage. The broker can view these placement and coverage metadata for the second reinstatement 1957, and any other individual sideways coverage in the display panel 1996 positioned immediately beneath the sideways tower display.

Use Case #9: High-Value Risk Placement by Constructing a Follow-Form Tower Consisting of Dominant Coverages and their Associated Bundled Coverages Coverages, not policies, are the primary focus of the technology disclosed, and complex placements include multiple coverages. As a result, information regarding limits and attachments points is stored as objects in a coverage table 176, in which one or more coverages are linked to a policy in a policy table 164. Policies typically are named after a dominant coverage, such as an "all risk policy", which provides a convenient label for a policy that bundles a variety of coverages. Sometimes, an exclusion from the dominant coverage is so prominent that it is mentioned in the coverage name, such as "all risk ex earthquake." The tool disclosed provides means for the collection and assembly of coverages within a bundle, analyzes the tower and nested coverages for potential gaps, and provides a convenient display for walking through the bundled coverages, spotting and drilling down on potential gaps.

This worked example uses a follow-form insurance policy to illustrate how the disclosed graphic computing can enable a broker to place not only a set of dominant coverages within the follow-form tower, but also the coverages bundled with the dominant coverages, and assembled from the terms and conditions that specify the sublimits, deductibles, self-insured retentions and other structures to be implemented for each dominant coverage. Each dominant base coverage is typically defined in an object by a complete set of core coverage attributes, including its layer limit, layer retention and risk percentage, while the bundled coverages must typically be assembled from multiple coverage parts selected and applied from these terms and conditions.

Once assembled, each bundled coverage of interest can be retained in the main placement tower, inserted into a split coverage tower that addresses the bundled coverage, or even iterated and moved to a different tower. Despite their supposed subordination to the dominant base coverage in an insurance policy, bundled coverages often play a central role in the underwriting, placement, and ultimately claim handling for the containing insurance policy. Nonetheless, due to the fragmentation, multiplicity and complexity of these coverage-related terms and conditions, the full business effect of individual terms and conditions, and their related assembled bundled coverages, are often not adequately understood or appreciated by brokers or other participants in the insurance placement, at least until large claims are subsequently reported and require payment.

As shown by FIGS. 16A and 16B, the broker can use the tool to manage these bundled terms and conditions by selecting the applicable base coverage 1653, which effectively serves as the dominant coverage for an insurance policy; clicking in the GUI on the coverage 'Terms & Conditions' control in the tower command mode area 234 to access the 'terms & conditions' metadata 1657 in the placement database 377, and adding, editing or deleting individual terms and conditions as necessary.

When adding each individual term or condition object or metadata, the broker specifies to the system the coverage line of business type metadata, the structure type metadata, and the coverage attachment basis metadata. The tool collects the coverage amount metadata for the deductible, sublimit, self-insured retention, reinstatement, or other structure contained in the term or condition. In this worked example, the broker has selected the dominant base coverage 2171, which is a primary quote specified '100% part of USD 350,000 in excess of 50,000' to access the various terms and conditions metadata 2187 in the placement database, and add a number of sublimits, deductibles and other coverage 'parts' that will ultimately be assembled into the bundled coverages associated with the dominant base coverage 2171. The broker follows a similar process for every other dominant base coverage 2141 included in the follow-form facultative reinsurance insurance policy.

In the worked example, the broker has selected the primary insurance coverage 2171 in the GUI, which is specified with 'all-risk' coverage line of business type metadata and 'worldwide' territory metadata, as the dominant base coverage, and has used the GUI to specify, among the various terms and conditions in metadata 2187, a 'USA Flood' sublimit specified with coverage amount USD 200,000 metadata, and a 'USA' territory deductible specified with coverage amount USD 10,000 metadata. The system creates corresponding objects and/or attributes.

Figure 21A:
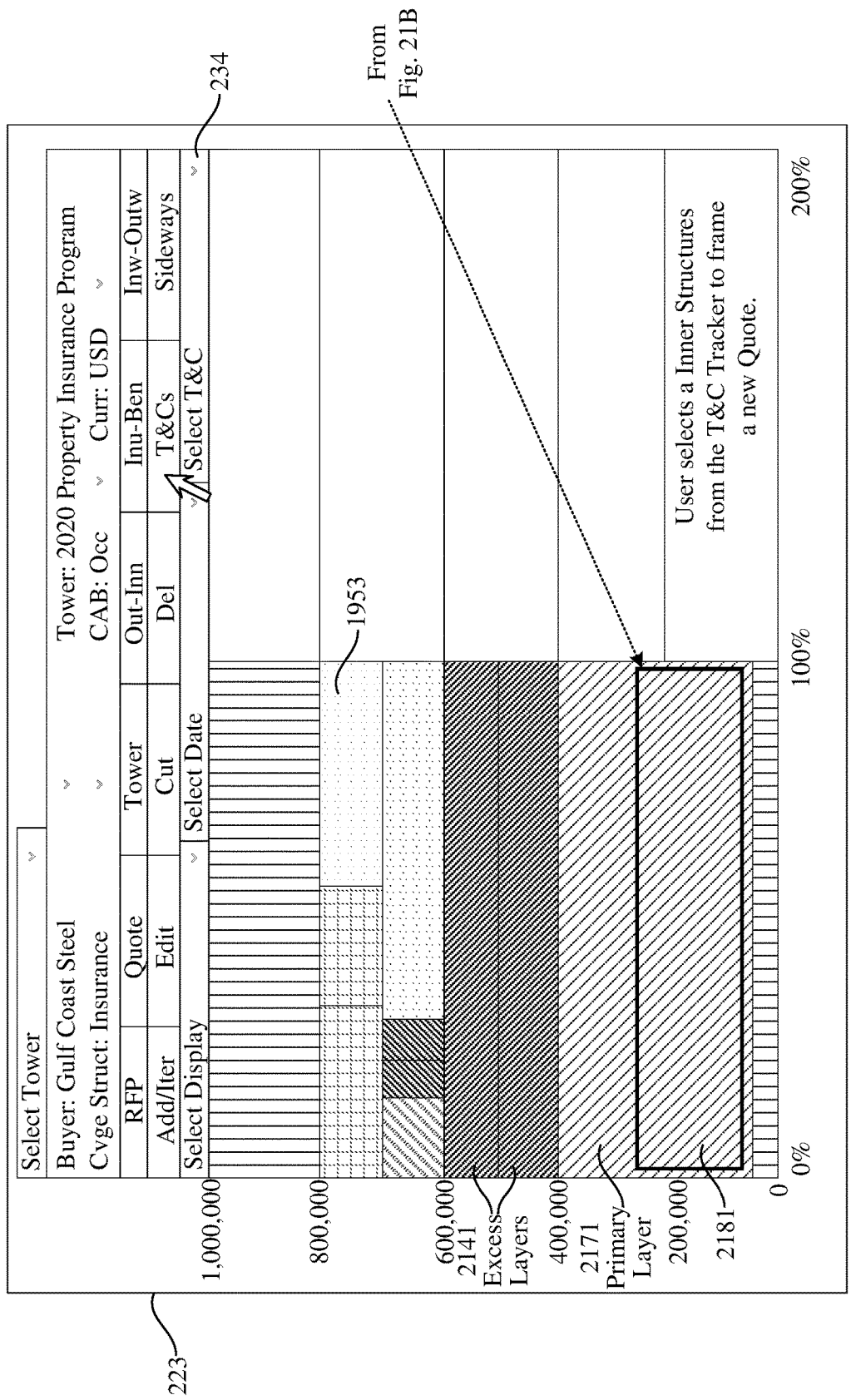

Once the broker has entered the terms and conditions metadata 2187 in the placement database 377, the broker can create a bundled coverage by selecting the one or more individual terms and conditions to be included in the bundled coverage, and by clicking on the 'Add Bundled Coverage' control in the terms and conditions metadata 2187. As illustrated by FIG. 21A and FIG. 21B, the technology utilizes a series of rules-based algorithms to convert the selected terms and conditions into a template version of the bundled coverage 2181 that can be compared with its associated dominant base coverage, which is the primary coverage 2171 in this example. To implement these conversions, the selected sublimits or reinstatements are evaluated for use in the layer limit of the bundled coverage template; the deductibles and self-insured retentions are transformed for use in the layer retention; and other properties, such as proposal type and risk percentage, are inherited and applied from the associated dominant base coverage.

Once the template version of the bundled coverage is formed, the system automatically identifies the portion of the template version of the bundled coverage 2181 that overlaps the primary coverage 2171, and implements the cutting operation to excise and retain only the overlapping portion of the template version 2181 as a bundled coverage that is fully described and formed by proposal metadata and coverage metadata 291 in the placement database 377.

Each bundled coverage is automatically associated with its corresponding dominant base coverage 2171 in the placement database 377, and certain bundled coverage metadata, such as proposal type metadata, are inherited from the associated dominant base coverage 2171. The proposal and coverage metadata implemented by the schema included in FIG. 1B and added to the placement database 377 enable the creation and display of each sideways coverage 2181 associated with a particular dominant base coverage 2171 within the same base tower display.

In the worked example shown in FIG. 21A and FIG. 21B, the primary insurance coverage 2171 specified as '100% part of USD 350,000 in excess of 50,000 per occurrence' functions as the dominant base coverage, and the broker has used this tool to enter a USD 200,000 'USA Flood' sublimit and a USD 10,000 'USA' deductible into the terms and conditions metadata 2187 associated with the dominant base coverage 2171. By cutting and retaining the overlapping portion of the dominant base coverage 2171, the system automatically converts these two selected terms and conditions into a 'USA flood' bundled coverage specified as '100% part of USD 190,000 in excess of 60,000 per occurrence. The broker can use the GUI to view the placement and coverage metadata formulated for each bundled coverage in the display panel 291 situated immediately beneath the base tower display.

The process used to assemble and form a bundled coverage closely resembles the process previously described in use case #8 to assemble and form a sideways coverage, except that the sideways coverage typically has a different coverage attachment basis from its associated base coverage, and is therefore displayed in a separate sideways tower specified and scaled using the applicable coverage attachment basis.

Use Case #10: High-Value Risk Placement by Iteration of Coverages from a Prior Placement to Fill Coverage Gaps in the Current Placement The technology disclosed includes spawning a second template from a first, so that one coverage program, such as a US coverage program, can serve as a template for another, such as a European or Asian coverage program. Objects contained in a first tower can be cloned to form the second tower, with appropriate updates applied to the selected group of objects, which avoids repetitious data collection through a GUI.

A worked example involving the master coverages and local coverages for a complex international insurance program can be used to illustrate how this graphic computing can be used to iterate and move a composite coverage structure, which may include numerous associated coverages, from one completed or pending placement to another placement. In this way, the composite coverage structure acts as a 'container' for a collection of related coverages, and facilitates the efficient portability of these inner coverages between placements.

Large corporations place complex international insurance programs that span dozens of countries and regulatory jurisdictions, which is a cumbersome, arduous, and expensive task. The overall effort involves in coordinating the local coverages purchased in each jurisdiction with the master coverages intended to apply broadly as backstop coverages where limit-related or term-related coverage gaps occur in these local programs. The technology described provides an efficient means to coordinate local coverages and master coverages within these programs by allowing a broker to iterate and transfer coverages as needed from master coverage towers to local towers, and then modify these portable coverages to fill coverage gaps resulting from differences in limit, or differences in conditions.

Figure 22A:
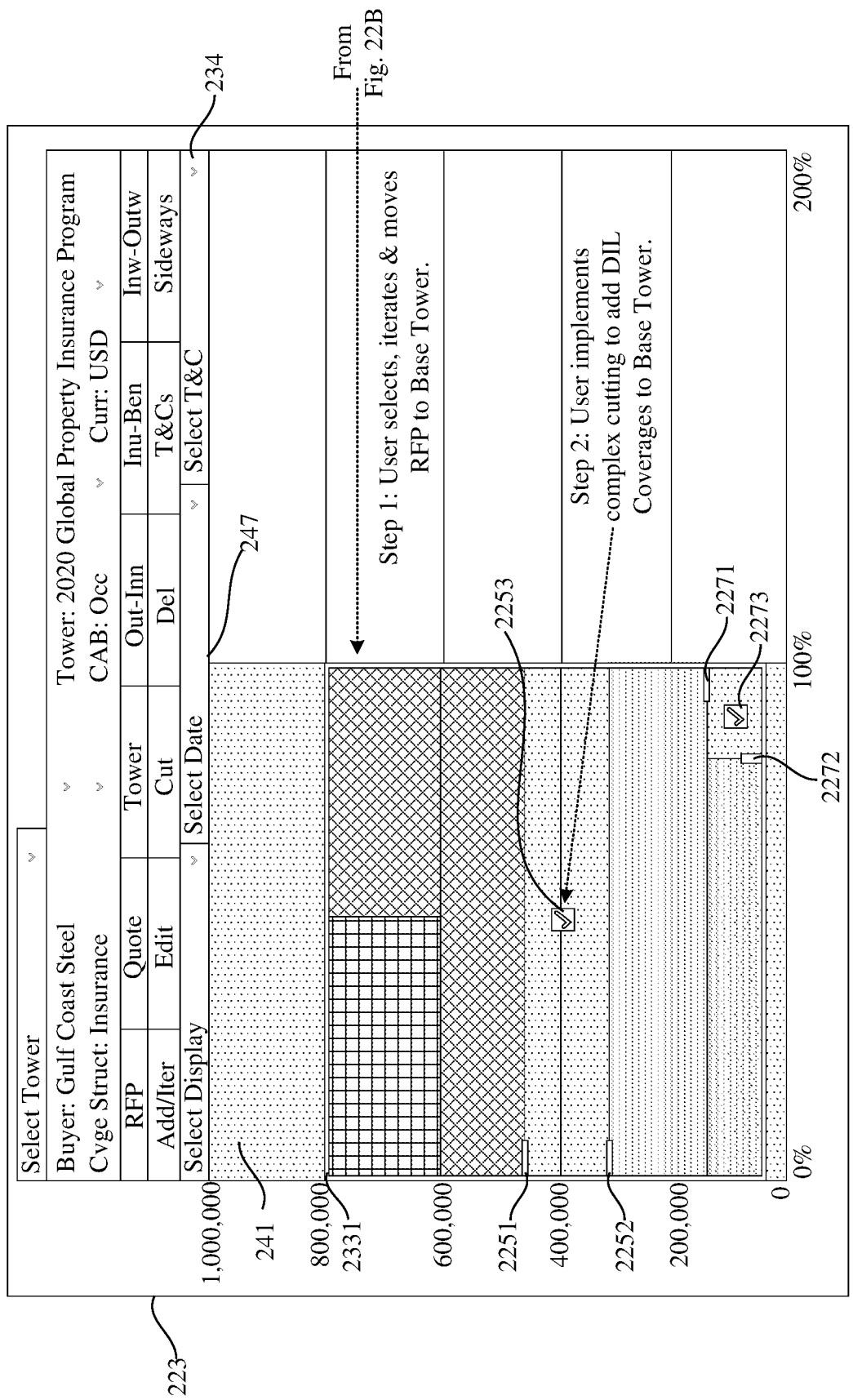
FIG. 22A and FIG. 22B illustrate Split Coverages & Frame Stack.
Figure 22B:
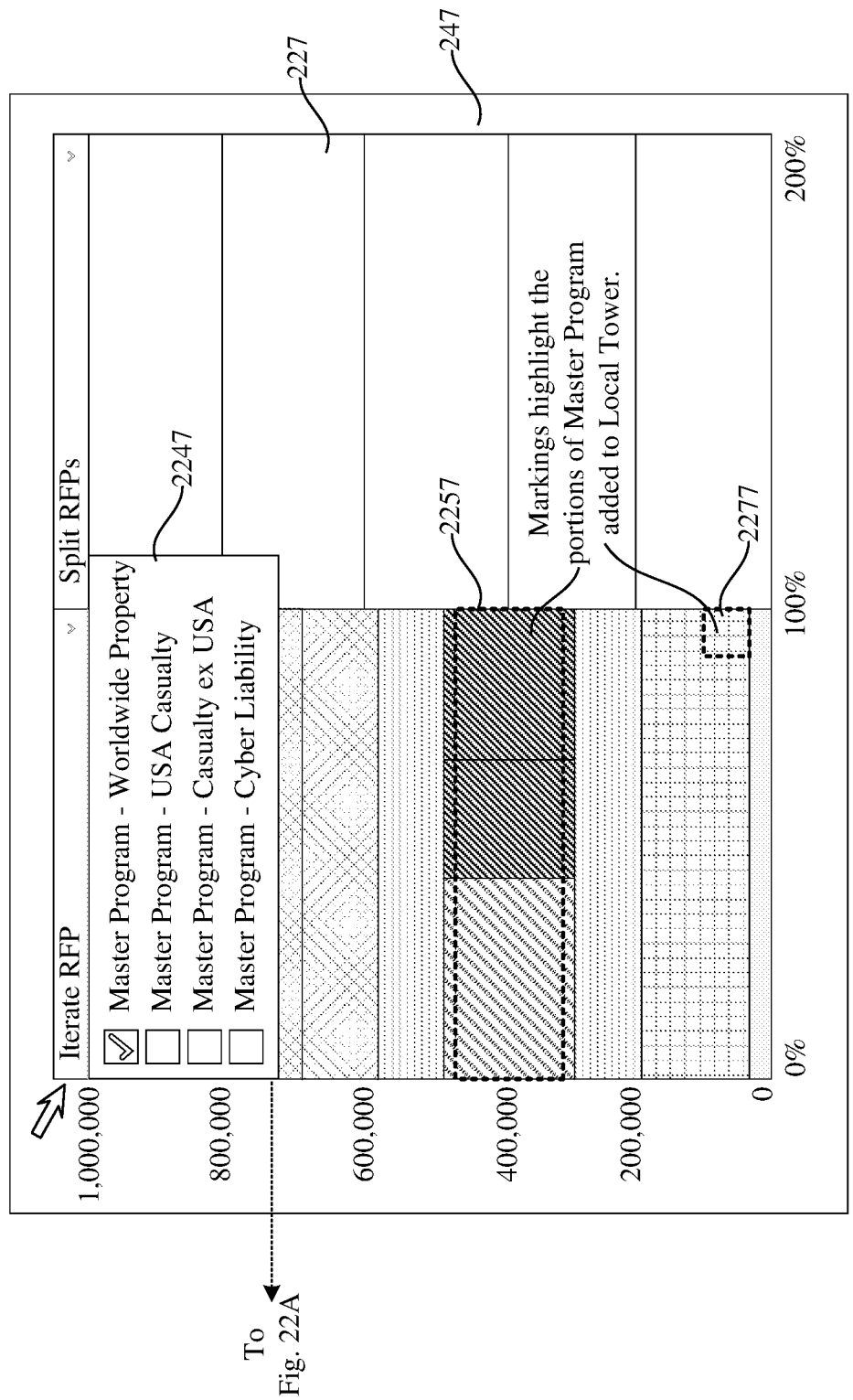

FIG. 22A and FIG. 22B illustrate use of the tool disclosed by a broker to iterate and transfer a pre-existing complex composite structure into the placement currently being managed by a broker. To initiate this process, the broker clicks on the 'Iterate RFP' control 236 in the palette utility area within the palette display panel 227, and selects a particular request for proposals (RFP) from the RFP list 2247 provided by the utility. Once a request for proposals (RFP) is selected by the broker, the system retrieves the proposal and coverage metadata for the selected RFP from the placement database 377, and iterates and displays the entire RFP, including any associated inner RPFs and quotes, in the tower staging area 247 of the palette 227. To facilitate the efficient confirmation of transfer of coverage from the iterated RFP to the tower RFP 241 situated within the base tower 243, identical scaling is used to display both the iterated RFP within the tower staging area 247 and the tower RFP 241 within the base tower 243.

In the worked example illustrated by FIG. 22A and FIG. 22B, the broker is working on a local tower placement that includes the original tower request for proposals (RFP) 241, and several inner requests for proposals (RFP) and quotes associated with the tower RFP 241. The broker is making significant progress in placing the local coverages, but the broker's inspection of the tower RFP identifies two noticeable, critical difference-in-limit coverage gaps 2253, 2273 in the lower and middle portions of the tower RFP 241 where claims are more likely to occur.

To rectify these two coverage gaps, the broker uses the tool to move the whole iterated request for proposals (RFP) from the tower staging area 247 in the palette 227 to a position that precisely overlaps the tower RFP 241 within the base tower 243 in the canvas 223. With the iterated RFP superimposed on the tower RFP, the broker selects from the GUI a complex cutting operation that excises the two portions for the tower RFP 241 that overlay the respective coverage gaps. Guided by the small blocks that highlight the two gap regions 2251, 2252, 2271, 2272, the broker checks the two checkboxes for each of the gap regions 2253, 2273 to complete the complex cutting operation, which cuts not only the iterated RFP itself, but also any inner RFP or quote that is nested within the iterated RFP and falls within either coverage gap region. In this way, coverages, and portions of coverages, included in the master program are efficiently positioned and bound into the local coverage tower.

As an alternative to moving the entire iterated request for proposals (RFP) from the tower staging area 247 in the palette 227 to the base tower 243 in the canvas 223, the broker can use the tool to move any individual inner RFP or quote nested within the iterated RFP out of the iterated RFP into the tower staging area 247, and then across the display to the tower RFP 241 within the base tower 243. In this case, the broker is effectively unpacking the iterated container RFP to remove individual coverages within the iterated RFP.

The worked example illustrates the use of this technology to coordinate coverages between local towers and master towers for complex, international insurance programs, but this technology has many other potential applications, especially in relation to insurance or reinsurance facilities, pools, syndicates and other contractual arrangements that must be formed in advance of their actual use in subsequent placements. For example, global aviation pools must be arranged to provide immediate multi-billion dollar capacity limits for inclusion in the large aviation hull or liability policies needed to protect commercial airline fleets. FIGS. 23A and 23B illustrate how the proposal and coverage metadata for a pre-arranged facility metadata 2321, 2323, 2325, 2359, 2375 can be entered into a placement database 377, and converted for display 2357, 2377 in either the tower staging area 247 or the base tower area 243.

The technology enabling a broker to iterate and transfer coverages is not limited to use on interrelated placements, but can also be applied to improve the efficiency of claim handling processes for these same complex international programs involving the need to coordinate master coverages and local coverages. FIGS. 22A and 22B is intended to illustrate a coordinated placement, but could readily be used to illustrate the application of a master coverage to a claim reported to an international insurance or reinsurance program. In the typical case, once a claim is reported, the corporation and its broker will initially apply the local coverages, and will next iterate broader master coverages to fill any coverage gaps arising from differences in available coverage limits, or terms and conditions. As shown by the example worked in FIGS. 22A and 22B, the iteration and transfer of the master coverage to the local tower might also require the use of complex cutting operations to apply the complex composite structure, including both the outer request for proposals (RFP) and any associated inner RFP or quote, to the gaps within the local tower.

Use Case #11: Extension of the Visual Interface Used to Assemble Complex Insurance and Reinsurance Programs to Include a Third Dimension Representing the Time Element of a Coverage All insurance and reinsurance policies, and risk transfer instruments, include terms and conditions that specify a coverage period for the policy or instrument. The recently-issued U.S. Pat. No. 10,002,392 B2 disclosed technology that provides systems and methods for processing and displaying database objects that build a composite coverage structure during planning and placement of complex insurance or reinsurance programs utilizing a two-dimensional (2D) visual interface. As illustrated in FIG. 1C, for visual risk structuring (VRS) the technology disclosed in this patent utilizes one dimension 1 to represent the coverage layer limit and layer retention for a tower or coverage, and a second dimension 2 to represent the risk percentage for the tower or coverage.

The technology disclosed herein extends the visual interface used to assemble a complex insurance or reinsurance program to include a third dimension representing the time element of a tower or coverage. As shown in FIG. 1C and FIG. 1E, this visual interface will continue to utilize one dimension 1 to represent the layer limit and layer retention for a tower or coverage, and a second dimension 2 to represent the risk percentage for the tower or coverage, and the visual interface will be extended to include a third, time-based dimension 3.

Figure 24:
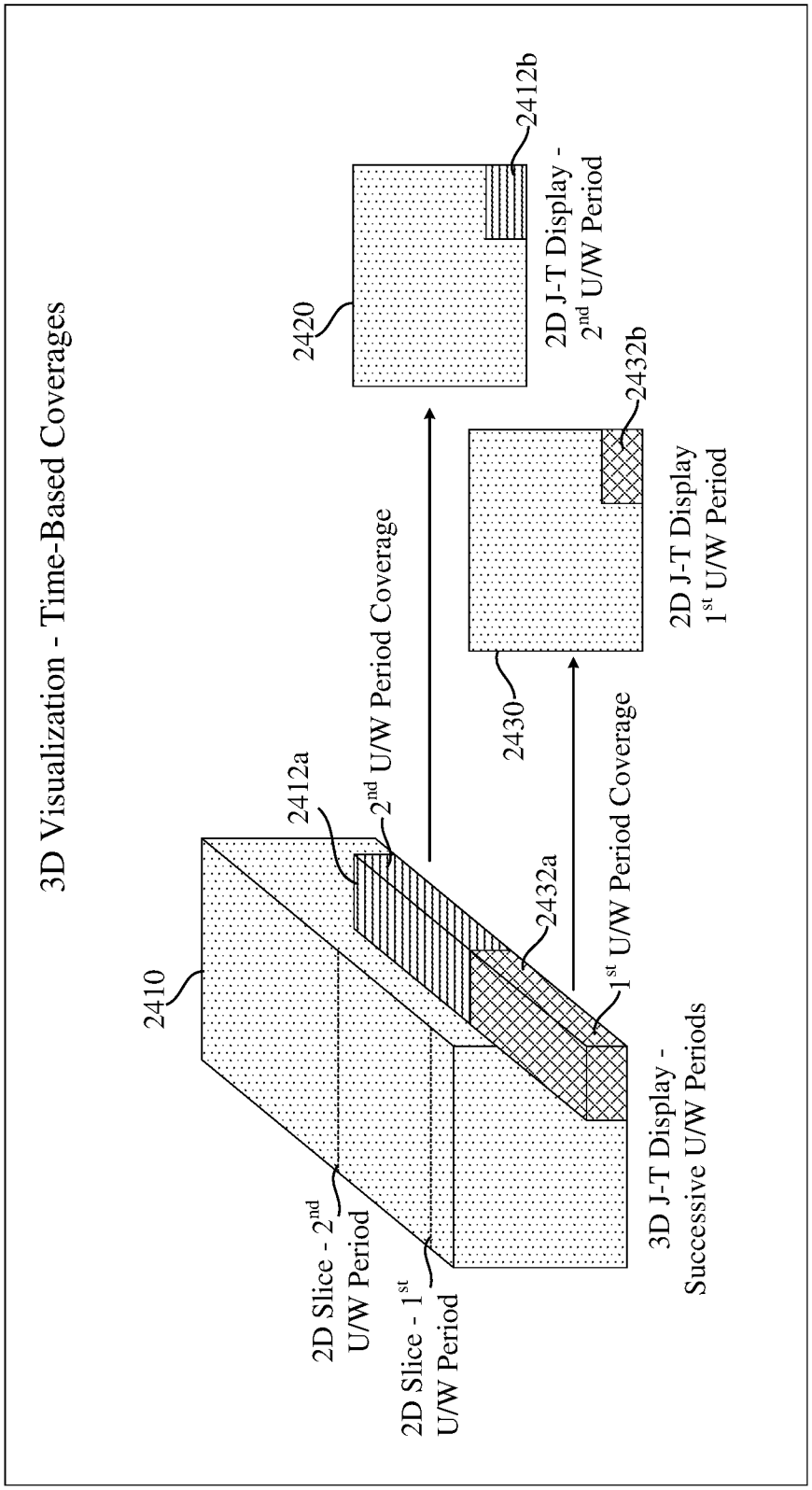
FIG. 24 describes a three-dimensional (3D) visual interface that is used to represent a three-dimensional tower database object that contains two separate 3D coverage database objects, that provide coverage for different, successive time periods.

FIG. 24 describes a three-dimensional (3D) visual interface that is used to represent a three-dimensional tower database object 2410 that contains two separate 3D coverage database objects 2432a, 2412a that provide coverage for different, successive time periods. As shown in FIG. 24, using the technology disclosed, the system user can utilize a database date or time filter or similar method to retrieve a cross-section of the 3D tower object 2430, 2420 in order to view the insurance or reinsurance coverages 2432b, 2412b that are being placed, or are in effect, for a particular date or time.

Figure 25A:
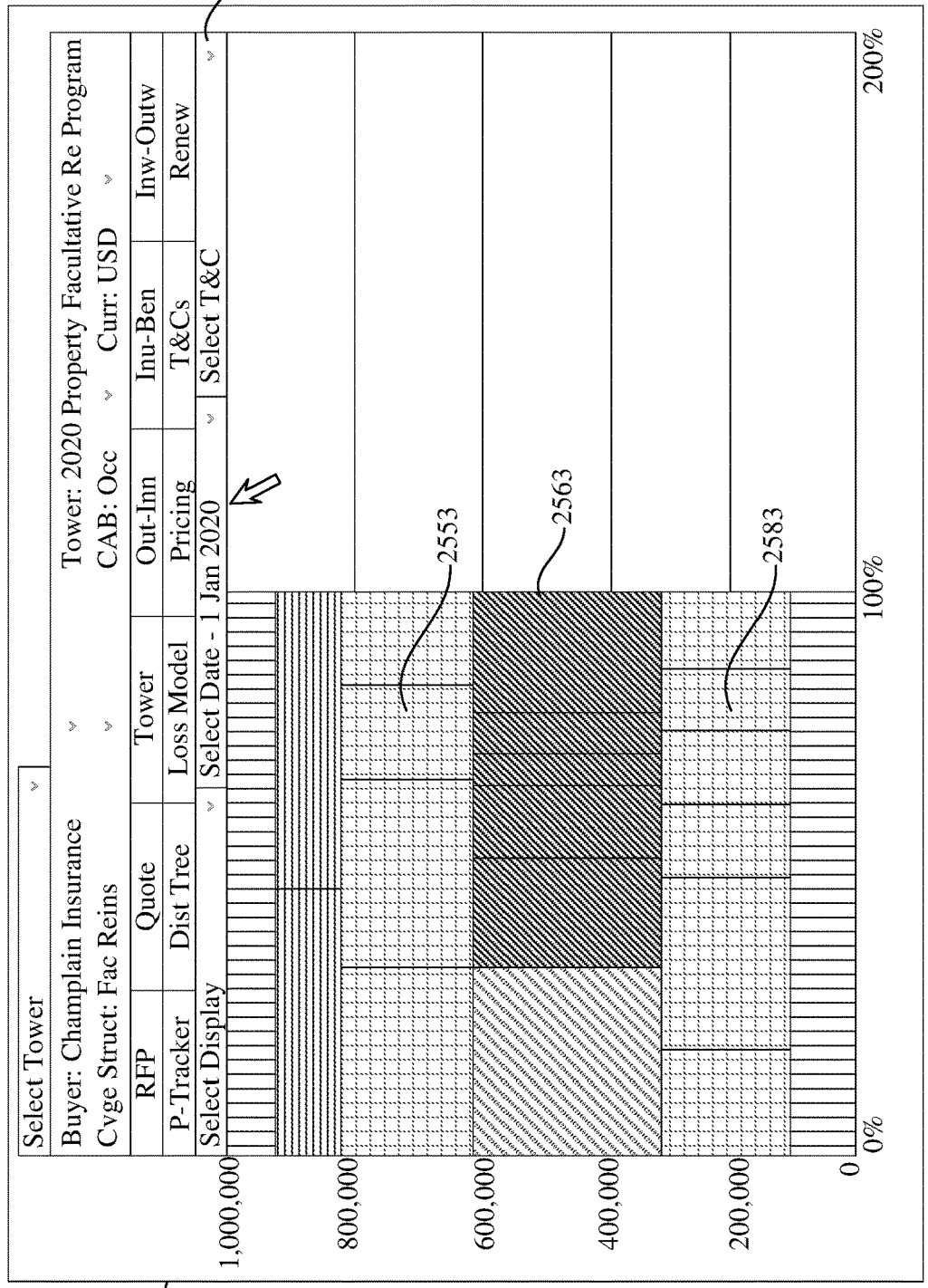
FIG. 25A and FIG. 25B illustrate the application of a three-dimensional (3D) visual interface used to represent a reinsurance program that includes various multi-year coverages that are bound and lapse on a rolling annual basis.
Figure 25B:
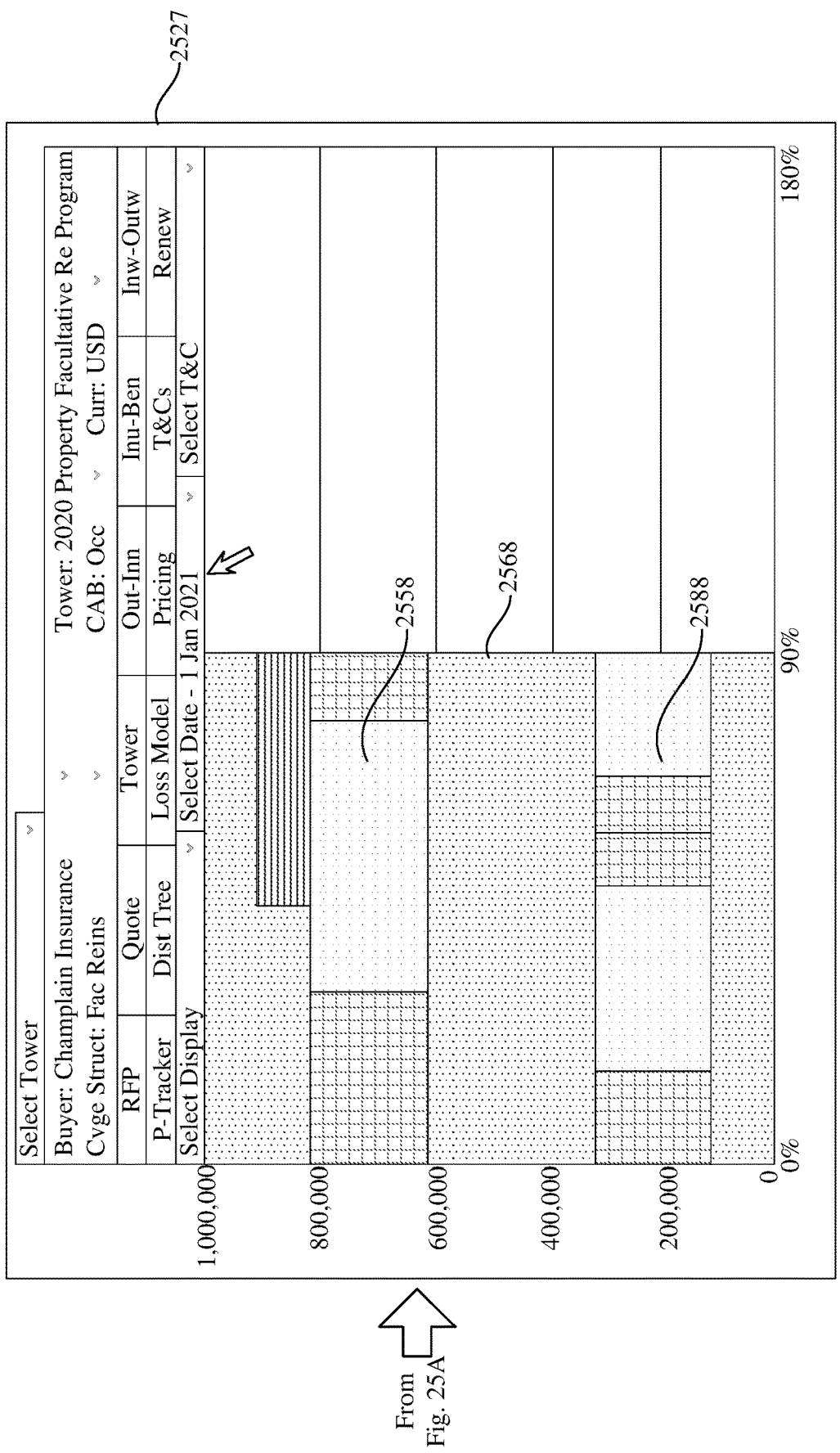

FIG. 25A and FIG. 25B illustrate the application of a three-dimensional (3D) visual interface used to represent a reinsurance program that includes various multi-year coverages that are bound, and then lapse, on a rolling annual basis. As shown in the FIG. 25A, the broker selects the date '1 Jan. 2020' using the 'Select Date' utility control in the tower utility area 235 to retrieve and display the reinsurance coverages that are in-force as of the selected date. The tool can compare the coverage period metadata previously entered by the broker into the placement database 291, 377 for each coverage to enable the selection of the coverages that meet the filter value. The effective coverages include a one-year excess of loss reinsurance policy placed on a subscription basis 2563, and various other excess of loss reinsurance policies placed with different, rolling annual coverage periods 2553, 2583.

To ascertain which coverages will remain in effect one year later, on 1 Jan. 2021, the broker selects the date '1 January 2021' using the 'Select Date' utility control in the tower utility area 235 to retrieve and display the reinsurance coverages remaining in effect on that later date. As shown in FIG. 25B, the one-year subscription coverage 2563 has expired, leaving an unoccupied region 2568 in the tower display. Certain other excess of loss coverages written on an annual rolling basis 2553, 2583 have also expired, leaving other visible gaps 2558, 2588 in the reinsurance program as it applies to the 2021 calendar year. In this way, the broker can easily identify time-related coverage gaps for a multi-year program, and set priorities for the next placement.

Figure 26A:
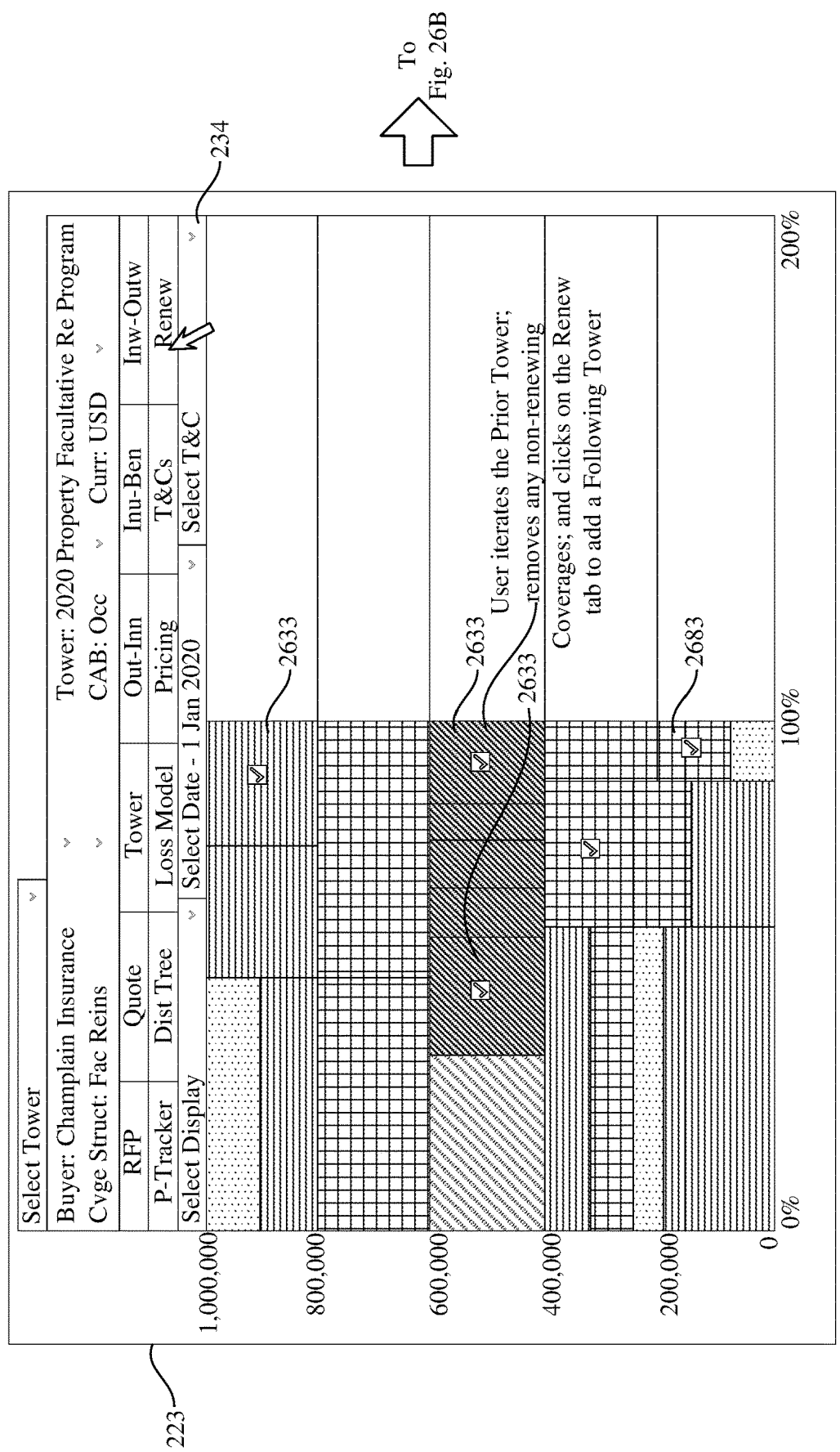
FIG. 26A and FIG. 26B illustrates the use of the three-dimensional (3D) visual interface to simplify the process for renewing an insurance carrier's annual reinsurance program.
Figure 26B:
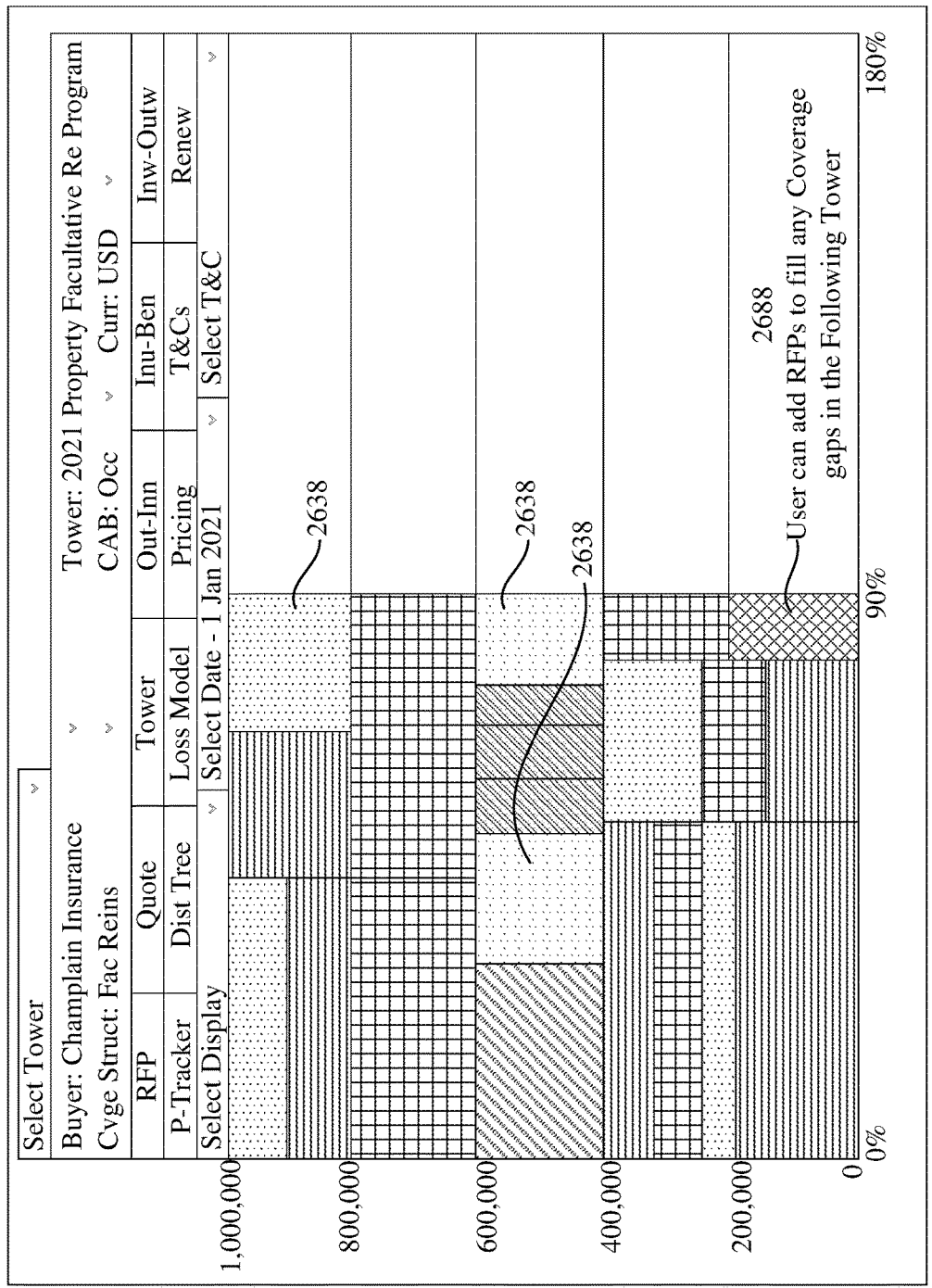

FIG. 26A and FIG. 26B illustrate the use of the three-dimensional (3D) visual interface to simplify the process for renewing an insurance carrier's annual reinsurance program. As shown in FIG. 26A, to renew the buyer's annual program, selects the date 1 Jan. 2020' to retrieve and display the coverages in effect for the calendar year 2020 reinsurance program, and then clicks on the 'Renew' control in the tower command menu area 234 to initiate the display of check-boxes that will allow the broker to select any coverages that will not be continued in the next annual policy year. In this example, the broker checks a number of these checkboxes to select the coverages 2633, 2683 that will not be renewed.

By returning to the 'Select Date' utility control and selecting the date value '1 January 2021, the broker can view the coverages that will be renewed for the following policy year, and identify the coverage gaps introduced by the non-renewal of other coverages. As shown in FIG. 26B, non-renewal of the selected coverages 2633, 2683 leaves coverage gaps 2638, 2688 in the next annual program that will require the broker's attention during the next renewal cycle, and the broker can add a request for proposals (RFP) for each coverage gap 2688 to initiate the new placement.

Use Case #12: Extension of the Visual Interface Used to Assemble Complex Insurance and Reinsurance Programs to Track Claim Development and Coverage Erosion The recently-issued U.S. Pat. No. 10,002,392 B2 disclosed technology that provides systems and methods for processing and displaying database objects that build a composite coverage structure during planning and placement of complex insurance or reinsurance programs. The technology disclosed in this patent extends the visualization methods used for the placement of high-value risk to be used for the administration, and calculation of claim payments, for a claim reported for the composite coverage structure previously constructed during planning and placement of complex insurance or reinsurance programs. FIGS. 28, 29, 30 and 31 illustrate how the systems and methods disclosed can be extended to enable a broker or claim specialist to track claim development as claims are reported to a complex program, and also track the coverage erosion that results from the cumulative financial effect of claim payments made by the insurance or reinsurance carrier.

Figure 28A:
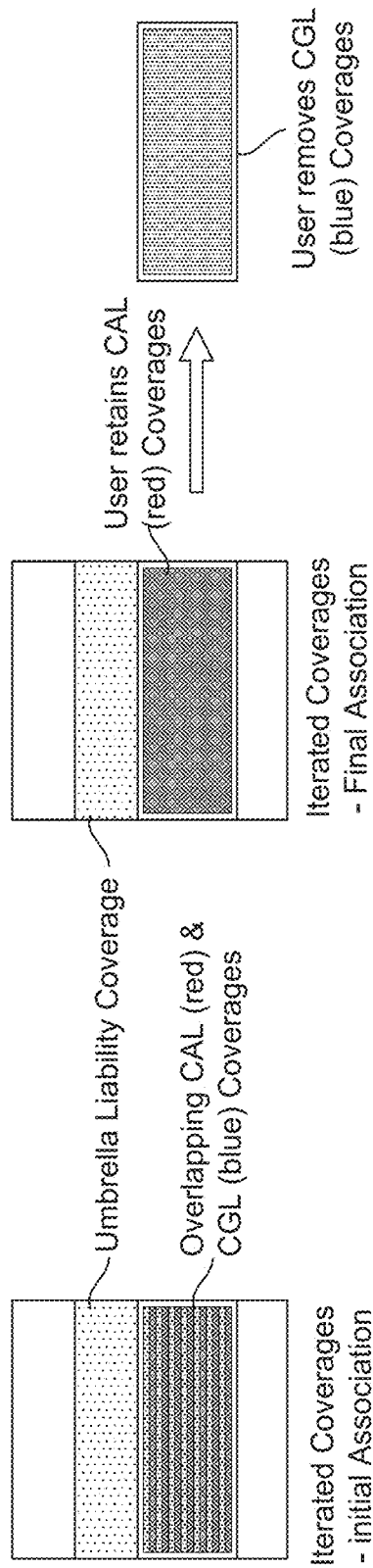

After a claim is reported, and information concerning the claim is entered into a claim data entry table, the broker or claim specialist associates and iterates the coverages within the complex program that apply to the claim. FIG. 28A illustrates the method for associating and iterating individual coverages within a complex program in a case where a claim is reported for an automobile accident, and the broker or claim specialist associates and iterates the commercial auto liability (CAL) coverage, but excludes and removes the commercial general liability (CGL), for the purposes of claim administration.

Figure 28C:
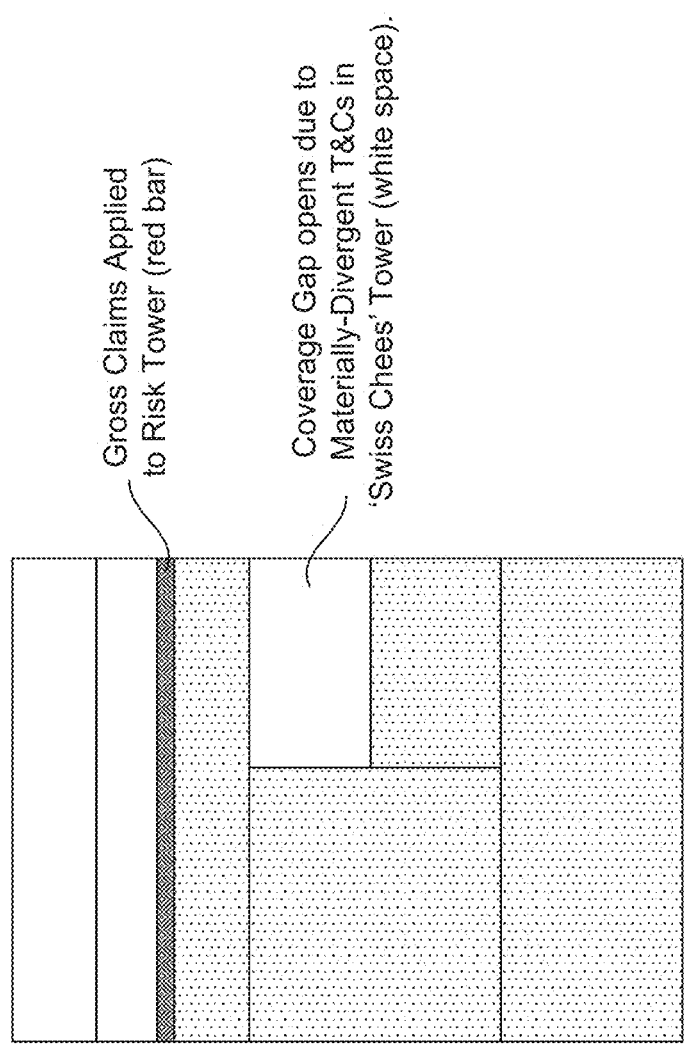

As the gross losses are reported for a claim, and the net claim payments are calculated for each coverage as illustrated by FIG. 28B, the visual interface for claim administration will show the gross losses for the reported claim as a highlighted line, or a similar marking, displayed at the calculated numerical vertical level within the tower database object representing the complex program. The claim visualization will also show the net claim payment for each coverage as a demarcated, occupied region within the coverage that is sized in relation to, and in proportion to, the coverage layer limit. FIG. 28C illustrates how this claim visualization method is used to track claim development for each coverage, and also identify coverage gaps in cases where the net claim payments for a coverage lag behind the gross losses reported for the complex program.

Figure 29A:
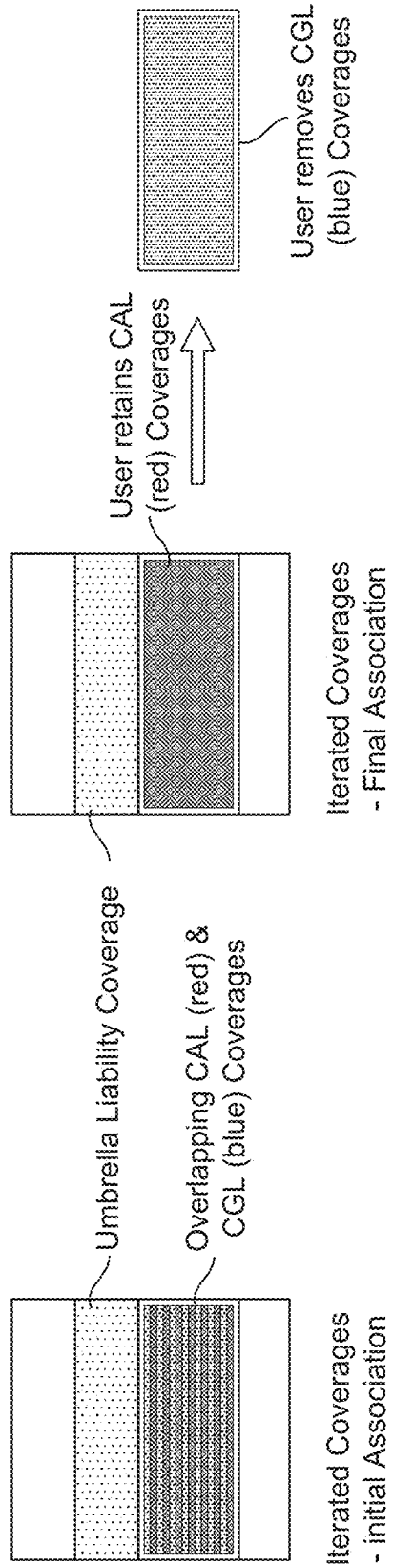
Figure 29C:
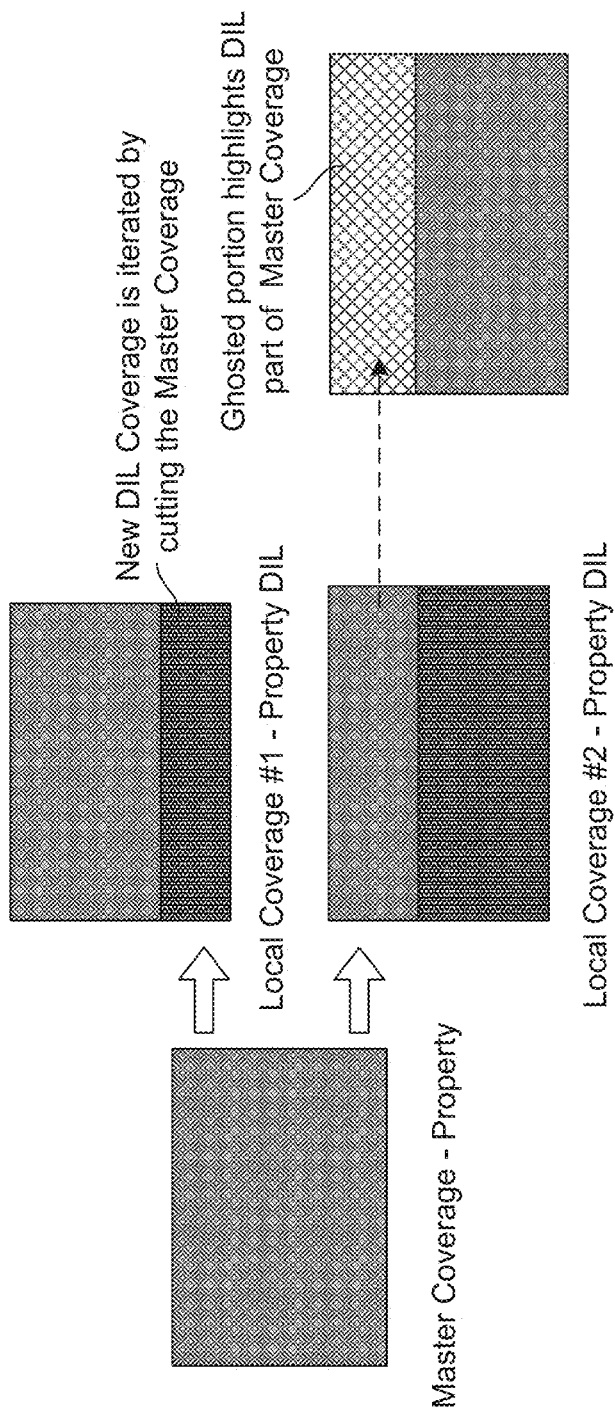
Figure 29D:
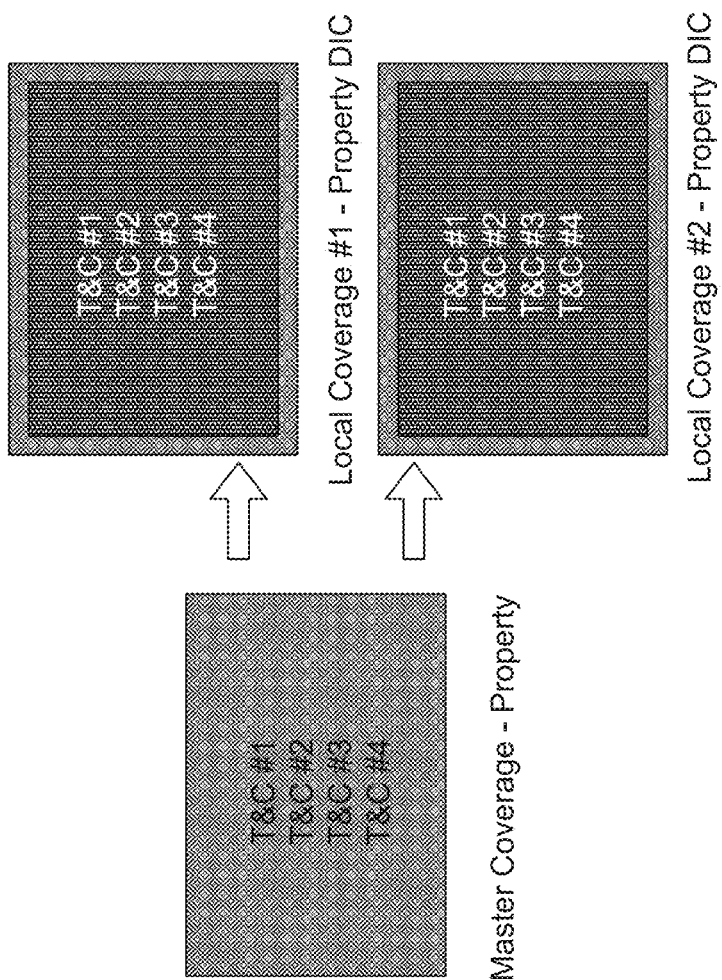

FIG. 29 shows how the claim visualization tools disclosed can be used by a large multinational corporation to coordinate the local coverages and master coverages across its international insurance program. As illustrated by FIG. 29A, once a claim is reported, the corporation will initially apply the local coverages, which is intended to apply to any claim reported s in a particular country or jurisdiction, and will next iterate and associate the broader, master coverage with the same claim to fill any coverage gaps that remain following the application of the local coverage. FIG. 29C shows the application of a master coverage by the large corporation or its broker to fill a coverage gap resulting from a difference in available coverage limits, and FIG. 29D shows the application of a master coverage to fill a coverage gap relating to the narrower terms and conditions specified for the local coverage. As illustrated by FIG. 29B, association and iteration of a master coverage requires the use of complex cutting operations since a composite coverage structure is iterated and applied to the reported claim.

Figure 30A:
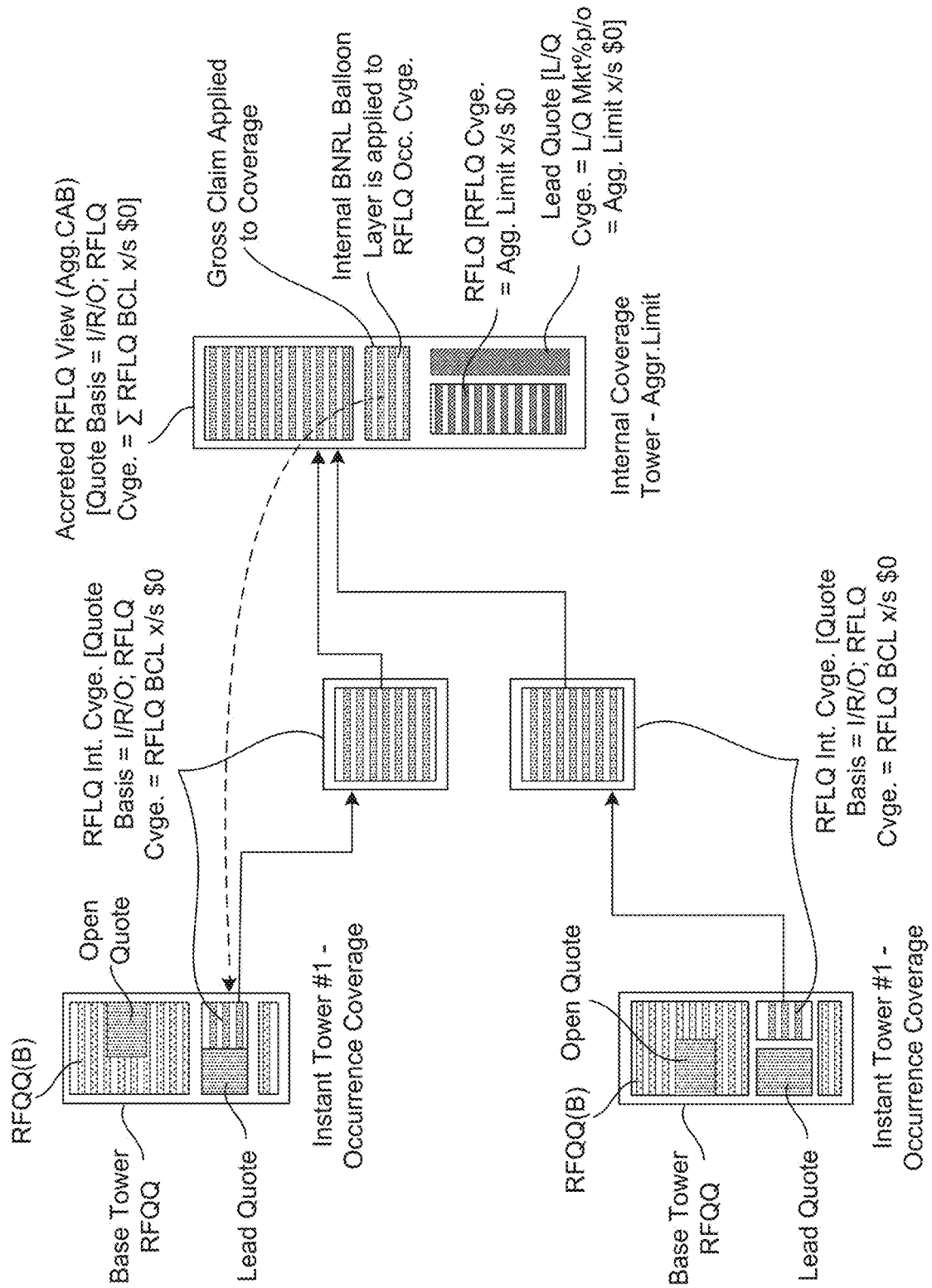
FIGS. 30A, 30B, and 30C show a method for calculating and visualizing the erosion of available coverage capacity for a high-value risk as claims are reported for a collection of bound coverages associated with a tower.
Figure 30B:
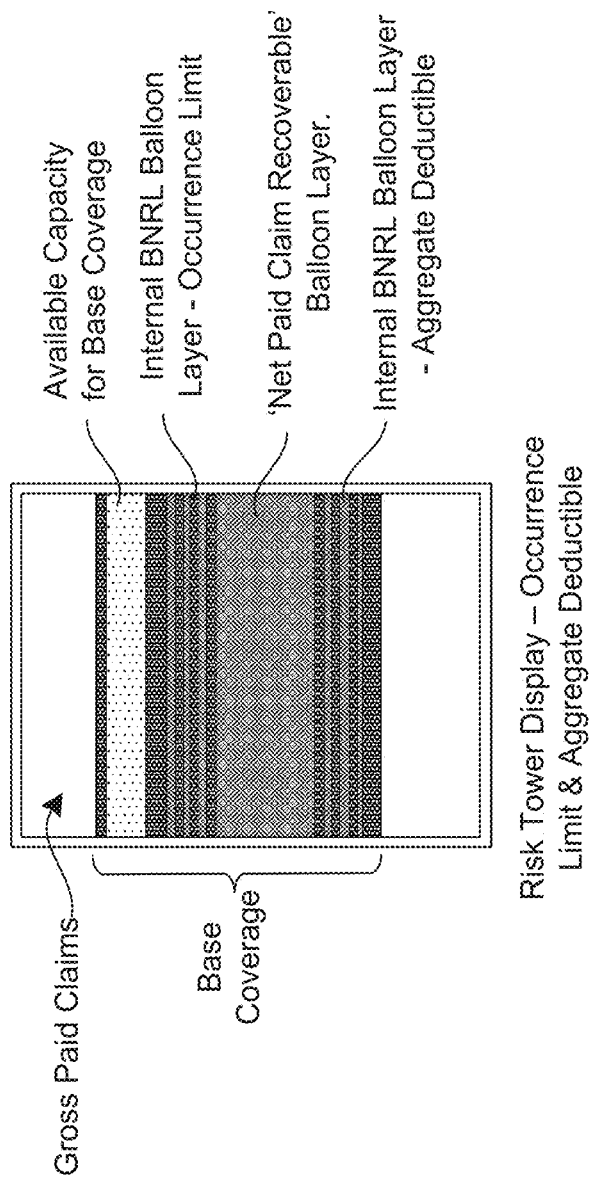
Figure 30C:
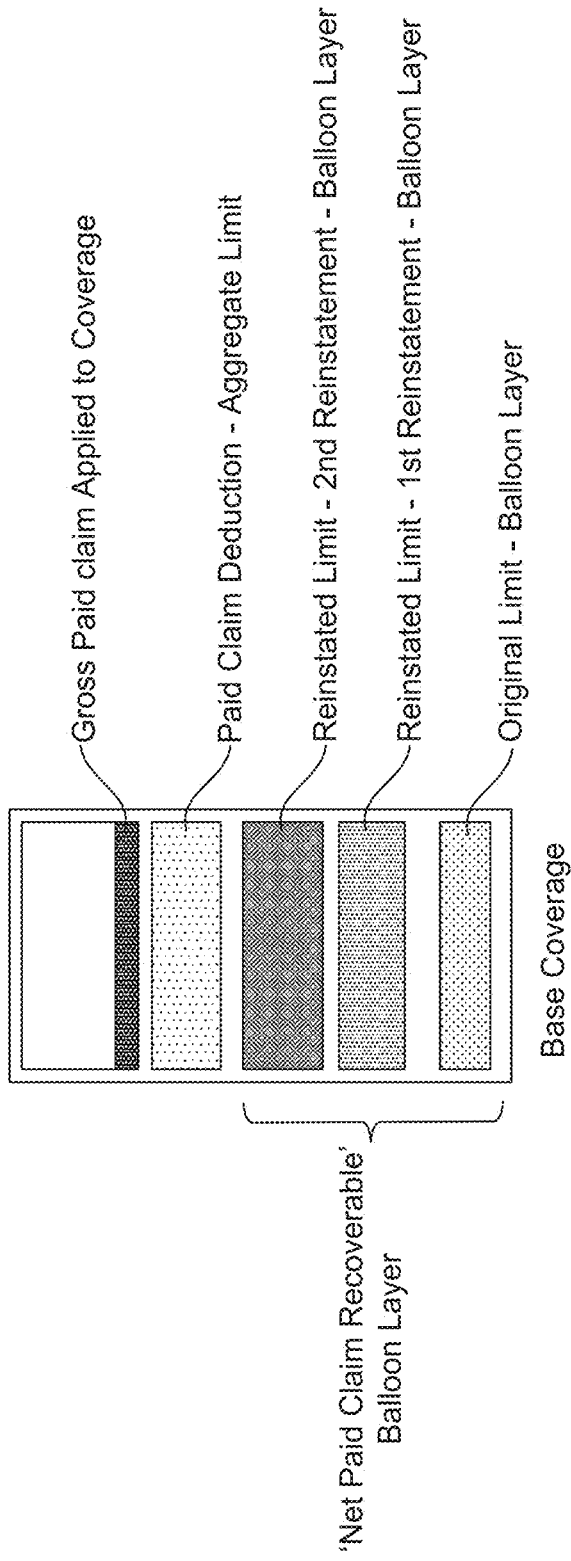

As large claims or numerous, attritional claims are reported for the coverages contained in a complex insurance or reinsurance program, these coverages may be eroded as available capacity is progressively exhausted. Tracking this coverage erosion can be difficult in cases where a base coverage has associated inner aggregate structures, such as occurrence limits or aggregate deductibles. FIG. 30A shows how the claim visualization tools disclosed can be used to track coverage erosion in the case where a base coverage has an associated aggregate limit. These claim visualization methods can be extended to represent the coverage erosion resulting from the application of multiple, inner aggregate structures as shown in FIG. 30B, or the application of a series of coverage reinstatements as shown in FIG. 30C.

Figure 31A:
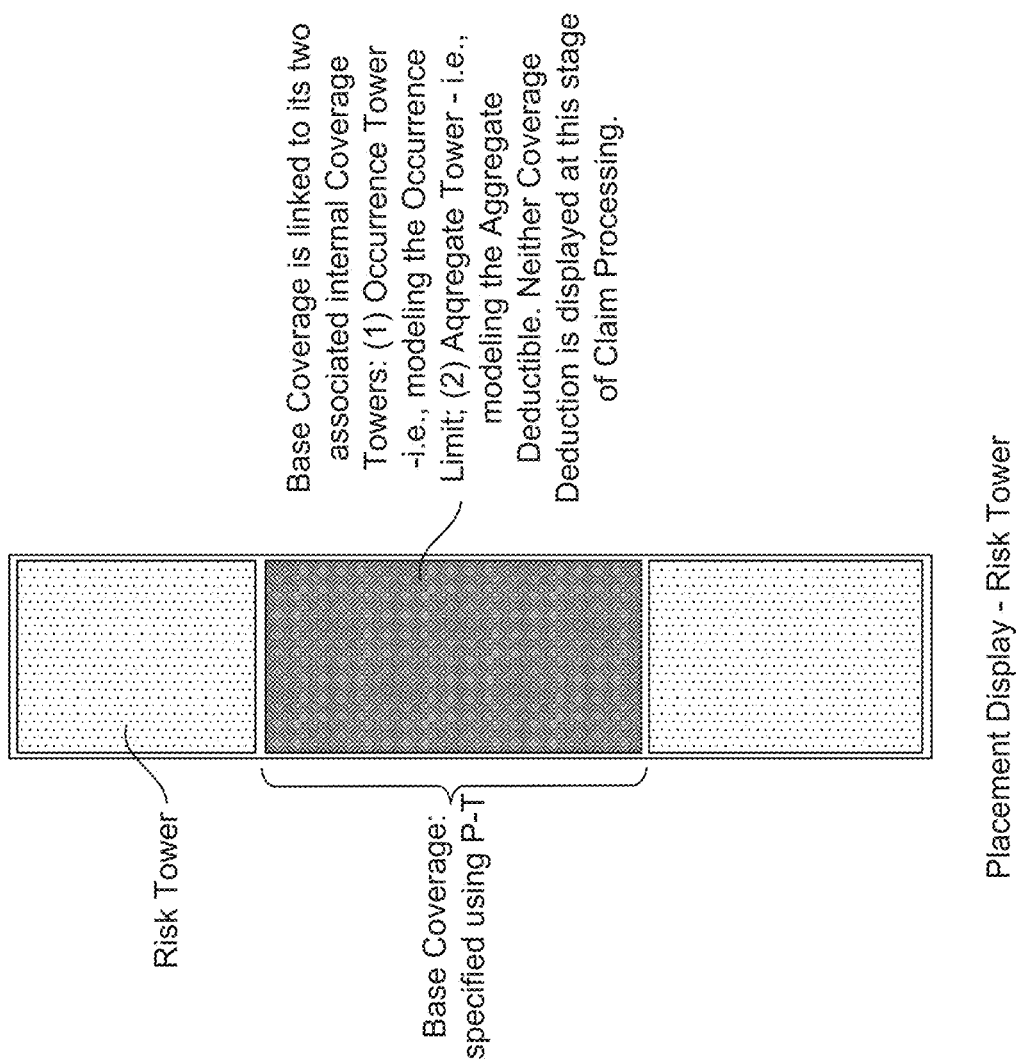
FIGS. 31A, 31B and 31C show how gross reported claims are associated with each coverage within a tower.
Figure 31B:
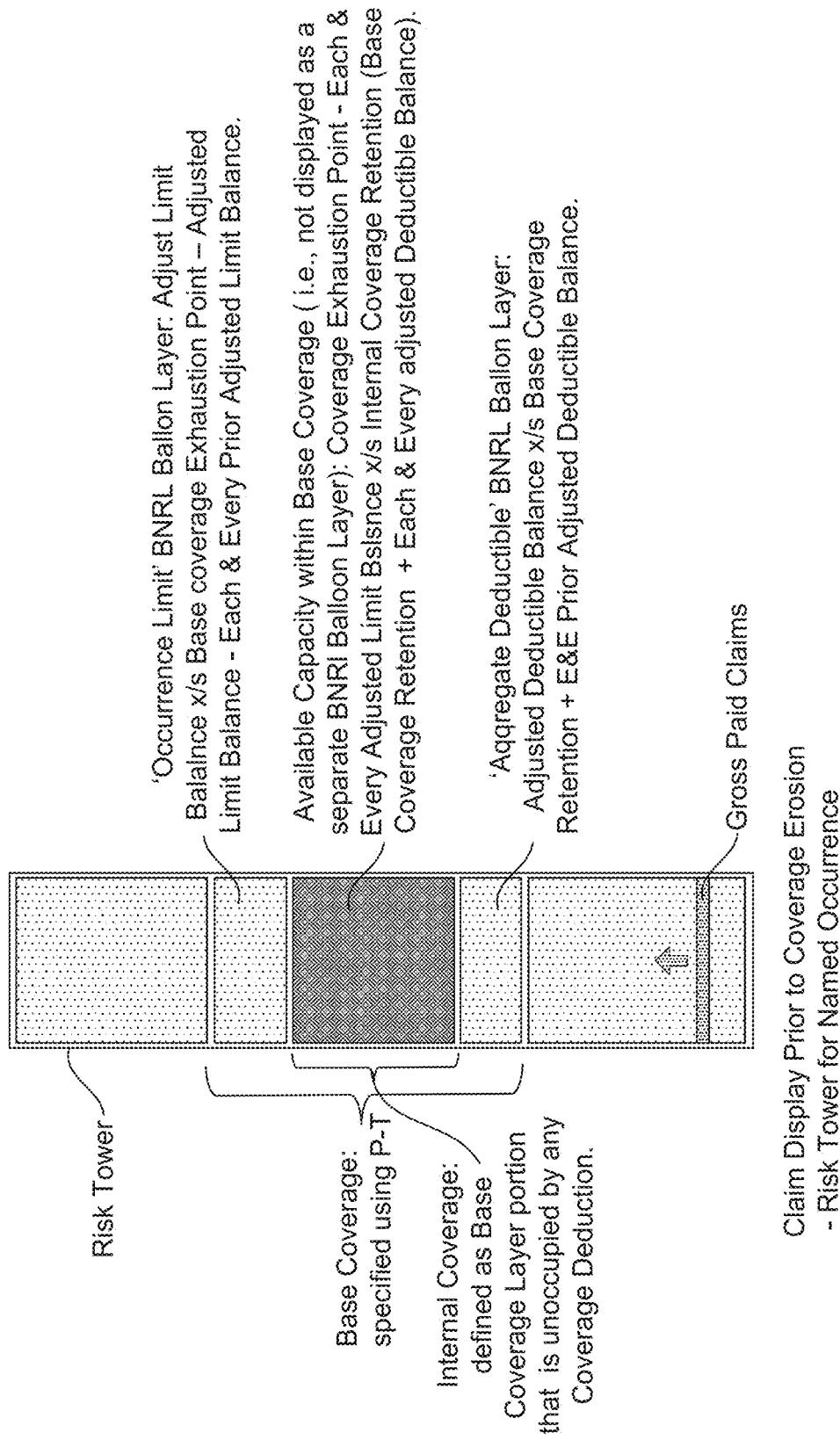
Figure 31C:
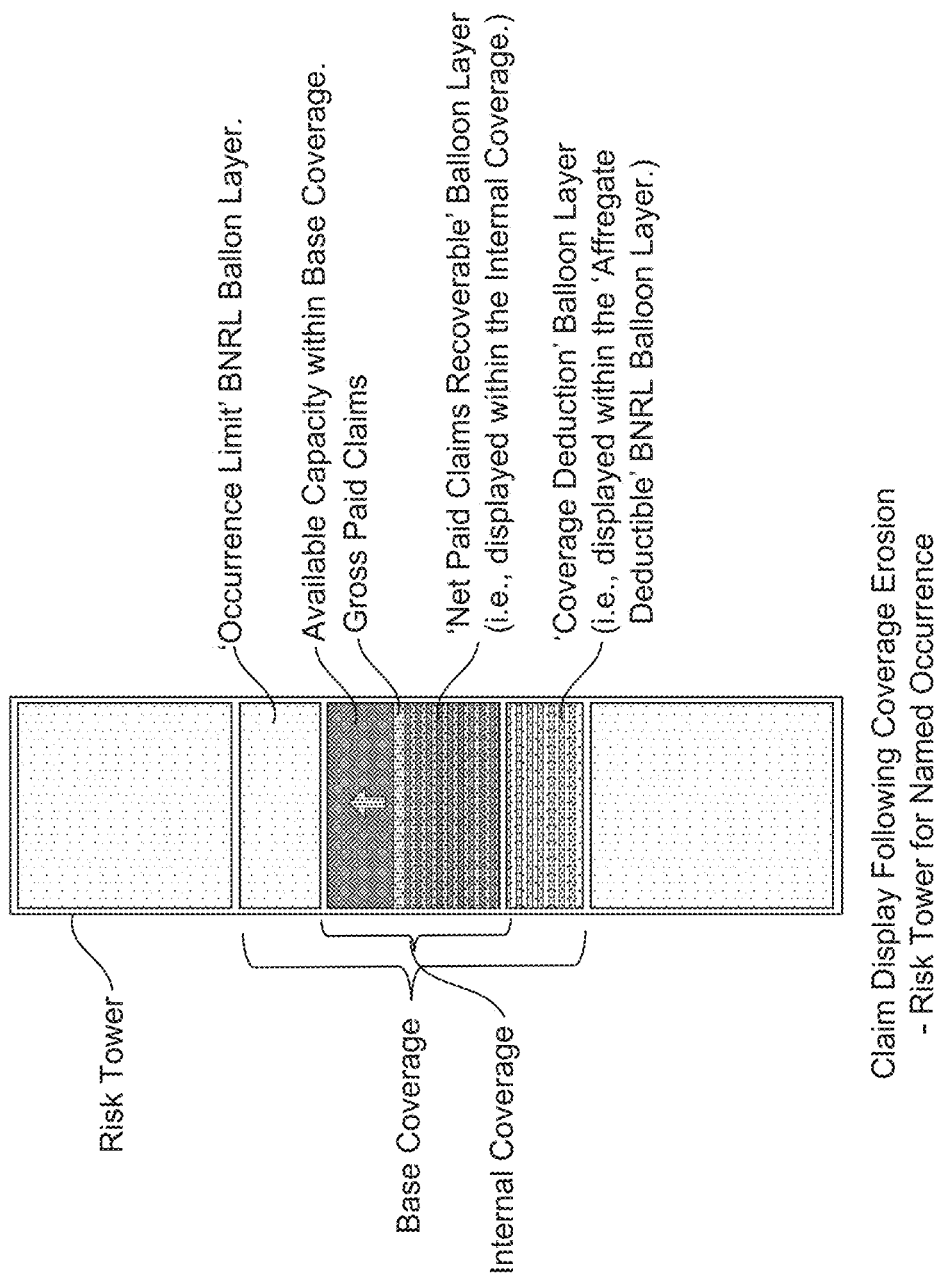

FIG. 31 provides additional detail concerning the stages of the claim visualization method, beginning with placement of a complex program, and continuing through the claim development and coverage erosion processes as claims are reported, and gross claim payments escalate. FIG. 31A illustrates the initial placement stage, which displays the base coverage prior to any coverage erosion. FIG. 31B shows a subsequent stage in which the clam visualization method is used to illustrate the progression of coverage erosion as changes to the occurrence limit and aggregate deductible balances begin to reduce the available capacity provided by the coverage. FIG. 31C shows the final stage where the progressive coverage erosion has reduced the actual net claim payment, and further restricted the remaining, available capacity for the applied coverage.

Figure 32:
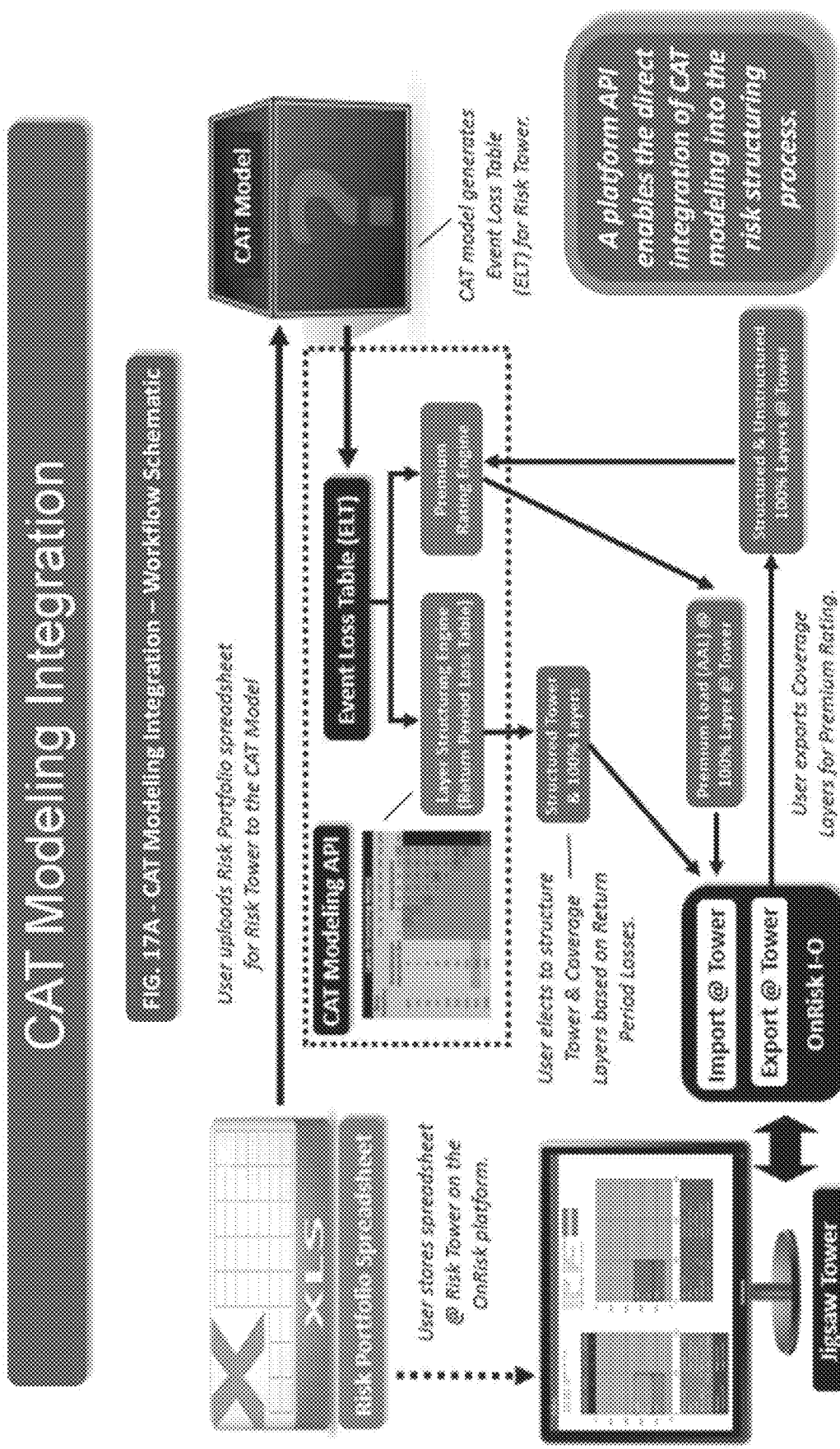
FIG. 32 shows the process by which catastrophe modeling data outputs are organized and transmitted for use in the placement and structuring of high-value risk.
Figure 33:
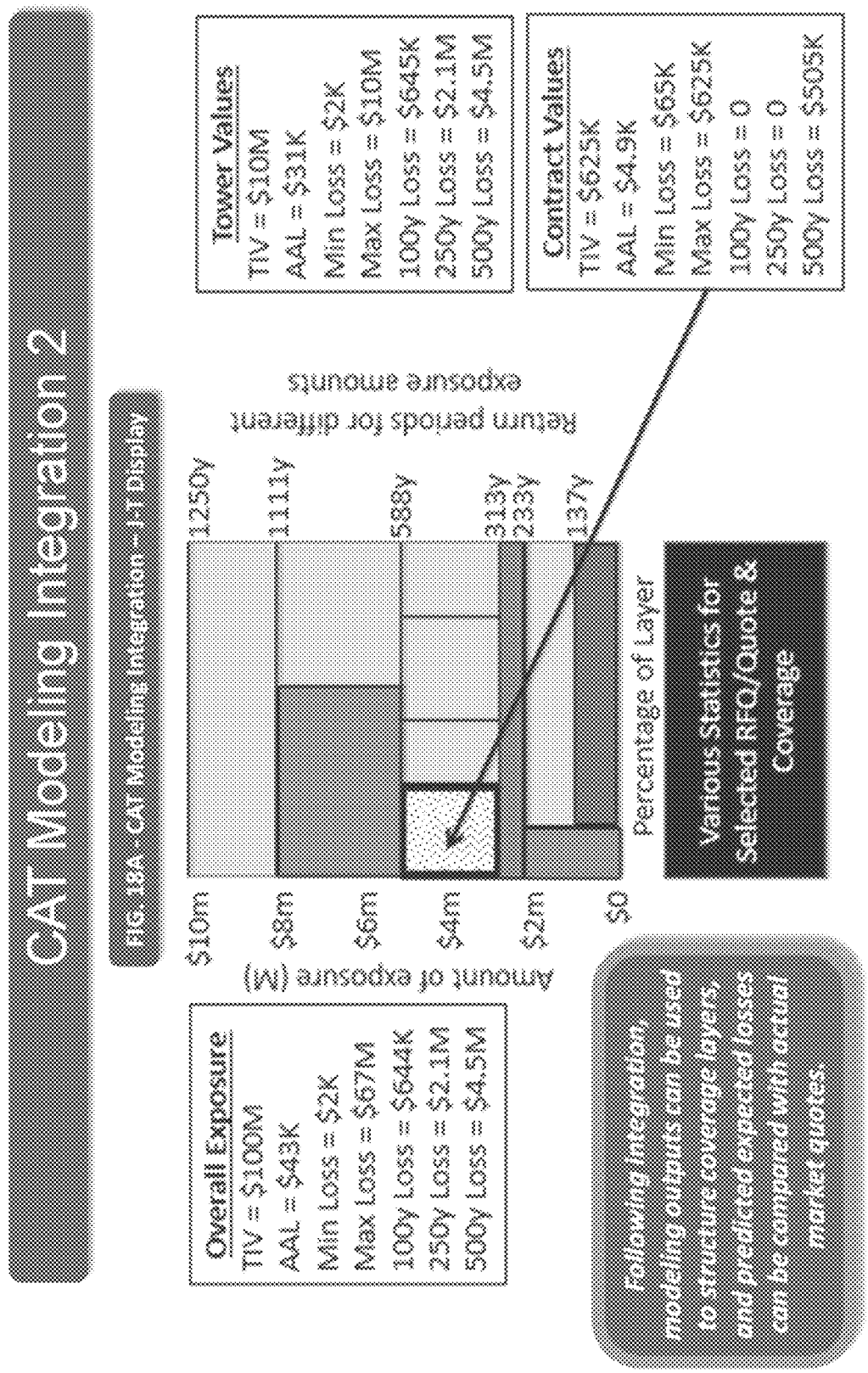
FIG. 33 shows how catastrophe modeling data outputs are used to structure individual coverage layers and shares within a tower.

Use Case #13: Extension of the Visual Interface Used to Assemble Complex Insurance and Reinsurance Programs to Integrate Catastrophe Modeling Data Outputs for Use in Structuring and Placing High-Value Risk The recently-issued U.S. Pat. No. 10,002,392 B2 disclosed technology that provides systems and methods for processing and displaying database objects that build a composite coverage structure during planning and placement of complex insurance or reinsurance programs. The technology disclosed in this patent extends the visualization methods used for the placement of high-value risk to integrate catastrophe modeling data outputs for use in structuring and placing high-value risk. FIGS. 32 and 33 show how the systems and methods disclosed can be extended to enable a broker to use catastrophe modeling data outputs to structure coverage layers within a composite coverage structure, and calculate expected losses and premiums for these coverage layers within a composite coverage structure.

FIG. 32 describes a workflow schematic showing how catastrophe modeling inputs and outputs are used to structure tower and coverage layers, and calculate expected losses and premiums for these coverage layers. As shown in FIG. 17A, following the input of risk portfolio data into a catastrophe model, and following the catastrophe model's use to generate an event loss table modeling the probable catastrophe losses for the risk portfolio, the event loss table is used as an input to a layer structuring engine that calculates potential coverage layers based on the return period for the modeled catastrophes. The broker can then select the individual tower and coverage layers from the layer structuring engine to be automatically included in the complex program.

FIG. 32 also shows how any coverage layers auto-structured using the layer structuring engine and selected by the broker, as well as any layers manually entered by the broker into the coverage data entry table, can provide data inputs to the premium rating engine for the calculation of expected catastrophe losses and premiums for the coverage layers.

FIG. 33 shows a tower database object that includes a tower coverage layer, and several individual coverage layers, that have been auto-structured by return period using catastrophe modeling data outputs and the layer structuring engine. The return periods used for structuring the coverage layers In the tower are denoted vertically to the right of the tower as illustrated in FIG. 33. FIG. 33 also shows the total insured value (TIV) of the subject risk portfolio, as adjusted for coverage layer and share, as well as the expected losses for each coverage, including the average annual loss (AAL), the minimum and maximum loss, and the losses for the 100-year, 250-year and 500-year return periods for the natural catastrophes being modeled.

Computer System

Figure 27:
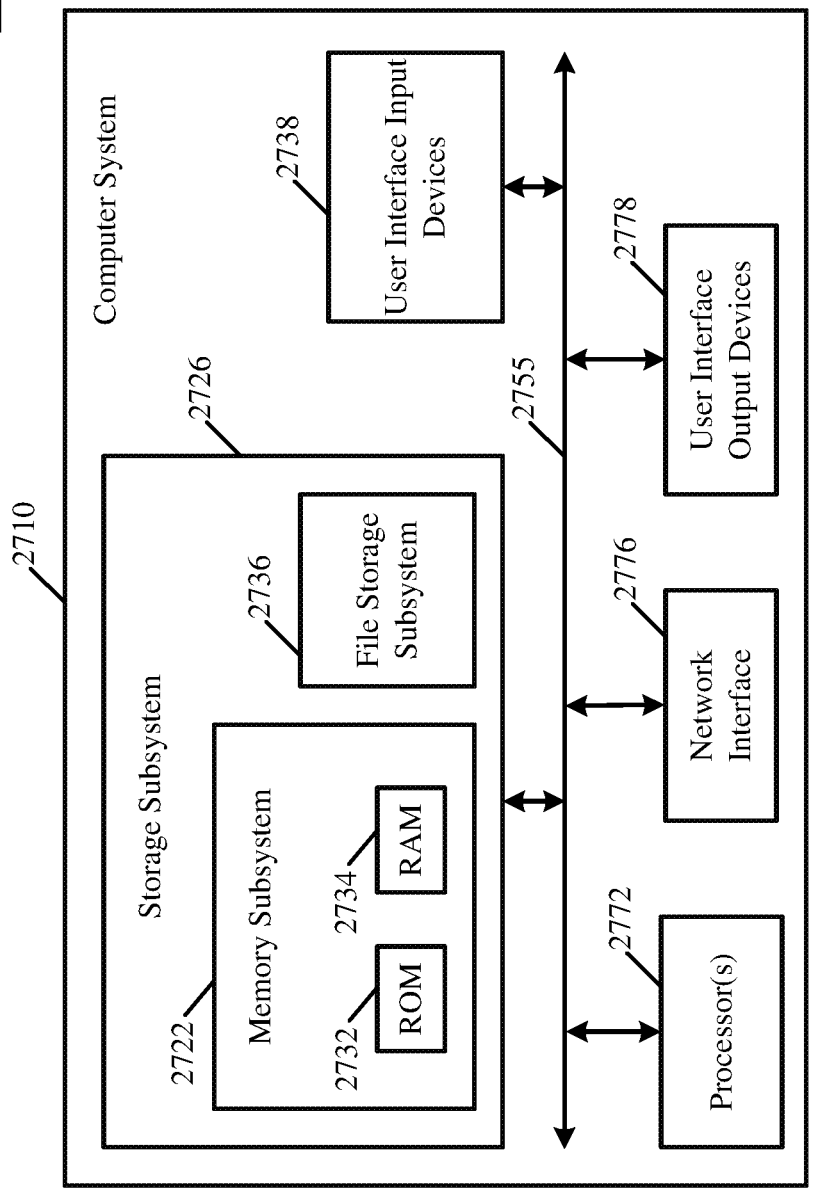
FIG. 27 shows an example computer system used as an information program environment.

FIG. 27 is a block diagram of an example computer system 2700. FIG. 27 is a block diagram of an example computer system, according to one implementation. The processor can be an ASIC or RISC processor. It can be an FPGA or other logic or gate array. It can include graphic processing unit (GPU) resources. Computer system 2710 typically includes at least one processor 2772 that communicates with a number of peripheral devices via bus subsystem 2755. These peripheral devices may include a storage subsystem 2726 including, for example, memory devices and a file storage subsystem, user interface input devices 2738, user interface output devices 2778, and a network interface subsystem 2776. The input and output devices allow user interaction with computer system 2710. Network interface subsystem 2776 provides an interface to outside networks, including an interface to corresponding interface devices in other computer systems.

User interface input devices 2738 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 2710.

User interface output devices 2778 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system 2710 to the user or to another machine or computer system.

Storage subsystem 2726 stores programming and data constructs that provide the functionality of some or all of the modules and methods described herein. These software modules are generally executed by processor 2772 alone or in combination with other processors.

Memory subsystem 2722 used in the storage subsystem can include a number of memories including a main random access memory (RAM) 2734 for storage of instructions and data during program execution and a read only memory (ROM) 2732 in which fixed instructions are stored. A file storage subsystem 2736 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 2736 in the storage subsystem 2726, or in other machines accessible by the processor.

In some implementations, network(s) can be any one or any combination of Local Area Network (LAN), Wide Area Network (WAN), WiMAX, Wi-Fi, telephone network, wireless network, point-to-point network, star network, token ring network, hub network, mesh network, peer-to-peer connections like Bluetooth, Near Field Communication (NFC), Z-Wave, ZigBee, or other appropriate configuration of data networks, including the Internet.

Bus subsystem 2755 provides a mechanism for letting the various components and subsystems of computer system 2710 communicate with each other as intended. Although bus subsystem 2755 is shown schematically as a single bus, alternative implementations of the bus subsystem may use multiple busses.

Computer system 2710 can be of varying types including a workstation, server, computing cluster, blade server, server farm, or any other data processing system or computing device. Due to the ever-changing nature of computers and networks, the description of computer system 2710 depicted in FIG. 27 is intended only as one example. Many other configurations of computer system 2710 are possible having more or fewer components than the computer system depicted in FIG. 27.

PARTICULAR IMPLEMENTATIONS

We describe systems, methods, and articles of manufacture for graphic computing of operations related to objects in a placement database. The technology disclosed includes at least four categories of operations, as previously identified. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

One base implementation of the disclosed technology includes a method of method of graphically creating placement objects. The method includes maintaining a database of placement objects including proposal objects, policy objects and coverage objects. In this placement database, at least the policy objects and the coverage objects can be linked in trees. The policy objects are linked to respective proposal objects. And the coverage objects are linked to the proposal objects and the policy objects. The method further includes causing display of a GUI that represents a first step in a placement using first objects and a second step in the placement using one or more second objects, with metadata that describes status of the first and second objects, wherein groups of the second objects are properly nested within a first object and linked in the database of placement objects. It also includes receiving via the GUI a user selection of a displayed first object and of a mode control to initiate creation of second objects linked to the displayed first object and, responding thereto by opening a panel that scales the selected first object to fit the panel and that allows the user to add nested second objects by a choice of drawing an added second object or by entering metadata for the added second object, wherein entered metadata for the added second objects is forced to be consistent with the nesting of the added second objects within the selected first object.

This method and other implementations of the technology disclosed can include one or more of the following features and/or features described in connection with additional methods disclosed. In the interest of conciseness, the combinations of features disclosed in this application are not individually enumerated and are not repeated with each base set of features. Features applicable to systems, methods, and articles of manufacture are not repeated for each statutory class set of base features. The reader will understand how features identified in this section can readily be combined with base features in other statutory classes and sets of base features identified.

In some implementations, the selected first object and the added second objects both are proposal objects and the GUI includes a control for sending by email requests for proposal based on the added second objects.

The method can further include causing display of a GUI control for entering metadata for the displayed first object that defines an attachment point, a layer limit and at least one coverage type. Then, receiving and storing the metadata for the displayed first object that defines the attachment point, the layer limit and the at least one coverage type and automatically creating at least one coverage object linked to the first object. And, receiving and storing the metadata for the added second objects that defines a layer share for each of the second objects as part of the displayed first object. The entered metadata for the added second objects can be rendered consistent with the coverage type of the selected first object.

The method also can include receiving a user request to send the email requests by email requests for proposal based on the added second objects. In response to the request, it includes generating the email requests using the entered metadata for the added second objects.

The method can be recursively apply the GUI to placement in a third step, by receiving via the GUI a user selection of a displayed second object and of a mode control to initiate creation of third objects linked to the displayed second object and, responding thereto by opening a panel that scales the selected second object to fit the panel and that allows the user to add nested third objects by a choice of drawing an added third object or by entering metadata for the added third object, wherein entered metadata for the added third objects is forced to be consistent with the nesting of the added third objects within the selected second object.

The metadata for the attachment point, the layer limit and the coverage type can be stored in the coverage objects. This has the advantage of accommodating sublimits of coverages in a bundle or split coverage.

In other implementations, the selected first object and the added second objects both are proposal objects. At least one lead second object is a proposal object for a lead quote, to be solicited from at least one market leader. A plurality of following second objects are proposal objects for following a lead quote received from the market leader, linked to the lead second object, to be solicited from following markets. These implementations further include causing display of GUI controls to initiate sending a lead quote request, entering a lead quote, and sending following quote requests. And, receiving a first user action via the GUI and responding thereto by sending the lead quote request.

These implementations can further include receiving and storing the lead quote from the at least one market leader. And receiving a second user action that selects the lead second object and responding thereto by sending the following quote requests to following markets represented by the linked following second objects.

The method also can include causing display of a GUI control for entering metadata for the displayed first object that defines an attachment point, a layer limit and at least one coverage type. Then, receiving and storing the metadata for the displayed first object that defines the attachment point, the layer limit and the at least one coverage type and automatically creating at least one coverage object linked to the first object. Also, receiving and storing the metadata that defines a layer share for each of the second objects as part of the displayed first object. The entered metadata for the added lead second object can be rendered consistent with the coverage type of the selected first object.

Similar to above, the metadata for the attachment point, the layer limit and the coverage type can be stored in the coverage objects.

In other implementations, the first object is a proposal object for a tower that includes layers and the second objects are proposal objects for the layers within the tower.

Tower implementations can further include causing display of a GUI control for entering metadata for the displayed first object that defines an overall tower limit and at least one coverage type. Then, receiving and storing the metadata for the displayed first object that defines the overall tower limit and the at least one coverage type and automatically creating at least one coverage object linked to the first object. Also, receiving and storing the metadata for the added second objects that defines an attachment point and a layer limit for each of the second objects within the displayed first object. And, automatically creating at least one coverage object linked to the added second objects, forced to be consistent with the nesting of the added second objects within the selected first object.

Another base implementation can be practiced as a method of spawning third and fourth placement objects from first and second placement objects to represent a split coverage. This method includes maintaining a database of placement objects including proposal objects, policy objects and coverage objects. In the placement database, at least the policy objects and the coverage objects can be linked in trees. The policy objects are linked to respective proposal objects. The coverage objects are linked to the proposal objects and the policy objects. The method includes causing display of a GUI that represents a first step in a placement using first objects in an initial tower and a second step in the placement using one or more second objects in the initial tower, with metadata that describes status of the first and second objects, wherein groups of the second objects are properly nested within a first object and linked in the database of placement objects. It further includes causing display of a GUI control for spawning third objects in a split tower from the first objects and spawning fourth objects in the split tower from the second objects. Groups of the fourth objects are properly nested within a third object and linked in the database of placement objects. The split tower has an overall tower limit based on the initial tower limit and at least one split coverage type that is complementary to an initial coverage type of the initial tower. The method also includes, receiving via the GUI a user selection of a mode control to initiate creation of the split tower, the third objects and the fourth objects and, responding thereto by opening a panel that displays the split tower and the third and fourth objects including copying metadata for attachment points, layer limits and layer parts of the third and fourth objects from the first and second objects.

In some implementations, the complementary coverage in the split tower is a coverage type that is excluded from the initial tower. In other implementations, the complementary coverage in the split tower is for a political subdivision that is excluded from the initial tower. For backstop coverage, the complementary coverage in the split tower is base coverage for a political subdivision and the coverage in the initial tower is backstop coverage for the political subdivision and additional territories. Or, conversely, the complementary coverage in the initial tower is base coverage for a political subdivision and the coverage in the split tower is backstop coverage for the political subdivision and additional territories.

The metadata for the attachment point, the layer limit and the coverage type can be stored in the coverage objects.

Another base implementation can be practiced as a method of linking third and fourth placement objects with first and second placement objects to represent inuring and benefiting coverages. This method again includes maintaining a database of placement objects including proposal objects, policy objects and coverage objects. In this placement database, at least the policy objects and the coverage objects can be linked in trees. The policy objects are linked to respective proposal objects. The coverage objects are linked to respective proposal objects and to respective policy objects. The method can further include causing display of a GUI that includes first objects that represent layers in an inuring tower and one or more second objects that represent layer shares in the inuring tower, with metadata that describes status of the first and second objects, wherein groups of the second objects are properly nested within a first object and linked in the database of placement objects. It can include causing display of a GUI for creating third objects in a benefiting tower, leading to display of corresponding second objects displayed with a ghosted appearance. The GUI can further accept priority terms that relate the third objects to objects in the inuring tower. And the ghosted second objects will be displayed in the inuring tower in positions based on the priority terms of the third objects relative to the objects in the inuring tower that are not ghosted. It also can include, receiving via the GUI a user selection of a mode control to initiate creation of the benefiting tower and responding thereto by causing display of the benefiting tower. And, receiving via the GUI a user action to initiate creation of at least one third object in the benefiting tower and responding thereto by opening a panel that allows the user to add third objects by a choice of drawing an added third object or by entering metadata for the added third object, wherein required metadata for the third object captures priority of benefiting coverage of the third object against other coverages.

Some implementations further include receiving via the GUI a user selection of a mode control to view the inuring tower and responding thereto by calculating response of the third objects in the benefiting tower to second objects that are not ghosted, including splitting at least one third object for display both below and above a respective second object, and causing display of the inuring tower with a ghosted second object based on the third object, both below and above the respective second object.

The metadata for the priority of the benefiting coverage against other coverages can be stored in the coverage objects.

Another base implementation can be practiced as a method of visually linking third placement objects that represent an outward ceding of coverage from first and second placement objects that represent an assumed coverage. This method, again, includes maintaining a database of placement objects including proposal objects, policy objects and coverage objects. In this placement database, at least the policy objects and the coverage objects can be linked in trees. The policy objects are linked to respective proposal objects. The coverage objects are linked to the proposal objects proposal objects and the policy objects. The method further includes causing display of a GUI that includes first objects in an inward tower and one or more second objects in the inward tower, with metadata that describes status of the first and second objects, wherein groups of the second objects are properly nested within a first object and linked in the database of placement objects. It also includes causing display of a GUI control for creating third objects in an outward tower from selected first objects and/or creating fourth objects in the outward tower from selected second objects. Groups of the fourth objects are properly nested within a third object and linked in the database of placement objects. The outward tower has an overall tower limit that includes at least a sum of limits from the selected objects in the inward tower. The method further incudes receiving via the GUI a user selection of a mode control to initiate creation of the outward tower, the third objects and/or the fourth objects and, responding thereto by opening a panel that displays the outward tower and the third and/or fourth objects created from objects nested in the inward tower. The creating can include copying metadata for attachment points and layer limits of the third and/or fourth objects from the selected first and/or second objects.

Some implementations further include causing display of the outward tower with a the third and/or fourth objects. The outward tower can represent facultative reinsurance.

The third objects can be linked to the selected first and/or second objects. The metadata for the attachment points and layer limits can be stored in the coverage objects.

Another base implementation can be practiced as a method of analyzing second objects for consistency in a follow-form tower. This method, again, includes maintaining a database of placement objects including proposal objects, policy objects and coverage objects. In this placement database, at least the policy objects and the coverage objects can be linked in trees. The policy objects are linked to respective proposal objects. The coverage objects are linked to respective proposal objects and to respective policy objects. The method can include causing display of a GUI that represents layers in the follow-form tower as first objects and layer shares in the follow-form tower as second objects, with metadata that describes status of the first and second objects, wherein groups of the second objects are properly nested within a first object and linked in the database of placement objects. It also can include receiving via the GUI a user selection of a displayed first object and of a mode control to initiate creation of second objects in follow-form layers linked to the displayed first object and, responding thereto by opening a panel that scales the selected first object to fit the panel and that allows the user to add nested second objects by a choice of drawing an added second object or by entering metadata for the added second object. R required metadata for the added second objects can describe follow-form terms and exceptions of the second objects, relative to a first or second object that represents a primary coverage or an underlying coverage, to which other coverages are supposed to follow-form.

This base implementation includes receiving via a GUI a user selection of a follow-form analysis mode. Then, analyzing metadata of at least the second objects in the follow-form layers for conformance with a selected coverage and classifying each second object, based on the metadata, into one of at least three categories representing the selected coverage included, partially included or excluded for the second object. (Alternatively, two categories of selected coverage included or excluded could be used.) It also includes causing display of a graphically coded version of the follow-form tower, wherein graphic coding of at least the second objects in the follow-form layers for conformance with the selected coverage indicates at least whether the selected coverage is included, partially included or excluded for the second objects.

Some implementations further include representing whether the selected coverage is included, partially included or excluded for the second objects using green, yellow, and red color coding.

The method can be extended to receiving user requests to analyze and display the graphically coded version of the follow-form tower for multiple coverages from bundles and responding by cycling through the multiple coverages under user control.

The metadata for the follow-form terms and exceptions can be stored in the coverage objects.

Another base implementation can be practiced as a method of graphically creating third objects representing aggregate coverages linked to first or second objects representing layers or coverages in the layers. This method includes maintaining a database of placement objects including proposal objects, policy objects and coverage objects, as described above. It can include causing display of a GUI that includes first objects that represent the layers in an initial tower and one or more second objects that represent the layer shares in the initial tower, with metadata that describes status of the first and second objects, wherein groups of the second objects are properly nested within a first object and linked in the database of placement objects. It also can include receiving via the GUI a user selection of a displayed first object or second object and of a mode control to initiate creation of one or more third objects linked to the selected object and, responding thereto by opening a panel that allows the user to add nested third objects by a choice of drawing an added third object or by entering metadata for the added third object, wherein required metadata for the added third object represents an aggregate limit and, alternatively, a reinstatement of an aggregate limit. It further can include causing display of the third objects with a sum of aggregate limits and reinstatements of the aggregate limit for the third objects that exceeds a layer limit applicable to the selected object.

Yet another base implementation can be practiced as a method of graphically creating bundled placement objects. This method includes maintaining a database of placement objects including proposal objects, policy objects and coverage objects, as described repeatedly. It includes causing display of a GUI that represents a first step in a placement using first objects and a second step in the placement using one or more second objects, with metadata that describes status of the first and second objects, wherein groups of the second objects are properly nested within a first object and linked in the database of placement objects. It further includes receiving via the GUI a user selection of a displayed first object and of a mode control to initiate creation of second objects linked to the displayed first object and, responding thereto by opening a panel that scales the selected first object to fit the panel and that allows the user to add nested second objects by a choice of drawing an added second object or by entering metadata for the added second object, wherein required metadata for the added second objects identifies a plurality of coverages, represented by coverage objects.

Some implementations further include receiving via a GUI a user selection of a bundled coverage analysis mode that specifies a particular coverage in the bundle. This method includes analyzing metadata of at least the second objects for provision of the particular coverage and classifying each second object, based on the metadata, into one of at least three categories representing the selected coverage included or excluded for the second object. It can include causing display of a graphically coded version of the first and second objects, wherein graphic coding of at least the second objects for provision of the particular coverage indicates at least whether the particular coverage is included or excluded for the second objects.

Some implementations also include representing whether the selected coverage is included, partially included or excluded for the second objects using green and red color coding.

Additional implementations include receiving user requests to particular and display the graphically coded version of multiple coverages from bundles and responding by cycling through the multiple coverages under user control.

A pair of base implementations apply to analyzing multi-year coverage, with side-by-side or 3D extrusion displays. Both of these implementations include maintaining a database of placement objects including proposal objects, policy objects and coverage objects, as described. The side-by-side method includes causing display of a GUI that represents layers in a tower as first objects and layer shares in the follow-form tower as second objects, with metadata that describes status of the first and second objects, wherein groups of the second objects are properly nested within a first object and linked in the database of placement objects. It also includes receiving via the GUI a user selection of a displayed first object and of a mode control to initiate creation of second objects linked to the displayed first object and, responding thereto by opening a panel that scales the selected first object to fit the panel and that allows the user to add nested second objects by a choice of drawing an added second object or by entering metadata for the added second object, wherein required metadata for the added second objects includes a date range in which a coverage represented by the added second object is in force. It further includes receiving via the GUI a user selection of a side-by-side display of the tower for two periods starting on different dates and, responding thereto by opening a second panel and displaying the tower with coverages in effect on the two different starting dates for visual inspection. This method can be extended by receiving via the GUI a user selection of an unoccupied area of the tower in one of the two periods and, responding thereto by opening a panel that scales the selected unoccupied area to fit the panel and that allows the user to add nested second objects by a choice of drawing an added second object or by entering metadata for the added second object, wherein entered metadata for the added second objects is forced to be consistent with the nesting of the added second objects within the selected unoccupied area. It also can include receiving a user request to send email requests for one or more proposals based on the added second objects and responding to the user request by generating the email requests using the entered metadata for the added second objects.

The 3D version of this base implementation can be practiced as a method of analyzing multi-year coverage by rendering 3D with slices of coverages. This method includes maintaining a database of placement objects including proposal objects, policy objects and coverage objects, as described. It includes causing display of a GUI that represents layers in a tower as first objects and layer shares in the follow-form tower as second objects, with metadata that describes status of the first and second objects, wherein groups of the second objects are properly nested within a first object and linked in the database of placement objects. Then, receiving via the GUI a user selection of a displayed first or second object. It further includes causing display of a view of a 3D extrusion of the tower over a selected period, with a depiction of one or move coverages in effect over the selected tower that correspond to the user selected object, the depiction being displayed as a 3D part embedded in the 3D extrusion of the tower and showing any gap during the selected period in coverages with limits, attachment points and layer shares corresponding to the selected object.

In general, the base implementation can be extended to include most any combination of features described throughout this disclosure. In the interest of conciseness, the self-apparent permutations of features combinable in a method system are not exhaustively enumerated.

Other implementations of the technology disclosed can be practiced as non-transitory tangible computer-readable memory including computer program instructions that cause a computer to implement any of the methods described above. Reference to computer-readable media, even without the term non-transitory, does not extend in this application to signals or other non-statutory transitory carriers that sometimes are called memory. Yet other implementations can be practiced as computer-implemented systems including memory and one or more processors operable to execute instructions, stored in the memory, to perform any of the methods described above. Should patent law be extended to transitory signals, it should be noted that computer systems can read transitory signals and such signals can include computer program instructions that cause a computer to implement any of the methods described above.

While the technology disclosed is disclosed by reference to examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A non-transitory computer readable storage medium that stores program instructions that, when executed on hardware, implement a method of graphically creating erosion objects, the implementation including:
   representing multiple risk coverages for benefit of an entity to be insured in a multi-tiered coverage data model including layer objects, coverage objects nested within respective layer objects, and claim table entries for generating erosion objects linked to the coverage objects, wherein:
      the coverage objects represent bound coverages; and
      the claim table entries and erosion objects represent claims reported or paid;
   generating layer objects data for display against a scale of coverage amounts, wherein the coverage objects represent stacked layers of intended coverage for the benefit of the entity;
   further generating controls for creating erosion objects applied to the coverage objects nested within the layer objects including:
      a selection control that selects a risk tower of coverage objects; and
      a claim table tool that
         accepts details of particular claims as claim table entries and
         generates the erosion objects for display from the claim table entries,
            including overlaying the erosion objects for display, individually or collectively, on the selected risk tower of coverage object; and
   transmitting the layer objects data, the scale of coverage amounts, and the controls for creating the erosion objects for display by a user device.

2. The non-transitory computer readable storage medium of claim 1 that stores program instructions that, when executed, further implement:
   the claim table tool accepting identification of one or more claims as related to a particular occurrence to which an occurrence limit and an occurrence deductible apply.

3. The non-transitory computer readable storage medium of claim 2 that stores program instructions that, when executed, further implement:
   automatically calculating impact of the one or more claims on the occurrence limit and the occurrence deductible for the particular occurrence; and
   generating and transmitting for display the erosion objects and remaining coverage objects based on the automatically calculating.

4. The non-transitory computer readable storage medium of claim 3 that stores program instructions that, when executed, further implement:
   the claim table tool further accepting identification of the one or more claims as reported or paid.

5. The non-transitory computer readable storage medium of claim 3 that stores program instructions that, when executed, further implement:
   the one or more claims as related to the particular occurrence are further subject to an aggregate limit and an aggregate deductible for the coverages that apply; and
   automatically calculating impact of the one or more claims and any prior claims on the aggregate limit and the aggregate deductible for the particular occurrence;
   wherein generating the display erosion and remaining coverage objects for display takes into account the aggregate limit and the aggregate deductible.

6. The non-transitory computer readable storage medium of claim 2 that stores program instructions that, when executed, further implement:

accounting for prior claims related to the particular occurrence that impact of the occurrence limit and the occurrence deductible applicable to the one or more claims;

wherein generating for display the erosion objects and remaining coverage objects for display takes into account the prior claims.

7. The non-transitory computer readable storage medium of claim 6 that stores program instructions that, when executed, further implement:

the coverage objects include an occurrence reinstatement with a reinstatement limit applicable to the particular occurrence are further subject to an aggregate limit and an aggregate deductible for the coverages that apply; and wherein automatically calculating impact of the one or more claims and the prior claims takes into account the occurrence limit, the occurrence deductible, and the reinstatement limit for the particular occurrence.

8. A computer-implemented method of graphically creating erosion objects, the method including:

representing using a computing device multiple risk coverages for benefit of an entity to be insured in a multi-tiered coverage data model including layer objects, coverage objects nested within respective layer objects, and claim table entries for generating erosion objects linked to the coverage objects, wherein:

the coverage objects represent bound coverages; and the claim table entries and erosion objects represent claims reported or paid;

generating by the computing device layer objects data for display against a scale of coverage amounts, wherein the coverage objects represent stacked layers of intended coverage for the benefit of the entity;

further generating controls for creating erosion objects applied to the coverage objects nested within the layer objects including:

a selection control that selects a risk tower of coverage objects; and a claim table tool that accepts details of particular claims as claim table entries and generates the erosion objects for display from the claim table entries, including overlaying the erosion objects for display, individually or collectively, on the selected risk tower of coverage object; and transmitting from the computing device the layer objects data, the scale of coverage amounts, and the controls for creating the erosion objects for display by a user device.

9. The computer-implemented method of claim 8, further including:

the claim table tool accepting identification of one or more claims as related to a particular occurrence to which an occurrence limit and an occurrence deductible apply.

10. The computer-implemented method of claim 9, further including:

automatically calculating impact of the one or more claims on the occurrence limit and the occurrence deductible for the particular occurrence;

and generating and transmitting for display erosion and remaining coverage objects for display based on the automatically calculating.

11. The computer-implemented method of claim 10, further including:

the claim table tool further accepting identification of the one or more claims as reported or paid.

12. The computer-implemented method of claim 10, further including:

the one or more claims as related to the particular occurrence are further subject to an aggregate limit and an aggregate deductible for the coverages that apply; and automatically calculating impact of the one or more claims and any prior claims on the aggregate limit and the aggregate deductible for the particular occurrence;

wherein generating the display erosion and remaining coverage objects for display takes into account the aggregate limit and the aggregate deductible.

13. The computer-implemented method of claim 9, further including:

accounting for prior claims related to the particular occurrence that impact of the occurrence limit and the occurrence deductible applicable to the one or more claims;

wherein generating for display the erosion objects and remaining coverage objects for display takes into account the prior claims.

14. The computer-implemented method of claim 13, further including:

the coverage objects include an occurrence reinstatement with a reinstatement limit applicable to the particular occurrence are further subject to an aggregate limit and an aggregate deductible for the coverages that apply; and wherein automatically calculating impact of the one or more claims and the prior claims takes into account the occurrence limit, the occurrence deductible, and the reinstatement limit for the particular occurrence.

\* \* \* \* \*